United States Patent
Gu et al.

(10) Patent No.: US 10,762,829 B2
(45) Date of Patent: *Sep. 1, 2020

(54) DISTRIBUTIVE-DRIVING OF DISPLAY PANEL

(71) Applicant: BEIJING YUNYINGGU TECHNOLOGY CO., LTD., Beijing (CN)

(72) Inventors: Jing Gu, Shanghai (CN); Yu-Hsun Peng, Hsinchu (TW); Shih-Wei Tseng, Hsinchu (TW)

(73) Assignee: BEIJING YUNYINGGU TECHNOLOGY CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/278,169

(22) Filed: Feb. 17, 2019

(65) Prior Publication Data

US 2019/0228703 A1  Jul. 25, 2019

Related U.S. Application Data

(63) Continuation of application No. 16/106,188, filed on Aug. 21, 2018, now Pat. No. 10,210,800, which is a (Continued)

(30) Foreign Application Priority Data

Dec. 21, 2016  (WO) .............. PCT/CN2016/111387

(51) Int. Cl.
*G09G 3/20* (2006.01)
*G09G 3/3225* (2016.01)
(Continued)

(52) U.S. Cl.
CPC ......... *G09G 3/2096* (2013.01); *G02F 1/1368* (2013.01); *G02F 1/133514* (2013.01);
(Continued)

(58) Field of Classification Search
CPC .. G09G 3/3659; G09G 3/3225; G09G 3/3266; G09G 3/33275; G09G 3/2096;
(Continued)

(56) References Cited

U.S. PATENT DOCUMENTS 8,786,645 B2  7/2014  Gu
9,165,526 B2  10/2015 Gu et al.
(Continued)

FOREIGN PATENT DOCUMENTS

CN  1963609 A  5/2007
CN  101000414 A  7/2007
(Continued)

OTHER PUBLICATIONS

Neagu, Codrut, "Screen Resolution? Aspect Ratio? What do 720p, 1080p, 1440p, 4K and 8K mean?", May 20, 2016, Digital Citizen, www.digitalcitizen.life/what-screen-resolution-or-aspect-ratio-what-do-730p-1080i-1080p-mean (Year: 2016).*

(Continued)

*Primary Examiner* — Laurence J Lee
(74) *Attorney, Agent, or Firm* — Bayes PLLC

(57) ABSTRACT

An apparatus includes an active region, a source driving circuit, and a light emitting driving circuit. The active region includes an array of light emitting elements corresponding to an array of pixels arranged in M rows and N columns. The number of the array of light emitting elements is k times of the number of the array of pixels. The apparatus includes xM light emitting lines and (k/x)N source lines, wherein x is a positive fraction, and each of xM and (k/x)N is a positive integer. The source driving circuit is operatively coupled to (Continued)

the active region via the (k/x)N source lines and configured to write display data of a frame to the array of light emitting elements. The light emitting driving circuit is operatively coupled to the active region via the xM light emitting lines and configured to cause the array of light emitting elements to emit light.

20 Claims, 33 Drawing Sheets

Related U.S. Application Data continuation of application No. PCT/CN2017/079638, filed on Apr. 6, 2017.

(60) Provisional application No. 62/426,882, filed on Nov. 28, 2016.

(51) Int. Cl.
  *G09G 3/3266* (2016.01)
  *G09G 3/3275* (2016.01)
  *G02F 1/1362* (2006.01)
  *G02F 1/1335* (2006.01)
  *G02F 1/1368* (2006.01)
  *G09G 3/36* (2006.01)

(52) U.S. Cl.
  CPC ......... *G02F 1/136286* (2013.01); *G09G 3/20* (2013.01); *G09G 3/2074* (2013.01); *G09G 3/3225* (2013.01); *G09G 3/3266* (2013.01); *G09G 3/3275* (2013.01); *G09G 3/3607* (2013.01); *G09G 3/3666* (2013.01); *G09G 3/3677* (2013.01); *G09G 3/3688* (2013.01); *G09G 2300/0426* (2013.01); *G09G 2300/0465* (2013.01); *G09G 2300/08* (2013.01); *G09G 2310/021* (2013.01); *G09G 2310/0202* (2013.01); *G09G 2310/0243* (2013.01); *G09G 2310/0262* (2013.01); *G09G 2310/0297* (2013.01); *G09G 2380/02* (2013.01)

(58) Field of Classification Search
  CPC ....... G09G 2380/02; G09G 2310/0297; G09G 3/2003; G09G 2300/0452; G09G 3/2074; G09G 2300/0459; G09G 2300/0443
  See application file for complete search history.

(56) References Cited

U.S. PATENT DOCUMENTS

| | | | |
|---|---|---|---|
| 9,183,799 B2 * | 11/2015 | Hotelling | ............ G09G 3/3614 |
| 9,293,092 B2 | 3/2016 | Guo | |
| 9,418,586 B2 | 8/2016 | Gu | |
| 2002/0070909 A1 | 6/2002 | Asano et al. | |
| 2005/0001542 A1 | 1/2005 | Kiguchi | |
| 2005/0099378 A1 | 5/2005 | Kim | |
| 2006/0044292 A1 | 3/2006 | Shen et al. | |
| 2006/0098033 A1 | 5/2006 | Langendijk | |
| 2006/0132668 A1 | 6/2006 | Park et al. | |
| 2007/0146242 A1 | 6/2007 | Miller et al. | |
| 2007/0164964 A1 * | 7/2007 | Ha | ....................... G09G 3/3607 |
| | | | 345/98 |
| 2010/0109994 A1 | 5/2010 | Lee et al. | |
| 2010/0149228 A1 | 6/2010 | Han et al. | |
| 2010/0201607 A1 | 8/2010 | Huang et al. | |
| 2011/0025679 A1 | 2/2011 | Park | |
| 2012/0154724 A1 | 6/2012 | Yang et al. | |
| 2014/0118969 A1 | 5/2014 | Lee | |
| 2015/0339969 A1 | 11/2015 | Gu | |
| 2016/0219271 A1 | 7/2016 | Wei | |
| 2016/0240593 A1 | 8/2016 | Gu et al. | |
| 2016/0275846 A1 | 9/2016 | Gu | |
| 2016/0370919 A1 | 12/2016 | Xu et al. | |

FOREIGN PATENT DOCUMENTS

| | | |
|---|---|---|
| CN | 101726896 A | 6/2010 |
| CN | 101853636 A | 10/2010 |
| CN | 102955310 A | 3/2013 |
| CN | 104732928 A | 6/2015 |
| GB | 2464803 A | 5/2010 |
| KR | 20090070324 A | 7/2009 |
| WO | 2015016007 A1 | 2/2015 |
| WO | 2017036430 A2 | 3/2017 |

OTHER PUBLICATIONS

Non-final Office action dated Feb. 20, 2020 issued in parallel U.S. Appl. No. 16/371,654, filed Apr. 1, 2019, 27 pages.
International Search Report and Written Opinion directed to International Patent Application No. PCT/CN2016/111387; 11 pages.
SIPO International Search Report dated Aug. 25, 2017 in corresponding PCT Application No. PCT/CN2017/079638, 2 pages.
Non-final Office action dated Nov. 9, 2018, issued in parallel U.S. Appl. No. 16/106,188, filed Aug. 21, 2018, 19 pages.
Neagu, Codrut, "Screen Resolution? Aspect Ratio? What do 720p, 1080p, 1440p, 4K and 8K mean?", May 20, 2016, Digital Citizen, www.digitalcitizen.life/what-screen-resolution-or-aspect-ratio-what-do-730p-1080p-mean(Year: 2016).
Extended European Search Report issued in corresponding European Patent Application No. EP 17 87 3279, dated Jul. 13, 2020, 88 pages.

* cited by examiner

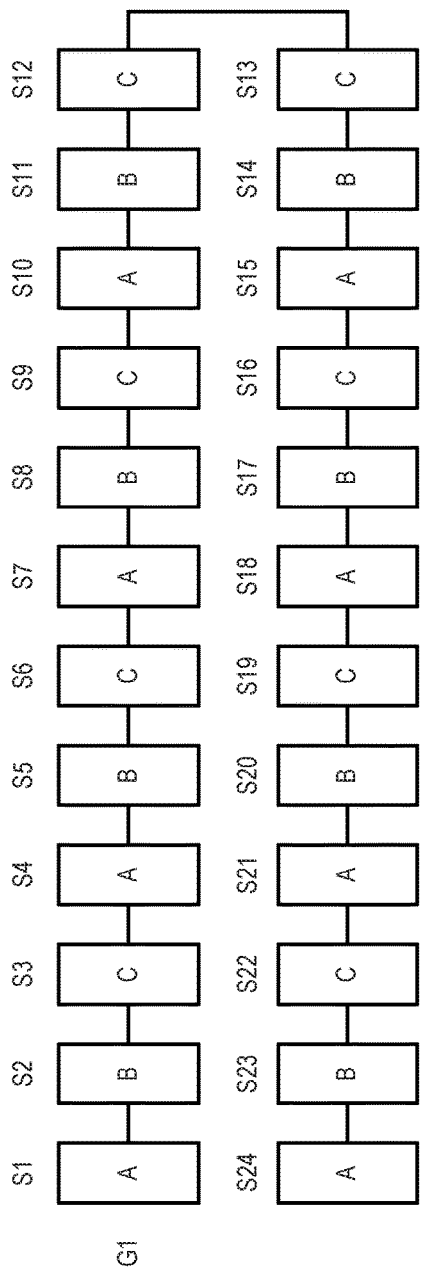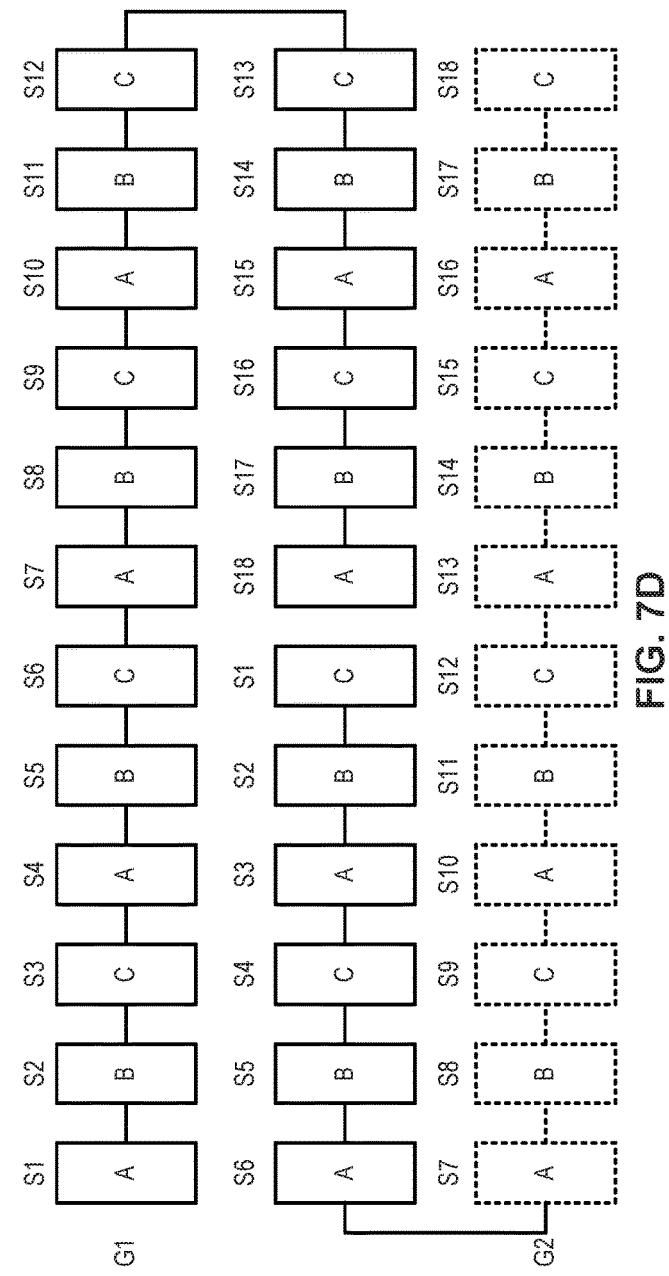

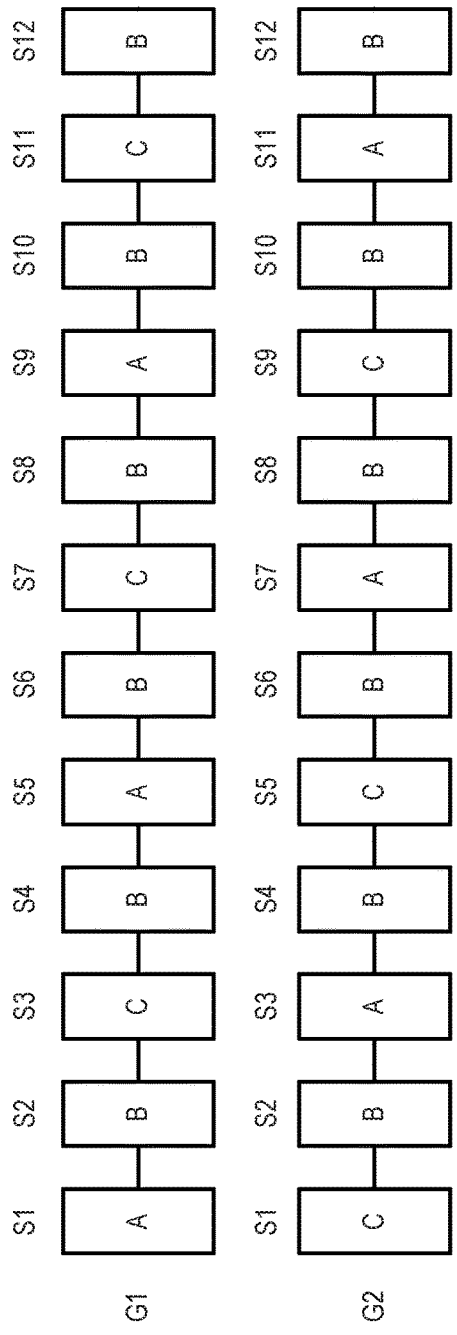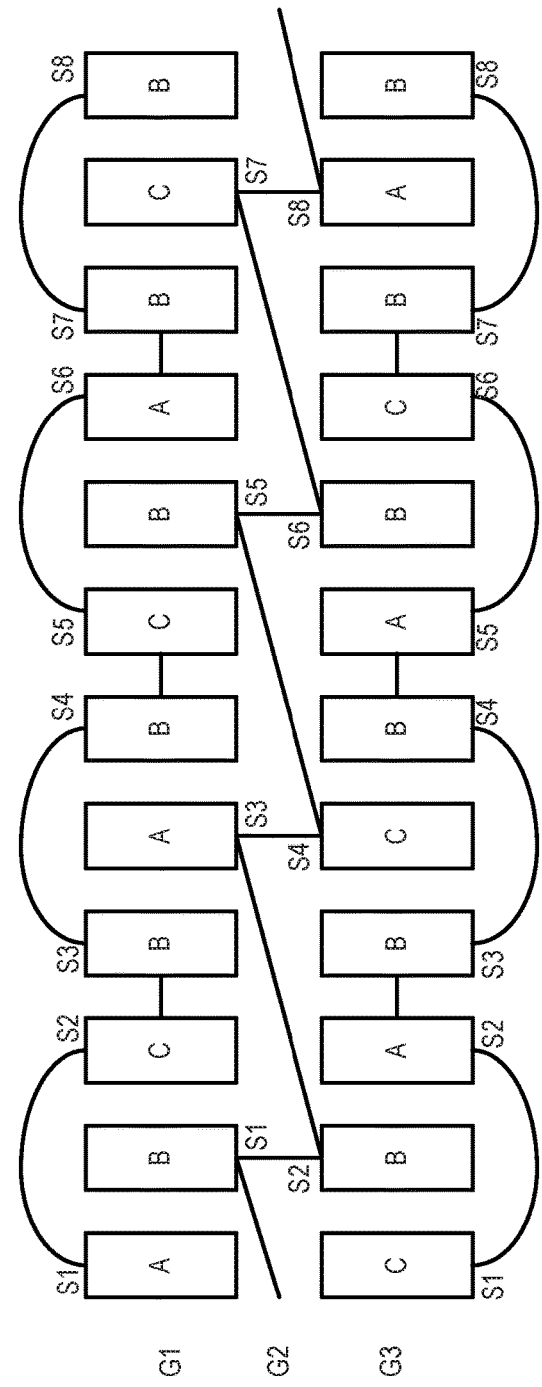

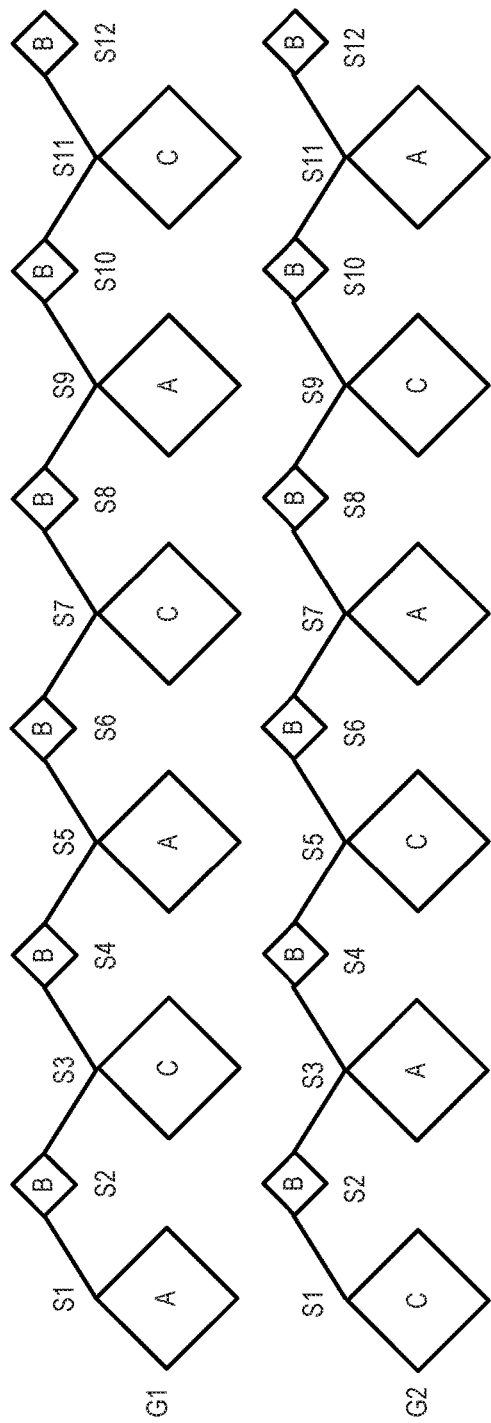
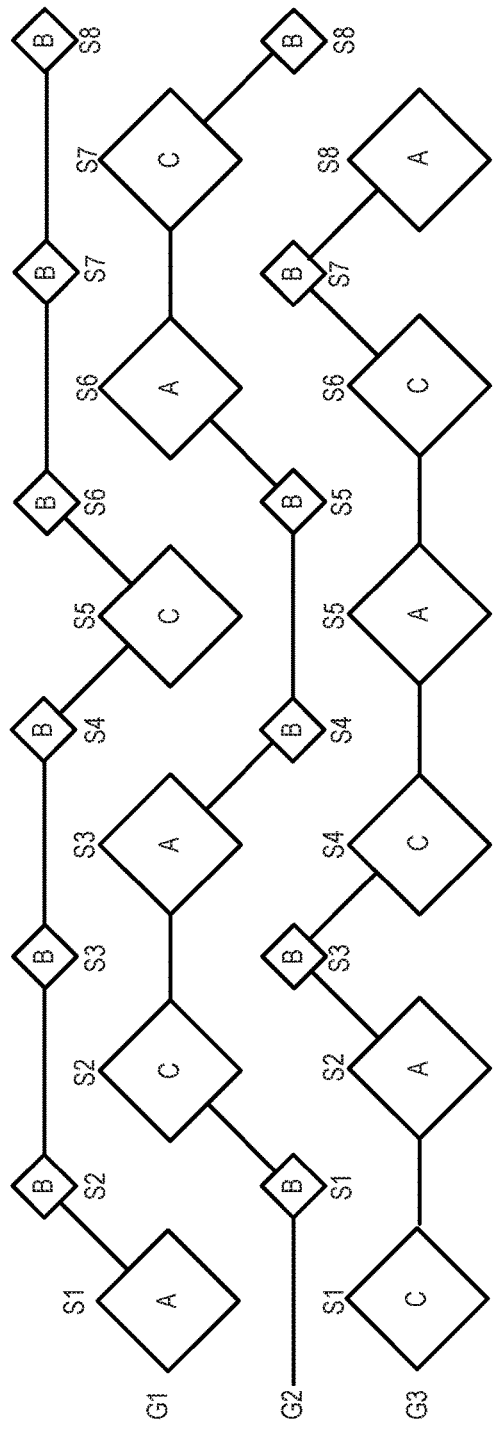
FIG. 9A
FIG. 9B

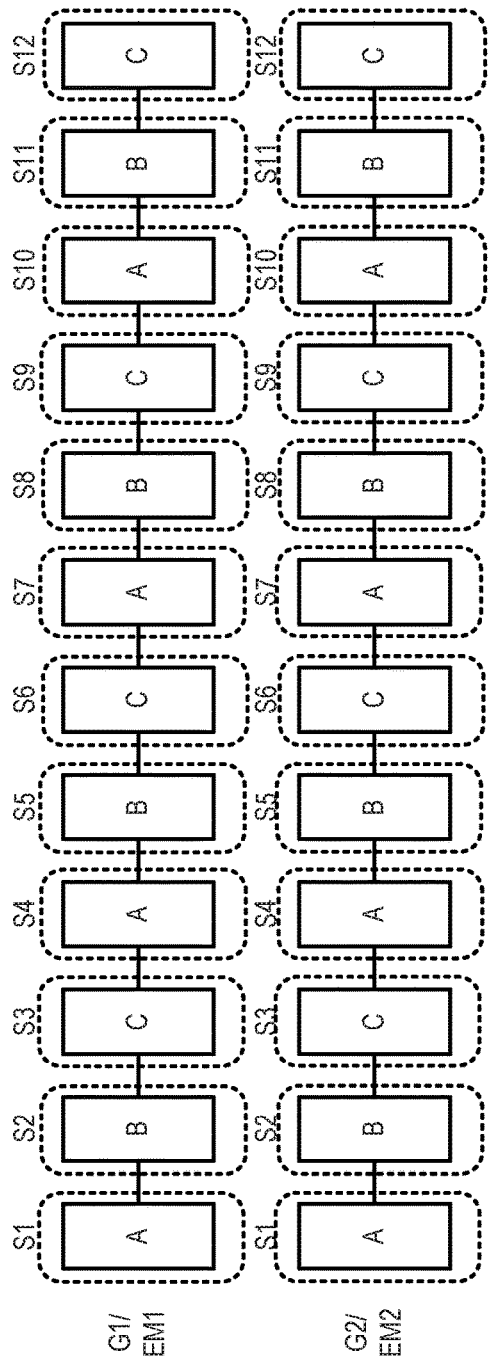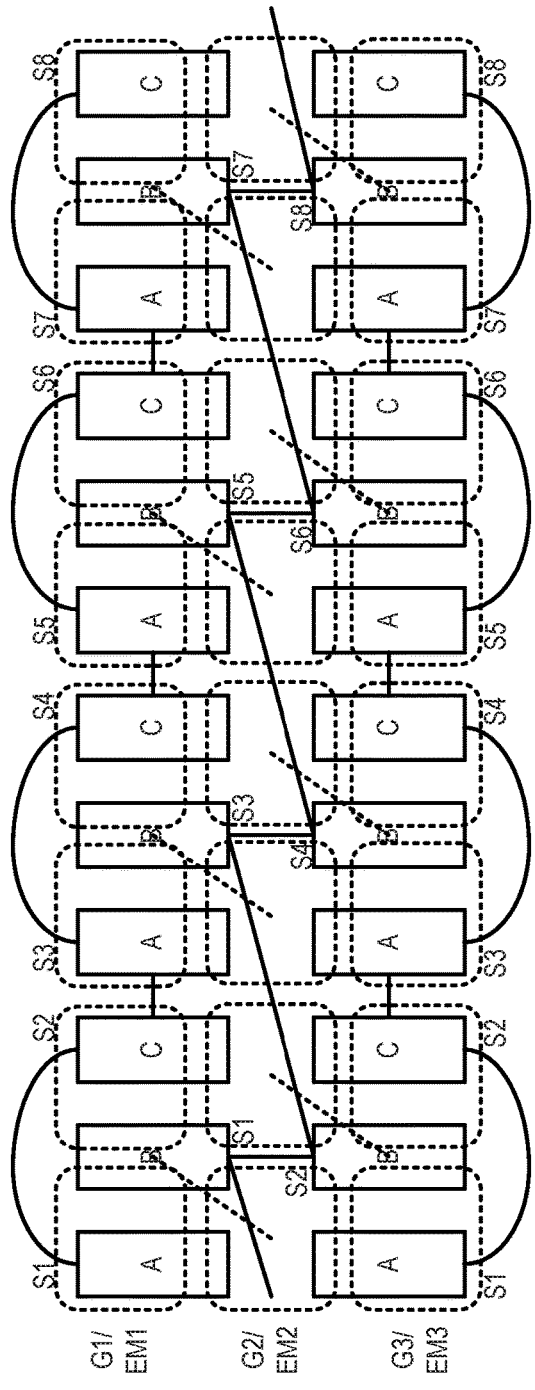

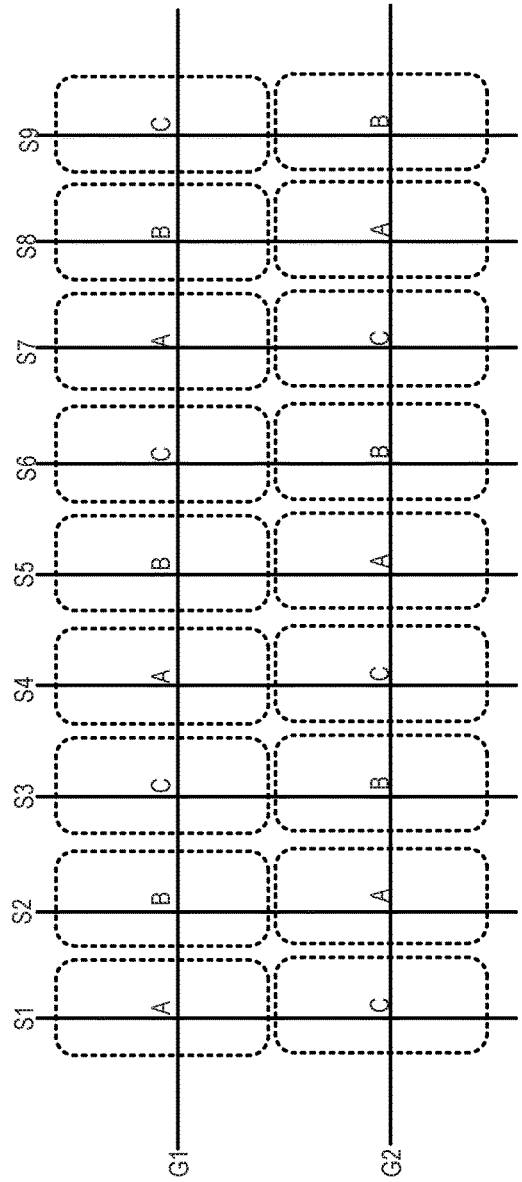
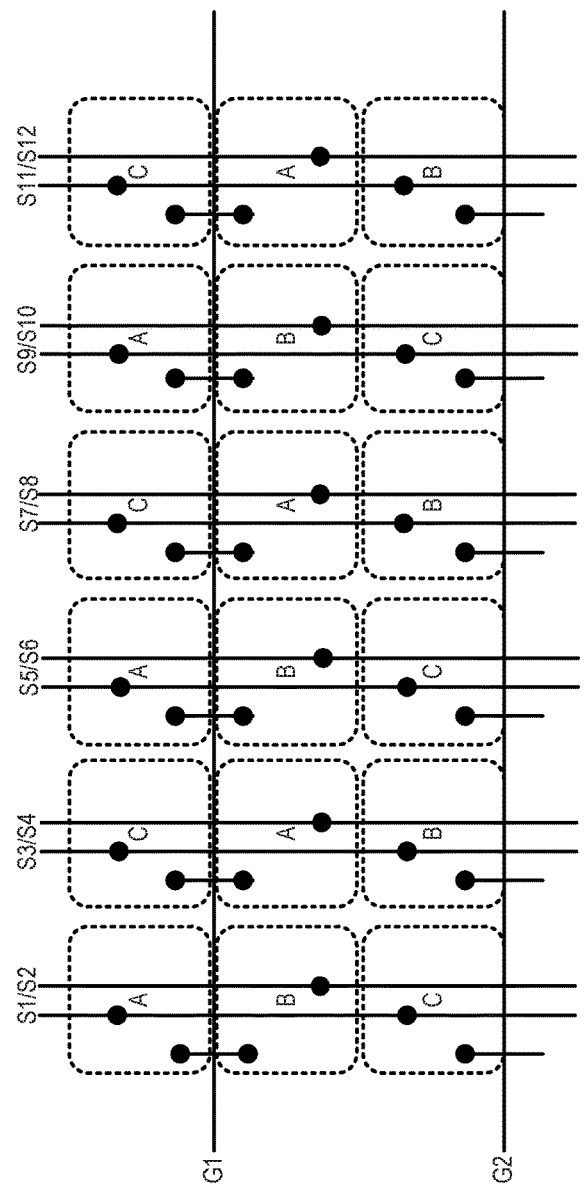
FIG. 21A
FIG. 21B

DISTRIBUTIVE-DRIVING OF DISPLAY PANEL

CROSS REFERENCE TO RELATED APPLICATION

This application is continuation of U.S. application Ser. No. 16/106,188, filed on Aug. 21, 2018, entitled "DISTRIBUTIVE-DRIVING OF DISPLAY PANEL," which is continuation of International Application No. PCT/CN2017/079638, filed on Apr. 6, 2017, entitled "DISTRIBUTIVE-DRIVING OF DISPLAY PANEL," which claims priority to International Application No. PCT/CN2016/111387, filed on Dec. 21, 2016, entitled "DISTRIBUTIVE-DRIVING OF DISPLAY PANEL," and claims priority to U.S. Provisional Application No. 62/426,882, filed on Nov. 28, 2016, entitled "DISTRIBUTIVE-DRIVING OF DISPLAY PANEL," all of which are hereby incorporated by reference in their entireties.

BACKGROUND

The disclosure relates generally to display technologies, and more particularly, to driving of display panel.

Display resolution is limited by the physical size of a display panel in each of the width dimension (i.e., in the row/horizontal direction) and the height dimension (i.e., in the column/vertical direction), as well as the minimum pattern size of fabricating the components on the display panel in each dimension. Depending on the ratio of subpixels to pixels, known display systems can have a very large number of source lines (a.k.a. data lines) arranged in the row direction, which can increase the manufacturing complexity and cost. For example, a wide quad high-definition (WQHD) display panel (e.g., resolution is 1440×2560) with the real-RGB subpixel arrangement (the ratio is 3), the number of the source lines may be 4320. Moreover, it became increasingly desirable to narrow the bezel surrounding the display panel, allowing for more screen area. The very large number of gate lines (a.k.a. scan lines) and the corresponding driving circuits for high resolution displays, however, limit the narrow-bezel or bezel-less designs.

The large number of source lines and/or gate lines is particularly a challenge for flexible displays. For example, flexible organic light-emitting diode (OLED) displays are usually manufactured using chip-on-film (COF) package. For example, due to the limit on film pitch of COF package, multiple-layer COF package becomes necessary to accommodate the large number of source lines (e.g., 4320 for WQHD display panels), which can significantly increase the cost of flexible OLED displays.

SUMMARY

The disclosure relates generally to display technologies, and more particularly, to driving of display panel.

In one example, an apparatus includes an active region, a source driving circuit, and a light emitting driving circuit. The active region includes an array of light emitting elements corresponding to an array of pixels arranged in M rows and N columns. The number of the array of light emitting elements is k times of the number of the array of pixels. The apparatus includes xM light emitting lines and (k/x)N source lines, wherein x is a positive fraction, and each of xM and (k/x)N is a positive integer. The source driving circuit is operatively coupled to the active region via the (k/x)N source lines and configured to write display data of a frame to the array of light emitting elements. The light emitting driving circuit is operatively coupled to the active region via the xM light emitting lines and configured to cause the array of light emitting elements to emit light.

In another example, an apparatus includes an active region, light emitting lines, gate lines, source lines, a gate driving circuit, a source driving circuit, and a light emitting driving circuit. The active region includes an array of light emitting elements and an array of pixel circuits. The array of light emitting elements correspond to an array of pixels arranged in M rows and N columns. The number of the array of light emitting elements is k times of the number of the array of pixels. The array of pixel circuits are operatively coupled to the array of light emitting elements. Each pixel circuit in the array of pixel circuits is configured to drive i light emitting elements in the array of light emitting elements. The apparatus includes xM light emitting lines, (x/i)M gate lines, and (k/x)N source lines, wherein x is a positive fraction, and each of xM, (x/i)M, and (k/x)N is a positive integer. The gate driving circuit is operatively coupled to the active region via the (x/i)M gate lines and configured to scan the array of light emitting elements. The source driving circuit is operatively coupled to the active region via the (k/x)N source lines and configured to write display data of a frame to the array of light emitting elements. The light emitting driving circuit operatively coupled to the active region via the xM light emitting lines and configured to cause each of i light emitting elements driven by a same pixel circuit to sequentially emit light in a period of the frame.

In still another example, an apparatus includes a data converting module. The data converting module is configured to provide display data in a frame to an array of pixel circuits of a display panel. The array of pixel circuits are configured to drive a plurality of subpixels of the display panel in at least a first color, a second color, and a third color. The display data in the frame includes a first set of display data to be provided to a first row of the array of pixel circuits configured to drive a first set of the subpixels consisting of subpixels in the first and second colors. The display data in the frame also includes a second set of display data to be provided to a second row of the array of pixel circuits configured to drive a second set of the subpixels consisting of subpixels in the first and third colors. The display data in the frame further includes a third set of display data to be provided to a third row of the array of pixel circuits configured to drive a third set of the subpixels different from the first set of the subpixels and different from the second set of the subpixels.

BRIEF DESCRIPTION OF THE DRAWINGS

The embodiments will be more readily understood in view of the following description when accompanied by the below figures and wherein like reference numerals represent like elements, wherein:

FIG. 7C is a depiction of another arrangement of gate lines and source lines for distributive-driving of subpixels in the example arrangement shown in FIG. 7A in accordance with an embodiment;

FIG. 7D is a depiction of still another arrangement of gate lines and source lines for distributive-driving of subpixels in the example arrangement shown in FIG. 7A in accordance with an embodiment;

FIG. 8A is a depiction of an arrangement of gate lines and source lines for driving of subpixels in yet another example arrangement;

FIG. 8B is a depiction of an arrangement of gate lines and source lines for distributive-driving of subpixels in the example arrangement shown in FIG. 8A in accordance with an embodiment;

FIG. 9A is a depiction of an arrangement of gate lines and source lines for driving of subpixels in yet another example arrangement;

FIG. 9B is a depiction of an arrangement of gate lines and source lines for distributive-driving of subpixels in the example arrangement shown in FIG. 9A in accordance with an embodiment;

FIG. 19A is a depiction of an arrangement of gate lines, source lines, and light emitting lines and an array of pixel circuits for driving of light emitting elements in another example arrangement;

FIG. 19B is a depiction of an arrangement of gate lines, source lines, and light emitting lines and an array of pixel circuits for distributive-driving of light emitting elements in the example arrangement shown in FIG. 19A in accordance with an embodiment;

FIG. 21A is a depiction of an arrangement of gate lines and source lines and an array of pixel circuits for driving subpixels in an example arrangement; and FIG. 21B is a depiction of an arrangement of gate lines and source lines and an array of pixel circuits for distributive-driving subpixels in the example arrangement shown in FIG. 21A in accordance with an embodiment.

DETAILED DESCRIPTION

Figure 1:
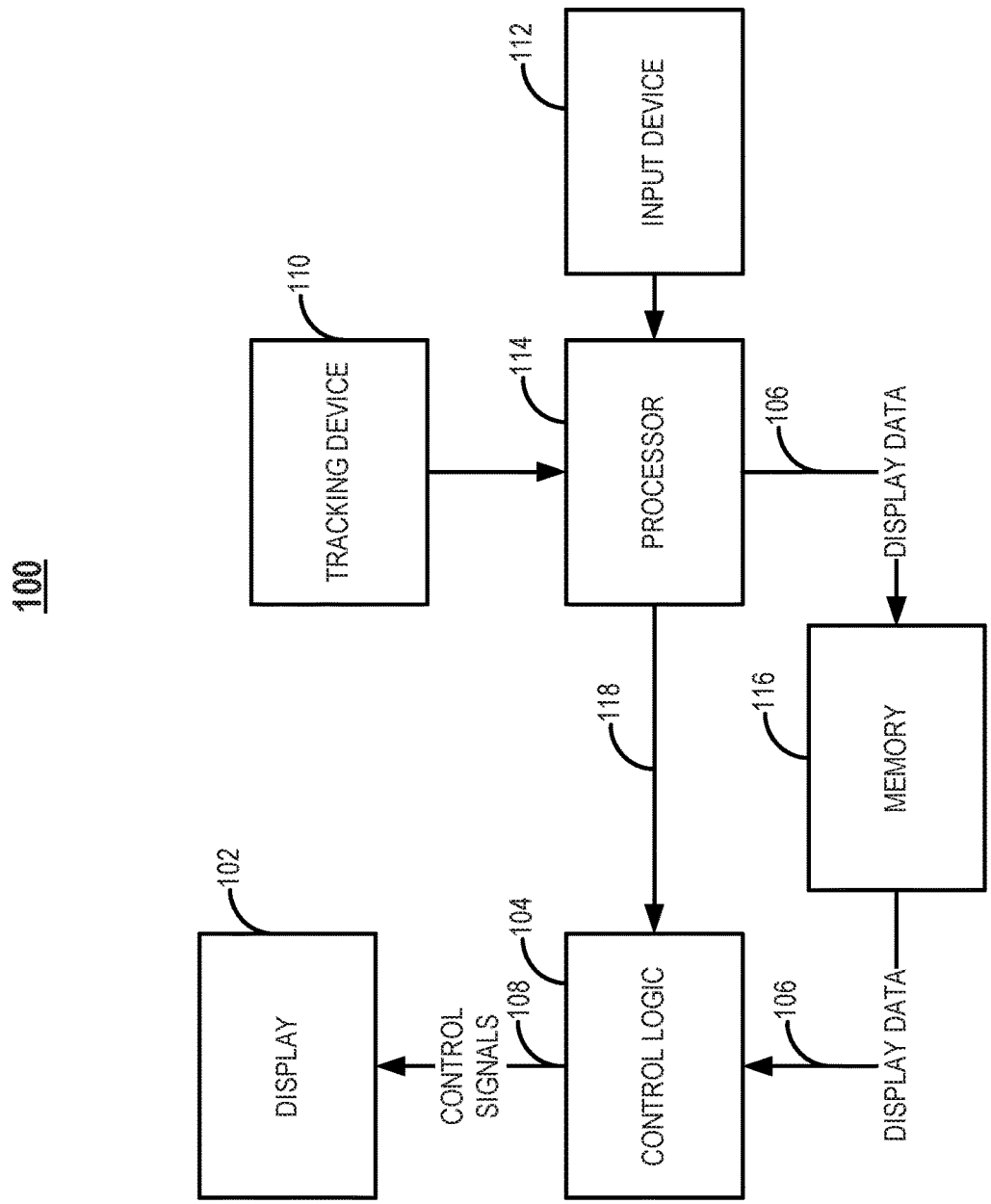
FIG. 1 is a block diagram illustrating an apparatus including a display and control logic in accordance with an embodiment.

In the following detailed description, numerous specific details are set forth by way of examples in order to provide a thorough understanding of the relevant disclosures. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure.

Throughout the specification and claims, terms may have nuanced meanings suggested or implied in context beyond an explicitly stated meaning. Likewise, the phrase "in one embodiment/example" as used herein does not necessarily refer to the same embodiment and the phrase "in another embodiment/example" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

As will be disclosed in detail below, among other novel features, the distributive-driving of display panel disclosed herein can reduce the number of source lines or gate lines. By distributing the driving load to the source and gate lines according to an optimal ratio, the timing specification of display panels can be optimized. According to some aspects of the present disclosure, the reduction of source lines may be achieved by distributing the driving load to the source and gate lines according to an optimal ratio based on the specific subpixel arrangement of the display panel. On the other hand, the distributive-driving of display panel disclosed herein may not overburden the gate scan (e.g., by doubling the number of gate lines) and thus, would not significantly reduce the scan period of each subpixel.

According to some aspects of the present disclosure, the reduction of gate lines may be achieved by distributing the driving load to the source and gate lines according to an optimal ratio based on the specific subpixel arrangement of the display panel. The reduction of gate lines, as well as the corresponding driving circuits, can help to achieve the narrow-bezel or bezel-less designs. Moreover, the scan period of each subpixel can be increased because of the less gate lines to be scanned in each frame. In some embodiments, source-demultiplexing can be combined with the distributive-driving so that the number of data channels (a.k.a. source channels) provided by control logic, e.g., driver integrated circuit (IC), does not need to increase to the same number of the source lines, thereby avoiding increasing the design and manufacturing complexity and cost. In some embodiments in which the display is an active-matrix organic light-emitting diode (AMOLED) display, the extra wiring caused by the distributive-driving may not reduce the aperture ratio of display because each subpixel is a top emitting OLED.

Moreover, by balancing the number of source lines and gate lines with an optimal ratio (e.g., making the number of source lines and gate lines to be comparable to each other), the situation in which the number of source lines is much larger than the number of gate lines may be avoided. Thus, the single-layer COF package can be used for flexible displays, such as for packaging driver ICs of flexible displays with high resolution, thereby reducing the manufacturing cost compared with the traditional flexible displays using multi-layer COF package.

Additional novel features will be set forth in part in the description which follows, and in part will become apparent to those skilled in the art upon examination of the following and the accompanying drawings or may be learned by production or operation of the examples. The novel features of the present disclosure may be realized and attained by practice or use of various aspects of the methodologies, instrumentalities, and combinations set forth in the detailed examples discussed below.

FIG. 1 illustrates an apparatus 100 including a display 102 and control logic 104. Apparatus 100 may be any suitable device, for example, a virtual reality (VR) or augmented reality (AR) device (e.g., VR headset, etc.), handheld device (e.g., dumb or smart phone, tablet, etc.), wearable device (e.g., eyeglasses, wrist watch, etc.), automobile control station, gaming console, television set, laptop computer, desktop computer, netbook computer, media center, set-top box, global positioning system (GPS), electronic billboard, electronic sign, printer, or any other suitable device. In this embodiment, display 102 is operatively coupled to control logic 104 and is part of apparatus 100, such as but not limited to, a head-mounted display, handheld device screen, computer monitor, television screen, head-up display (HUD), dashboard, electronic billboard, or electronic sign. Display 102 may be an OLED display, liquid crystal display (LCD), E-ink display, electroluminescent display (ELD), billboard display with LED or incandescent lamps, or any other suitable type of display.

Control logic 104 may be any suitable hardware, software, firmware, or combination thereof, configured to receive display data 106 (e.g., pixel data) and generate control signals 108 for driving the subpixels on display 102. Control signals 108 are used for controlling writing of display data 106 (either in its original form or in a converted form) to the subpixels and directing operations of display 102. For example, subpixel rendering (SPR) algorithms for various subpixel arrangements may be part of control logic 104 or implemented by control logic 104. As described below in detail with respect to FIG. 4, control logic 104 in one embodiment may include a control signal generating module 402 having a timing controller (TCON) 408 and a clock generator 410, a data interface 404, and a data converting module 406 having a storing unit 412 and a data reconstructing unit 414. Control logic 104 may include any other suitable components, such as an encoder, a decoder, one or more processors, controllers, and storage devices. Control logic 104 may be implemented as a standalone IC chip, such as an application-specific integrated circuit (ASIC) or a field-programmable gate array (FPGA). Apparatus 100 may also include any other suitable components such as, but not limited to tracking devices 110 (e.g., inertial sensors, camera, eye tracker, GPS, or any other suitable devices for tracking motion of eyeballs, facial expression, head movement, body movement, and hand and body gesture), input devices 112 (e.g., a mouse, keyboard, remote controller, handwriting device, microphone, scanner, etc.), and speakers (not shown).

In some embodiments, control logic 104 may be manufactured in a chip-on-glass (COG) package, for example, when display 102 is a rigid display. In some embodiments, control logic 104 may be manufactured in a COF package, for example, when display 102 is a flexible display, e.g., a flexible OLED display. As described below in detail, the distributive-driving of display panel can optimize the numbers of source lines and gate lines. As a result, in some embodiments, control logic 104 may be manufactured in a single-layer COF package due to the less number of source lines. It is to be appreciated that control logic 104 may be integrated with driving circuits, such as gate driving circuits, source driving circuits, and light emitting driving circuits, in a driver IC. The driver IC, including control logic 104 and driving circuits, may be manufactured in a COF package, such as a single-layer COF package.

In this embodiment, apparatus 100 may be a handheld or a VR/AR device, such as a smart phone, a tablet, or a VR headset. Apparatus 100 may also include a processor 114 and memory 116. Processor 114 may be, for example, a graphics processor (e.g., graphics processing unit (GPU)), an application processor (AP), a general processor (e.g., APU, accelerated processing unit; GPGPU, general-purpose computing on GPU), or any other suitable processor. Memory 116 may be, for example, a discrete frame buffer or a unified memory. Processor 114 is configured to generate display data 106 in display frames and may temporally store display data 106 in memory 116 before sending it to control logic 104. Processor 114 may also generate other data, such as but not limited to, control instructions 118 or test signals, and provide them to control logic 104 directly or through memory 116. Control logic 104 then receives display data 106 from memory 116 or from processor 114 directly.

Figure 2A:
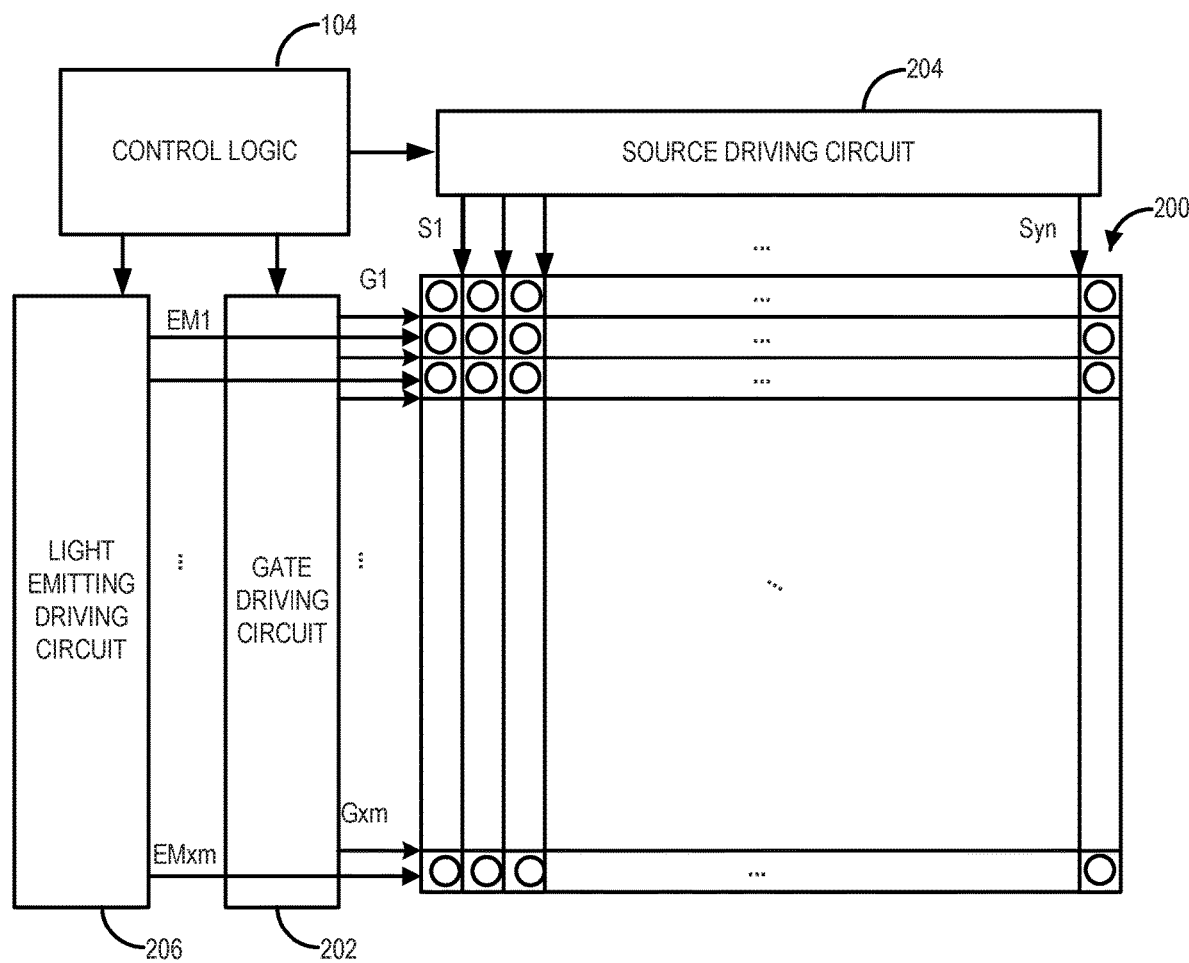
FIGS. 2A and 2B are block diagrams illustrating the display shown in FIG. 1 including driving circuits in accordance with an embodiment.
Figure 2B:
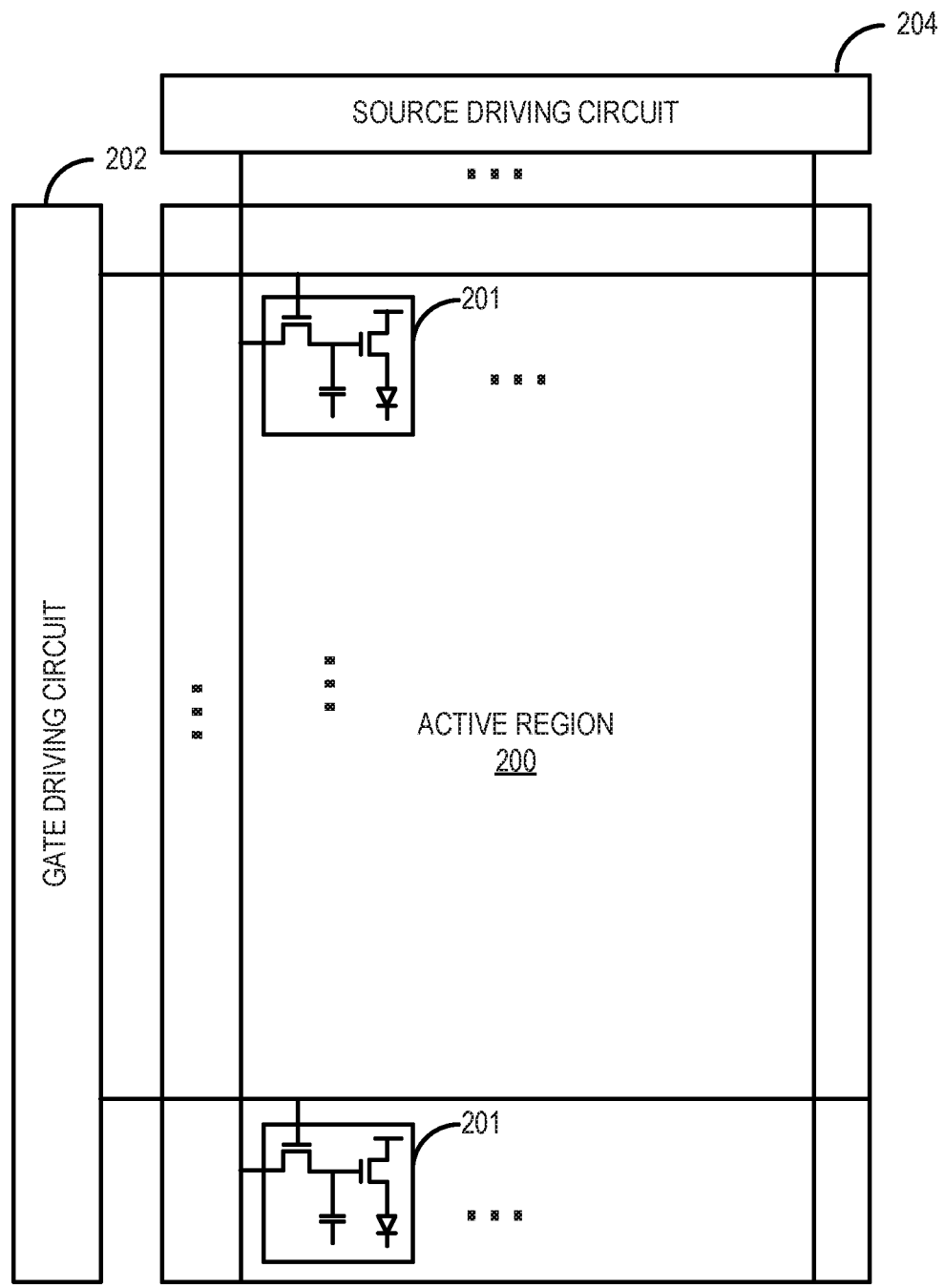

FIGS. 2A and 2B are block diagrams illustrating display 102 shown in FIG. 1 including driving circuits in accordance with an embodiment. Display 102 in this embodiment includes a display panel having an active region 200 including a plurality of subpixels 201. The display panel may also include on-panel driving circuits, e.g., a gate driving circuit 202 and a source driving circuit 204. It is to be appreciated that in some embodiments, gate driving circuit 202 and source driving circuit 204 may not be on-panel driving circuits, i.e., not parts of the display panel, but instead are operatively coupled to the display panel.

Each subpixel 201 may be any of the units that make up a pixel, i.e., a subdivision of a pixel. For example, a subpixel 201 may be a single-color display element that can be individually addressed. In some embodiments in which display 102 is an OLED display, each subpixel 201 may include an OLED, such as a top emitting OLED, and a pixel circuit for driving the OLED. Each OLED can emit a light in a predetermined brightness and color, such as but not limited to, red, green, blue, yellow, cyan, magenta, or white. Each pixel circuit includes thin film transistors (TFTs) and is configured to drive the corresponding subpixel 201 by controlling the light emitting from the respective OLED according to control signals 108 from control logic 104. The pixel circuit may be in a 2T1C configuration (i.e., including a switching transistor, a driving transistor, and a storage capacitor) or may include a compensation circuit with more transistors and/or capacitors for brightness uniformity, such as in a 7T1C, 5T1C, 5T2C, or 6T1C configuration.

In some embodiments in which display 102 is an LCD, each subpixel 201 may include a color filter, a liquid crystal region, and a pixel circuit for driving the liquid crystal region. Depending on the characteristics (e.g., color, thickness, etc.) of the respective color filter, a subpixel 201 may present a distinct color and brightness, such as but not limited to, red, green, blue, yellow, cyan, magenta, or white. Each pixel circuit includes at least one TFT (e.g., a switching transistor) and a storage capacitor.

In this embodiment, the plurality of subpixels correspond to an array of pixels arranged in M rows and N columns. The number of the subpixels may be k times of the number of the pixels. That is, k subpixels may constitute one pixel, and each pixel may consist of k subpixels. k may be any positive integer larger than 1. In some embodiments, k may be 2, 3, or 4. It is to be appreciated that in some embodiments, k may be a positive fraction. That is, the number of subpixels may not be an integer multiple of the number of pixels. In some embodiments, each row of pixels may include N pixels arranged in the row/horizontal direction (but are not necessarily in a straight line), which include kN subpixels. Similarly, in some embodiments, each column of pixels may include M pixels arranged in the column/vertical direction (but are not necessarily in a straight line), which include M subpixels. It is to be appreciated that the k subpixels of each pixel (and the kN subpixels in each row of pixels and the M subpixels in each column of pixels) may not be physically aligned. In other words, the centers of the k subpixels of each pixel (and the kN subpixels in each row of pixels and the M subpixels in each column of pixels) may not be in a straight line in the row/horizontal direction and/or in a straight line in the column/vertical direction. It is also to be appreciated that, the colors, sizes, and/or shapes of the k subpixels of each pixel may not be the same as well.

In this embodiment, display 102 (and the display panel thereof) has a resolution of N×M, which corresponds to the array of pixels arranged in the M rows and N columns. That is, display 102 can be characterized by its display resolution, which is the number of distinct pixels in each dimension that can be displayed. For example, for a WQHD display with a resolution of 1440×2560, the corresponding array of pixels is arranged in 2560 rows and 1440 columns. In this embodiment, display data 106 is provided by processor 114 in display frames. For each frame, display data 106 includes M×N pieces of pixel data, and each piece of pixel data corresponds to one pixel of the array of pixels. Each pixel may be considered as a sample of an original image represented by a piece of pixel data having multiple components, such as multiple color components or a luminance and multiple chrominance components. In some embodiments, each piece of pixel data includes a first component representing a first color, a second component representing a second color, and a third component representing a third color. The first, second, and third colors may be three primary colors (i.e., red, green, and blue) so that each pixel can present a full color. That is, display data 106 may be programmed at the pixel-level.

In some embodiments, three subpixels may constitute one pixel, i.e., k is 3. In these embodiments, each of the three components of a piece of pixel data may be used to render one of the three subpixels of the respective pixel. In some embodiments, four subpixels may constitute one pixel, i.e., k is 4. In these embodiments, one of the four subpixels of a pixel (e.g., a white subpixel) may be rendered based on at least one of the three components of the respective piece of pixel data. One example is disclosed in U.S. Pat. No. 9,165,526, having a title of "Subpixel Arrangement of Displays and Methods for Rendering the Same," which is incorporated herein by reference. In some embodiments, two subpixels may constitute one pixel, i.e., k is 2. In these embodiments, SPR algorithms may be used to render the two subpixels of each pixel based on the specific subpixel arrangement. Examples are disclosed in U.S. Pat. No. 8,786, 645, having a title of "Subpixel Arrangement of Displays and Methods for Rendering the Same," U.S. Pat. No. 9,418, 586, having a title of "Subpixel Arrangement of Displays and Methods for Rendering the Same," U.S. Patent Application Publication No. 2015/0339969, having a title of "Method and Apparatus for Subpixel Rendering," U.S. Patent Application Publication No. 2016/0240593, having a title of "Subpixel Arrangement of Displays and Methods for Rendering the Same," and U.S. Patent Application Publication No. 2016/0275846, having a title of "Subpixel Arrangement of Displays and Driving Circuit Thereof," each of which is incorporated herein by reference. It is to be appreciated that any subpixel arrangements corresponding to any number of k may be applied by the distributive-driving of display panel disclosed herein. The applications of the distributive-driving scheme to exemplary subpixel arrangements are described below in detail.

Gate driving circuit 202 in this embodiment is operatively coupled to active region 200 via a plurality of gate lines (a.k.a. scan lines) and configured to scan the plurality of subpixels 201 based on at least some of control signals 108. For example, gate driving circuit 202 applies a plurality of scan signals, which are generated based on control signals 108 from control logic 104, to the plurality of gate lines for scanning the plurality of subpixels 201 in a gate scanning order. A scan signal is applied to the gate electrode of a switching transistor of each pixel circuit during the scan period to turn on the switching transistor so that the data signal for the corresponding subpixel 201 can be written by source driving circuit 204. It is to be appreciated that although one gate driving circuit 202 is illustrated in FIG. 2A, in some embodiments, multiple gate driving circuits may work in conjunction with each other to scan the subpixels 201.

Figure 3:
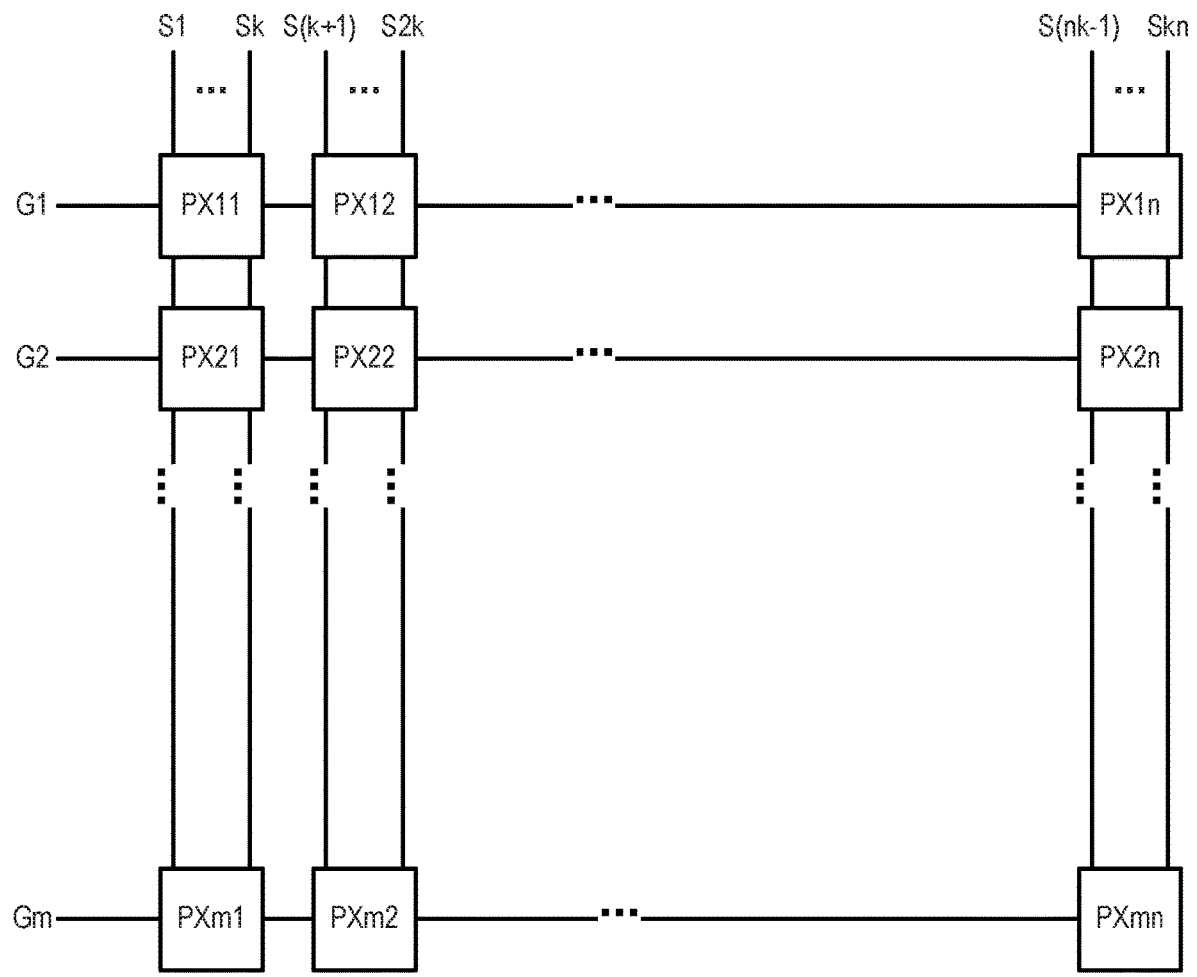
FIG. 3 is a depiction of an arrangement of gate lines and source lines for driving a display panel having an array of pixels.

In some display systems, such as the example illustrated in FIG. 3, M gate lines (G1, G2, . . . , Gm) are provided for an array of pixels (PX) arranged in M rows and N columns. Subpixels in each of the M rows of pixels are operatively coupled to one gate line and are scanned by a scan signal transmitted via the gate line. In other words, the number of the gate lines is the same as the number of the rows of pixels (M). In some display systems (not shown), subpixels in each of the M rows of pixels are operatively coupled to two gate lines and are scanned by two scan signals transmitted via the two gate lines. That is, the number of the gate lines is twice of the number of the rows of pixels (i.e., dual-gate driving). For example, one half of the subpixels in a row of pixels may be scanned via one gate line, and the other half of the subpixels in the same row of pixels may be scanned via another gate line.

Referring back to FIG. 2A, in a first embodiment, to achieve the distributive-driving of display panel, the number of the gate lines is xM, wherein x is a fraction between 1 and 2. In other words, in average, subpixels in each of the M rows of pixels are operatively coupled to more than one but less than two gate lines and are scanned by scan signals transmitted via the gate lines. In other words, the number of the gate lines is larger than the number of the rows of pixels, but less than twice of the number of the rows of pixels. In this embodiment, x may be represented as p/q, wherein each of p and q is a positive integer, and p is larger than q and is smaller than 2q. In some embodiments, x may be 3/2, 4/3, 5/3, 5/4, 7/4, 6/5, 7/5, 8/5, 9/5, 7/6, 11/6, 8/7, 9/7, 10/7, 11/7, 12/7, 13/7, 9/8, 11/8, 13/8, 15/8, 10/9, 11/9, 13/9, 14/9, 16/9, or 17/9, to name a few. It is to be appreciated that x is not limited to the examples given above and may be any fraction between 1 and 2. As will be described below in detail with respect to various examples, the value of x may be determined based on the specific subpixel arrangement to balance the driving load between the gate and source lines (e.g., the numbers of gate and source lines) and/or to simplify the wiring of gate lines and/or source lines on the display panel. It is to be appreciated that in this embodiment, the number of gate/scan channels provided by control logic 104 may be the same as or different from the number of gate lines, e.g., smaller than M due to demultiplexing.

In a second embodiment, to achieve the distributive-driving of display panel, the number of the gate lines is xM, wherein x is a fraction between 0 and 1. In other words, in average, subpixels in each of the M rows of pixels are operatively coupled to less than one gate line, and subpixels in more than one row of pixels are scanned by scan signal transmitted via one gate line. In other words, the number of the gate lines is smaller than the number of the rows of pixels. In this embodiment, x may be represented as p/q, wherein each of p and q is a positive integer, and q is larger than p. In some embodiments, p may be equal to 1. For example, subpixels in every q rows of pixels are operatively coupled to one gate line. In some embodiments, p may be larger than 1. For example, subpixels in every q rows of pixels are operatively coupled to p gate lines. As will be described below in detail with respect to various examples, the value of x may be determined based on the specific subpixel arrangement to balance the driving load between the gate and source lines (e.g., the numbers of gate and source lines) and/or to simplify the wiring of gate lines and/or source lines on the display panel. Consequently, compared with the example shown in FIG. 3, the number of gate lines (and the corresponding driving circuits, e.g., in gate driving circuit 202) can be reduced by a factor of (1−x) so that the scan period of each subpixel can be increased in each frame. The reduction of gate lines and corresponding driving circuits can also help the narrow-bezel or bezel-less designs of the display panel. It is to be appreciated that in this embodiment, the number of gate/scan channels in control logic 104 may be the same as or different from the number of gate lines, e.g., smaller than M due to demultiplexing.

Source driving circuit 204 in this embodiment is operatively coupled to active region 200 via a plurality of source lines (a.k.a. data lines) and configured to write display data 106 in a frame to the plurality of subpixels 201 based on at least some of control signals 108. For example, source driving circuit 204 may simultaneously apply a plurality of data signals to the plurality of source lines for the subpixels 201. That is, source driving circuit 204 may include one or more shift registers, digital-analog converters (DAC), multiplexers (MUX), and arithmetic circuit for controlling a timing of application of voltage to the source electrode of the switching transistor of each pixel circuit (i.e., during the scan period in each frame) and a magnitude of the applied voltage according to gradations of display data 106. It is to be appreciated that although one source driving circuit 204 is illustrated in FIG. 2A, in some embodiments, multiple source driving circuits may work in conjunction with each other to apply the data signals to the source lines for the subpixels 201.

Referring to the example illustrated in FIG. 3, the number of subpixels are k times of the number of pixels. In other words, the subpixels may be represented as MxNxk. In this example, the k subpixels constituting one pixel are operatively coupled to the same gate line, and the subpixels may be represented as MxkN. As a result, kN source lines (S1, ... Sk, S(k+1), ... S2k, ..., S(nk−1), ..., Skn) are provided for the array of pixels. For each pixel, k source lines are provided. Subpixels in each of the N columns of pixels are operatively coupled to k source lines and are written with k data signals transmitted via the k source lines. In other words, the number of the source lines is k times of the number of the columns of pixels (N). It is to be appreciated that in some embodiments, the source lines may be operatively coupled to the columns of subpixels in a "zigzag" manner. As a result, the number of the source lines may be more than k times of the number of the columns of pixels (N). For example, the number of the source lines may be kN+1. In the example of dual-gate driving, the k subpixels constituting one pixel are operatively coupled to two gate lines, and the subpixels may be represented as 2Mx(k/2)N. Thus, in average, subpixels in each of the N columns of pixels are operatively coupled to k/2 source lines and are written with data signals transmitted via the k/2 source lines. That is, the number of the gate lines is k/2 times of the number of the columns of pixels (N).

Referring back to FIG. 2A, in the first embodiment described above, to achieve the distributive-driving of display panel, the number of the source lines is yN, where y is k/x. The subpixels are represented as xMx(k/x)N. Each of xM and (k/x)N is a positive integer. In other words, in average, subpixels in each of the N columns of pixels are operatively coupled to k/x source lines and are written with data signals transmitted via the k/x source lines. Because x is between 1 and 2 in this embodiment, the number of the source lines ((k/x)N) is smaller than the number of the columns of pixels multiplied by the ratio k of the subpixels to the pixels (kN), but is larger than one half of the number of the columns of pixels multiplied by the ratio k ((k/2)N). Consequently, compared with the example shown in FIG. 3, the number of source lines can be reduced by a factor of (1-1/x) so that the manufacturing complexity and cost may be reduced. It is to be appreciated that the number of source/data channels in control logic 104 may be the same as or different from the number of source lines due to demultiplexing.

In the second embodiment described above, to achieve the distributive-driving of display panel, the number of the source lines is yN, where y is k/x. The subpixels are represented as xMx(k/x)N. Each of xM and (k/x)N is a positive integer. In other words, in average, subpixels in each of the N columns of pixels are operatively coupled to k/x source lines and are written with data signals transmitted via the k/x source lines. Because x is between 0 and 1 in this embodiment, the number of the source lines ((k/x)N) is larger than the number of the columns of pixels multiplied by the ratio k of the subpixels to the pixels (kN). As described below in detail, in some embodiments, the number of source/data channels provided by control logic 104 may be different from the number of source lines due to demultiplexing. That is, the number of data channels may maintain the same by the source-demultiplexing even the number of source lines increases due to the distributive-driving.

In general, to achieve the distributive-driving of display panel, the number of the gate lines may be xM, and the number of the source lines may be (k/x)N, wherein x is a fraction between 0 and 2, and each of xM and (k/x)N is a positive integer. x may be represented as p/q, wherein each of p and q is a positive integer, and p is smaller than 2q and does not equal to q. The value of x (i.e., p and q) may be determined based on the specific subpixel arrangement to balance the driving load between the gate and source lines (e.g., the numbers of gate and source lines) and/or to simplify the wiring of gate lines and/or source lines on the display panel. It is to be appreciated that in some embodiments, the number of gate lines and/or source lines may be more than xM and (k/x)N, respectively due to the "zigzag" connection of gate lines or source lines. For example, the number of source lines may be (k/x)N+1 or (k/x)N+2 when the source lines are operatively coupled to the columns of subpixels in a "zigzag" manner.

It is to be appreciated that x is not limited to a fraction between 0 and 2 as described above in the first and second embodiments and may be any positive fraction. In some embodiments, x may be a fraction larger than 2. In these embodiments, x may be represented as p/q, wherein each of p and q is a positive integer, and p is larger than 2q. In other words, in average, subpixels in each of the M rows of pixels are operatively coupled to more than two gate lines and are scanned by scan signals transmitted via the gate lines. That is, the number of the gate lines is larger than twice of the number of the rows of pixels. Also, in average, subpixels in each of the N columns of pixels are operatively coupled to k/x source lines and are written with data signals transmitted via the k/x source lines. Because x is a fraction larger than 2 in these embodiments, the number of the source lines ((k/x)N) is smaller than one half of the number of the columns of pixels multiplied by the ratio k of the subpixels to the pixels ((k/2)N). As described below in detail with respect to various examples, by setting x as a fraction, as opposed to an integer, the distributive-driving scheme of the present disclosure provides a great level of flexibility to be applied to any subpixel arrangement and/or achieve any desired rearrangement of gate lines and source lines.

Additionally or optionally, a light emitting driving circuit 206 may be included on the display panel in some embodiments in which each subpixel 201 on display 102 is a light emitting element, such as an OLED. Light emitting driving circuit 206 may be operatively coupled to active region 200 and configured to cause each subpixel to emit light in each frame based on at least some of control signals 108. For example, light emitting driving circuit 206 may receive part of control signals 108 including clock signals and enable signals (e.g., start emission STE signals) and generate a set of light emitting signals. Light emitting driving circuit 206 may include one or more shift registers. It is to be appreciated that although one light emitting driving circuit 206 is illustrated in FIG. 2A, in some embodiments, multiple light emitting driving circuits may work in conjunction with each other.

Figure 4:
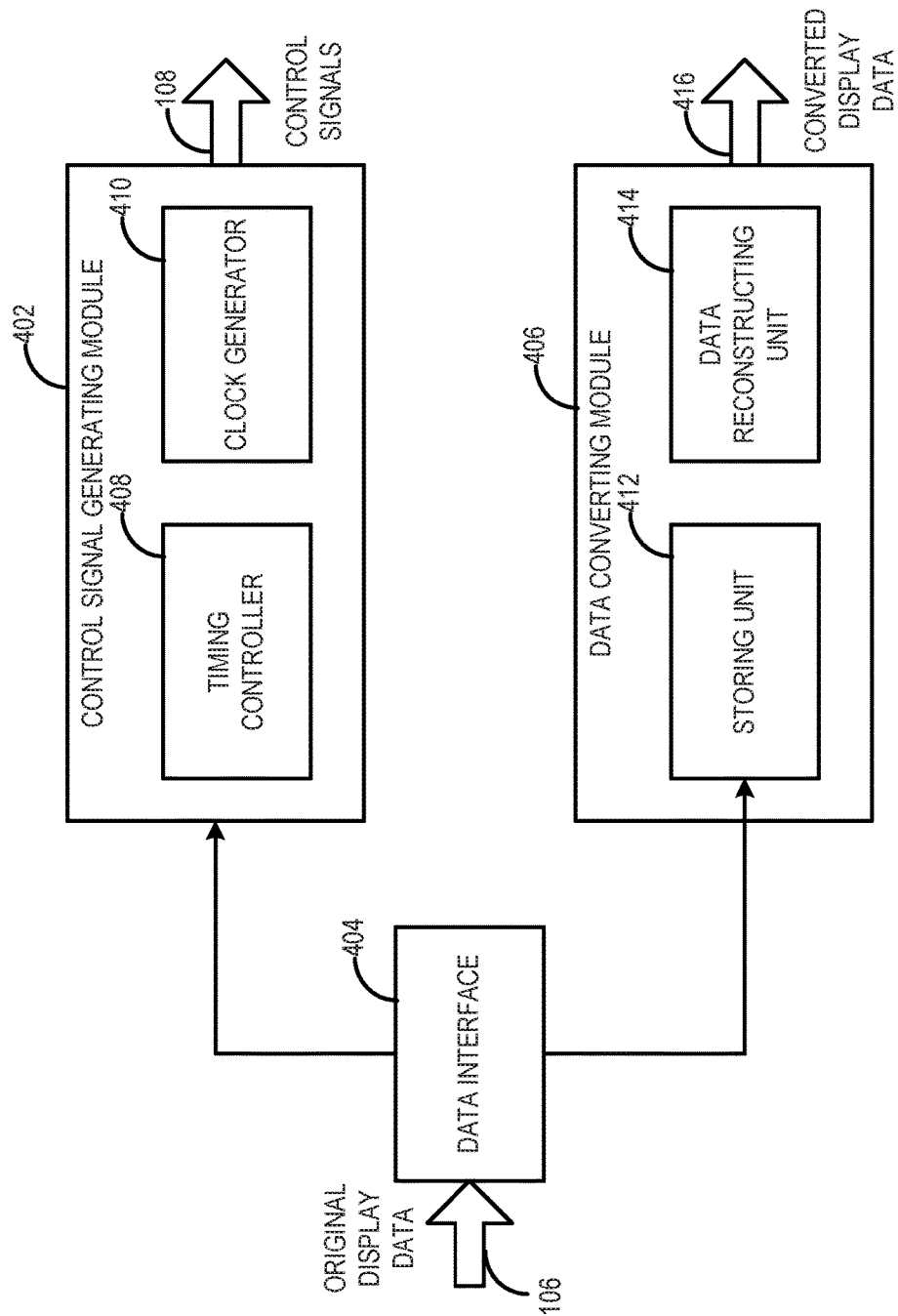
FIG. 4 is a block diagram illustrating one example of the control logic shown in FIG. 1 in accordance with an embodiment.

FIG. 4 is a block diagram illustrating one example of control logic 104 shown in FIG. 1 in accordance with an embodiment. In this embodiment, control logic 104 is an IC (but may alternatively include a state machine made of discrete logic and other components), which provides an interface function between processor 114/memory 116 and display 102. Control logic 104 may provide various control signals 108 with suitable voltage, current, timing, and demultiplexing, to cause display 102 to show the desired text or image. Control logic 104 may be an application-specific microcontroller and may include storage units such as RAM, flash memory, EEPROM, and/or ROM, which may store, for example, firmware and display fonts. In this embodiment, control logic 104 includes control signal generating module 402, data interface 404, and data converting module 406. Data interface 404 may be any display data interface, such as but not limited to, display serial interface (DSI), display pixel interface (DPI), and display bus interface (DBI) by the Mobile Industry Processor Interface (MIPI) Alliance, unified display interface (UDI), digital visual interface (DVI), high-definition multimedia interface (HDMI), and DisplayPort (DP). Data interface 404 is configured to receive display data 106 in multiple frames and any other control instructions 118 or test signals. Display data 106 may be received in consecutive frames at any frame rates, such as 30, 60, 72, 120, or 240 frames per second (fps). The received display data 106 is forwarded by data interface 404 to control signal generating module 402 and data converting module 406.

In this embodiment, control signal generating module 402 provides control signals 108 to gate driving circuit 202, source driving circuit 204, and light emitting driving circuit 206 to drive the subpixels in active region 200. Control signal generating module 402 may include TCON 408 and clock generator 410. TCON 408 may provide a variety of enable signals to gate driving circuit 202, source driving circuit 204, and light emitting driving circuit 206, respectively. Clock generator 410 may provide a variety of clock signals to gate driving circuit 202, source driving circuit 204, and light emitting driving circuit 206, respectively.

As described above, display data 106 may be programmed at the pixel-level. In each frame, display data 106 may include MxN pieces of pixel data corresponding to the array of pixels arranged in the M rows and N columns. Because of the distributive-driving of display data disclosed herein, the number of the source lines is no longer the same as the number of the columns of pixels multiplied by the ratio k (kN), i.e., the number of data channels (kN), but instead becomes (k/x)N. Thus, in some embodiments, display data 106 may be converted into converted display data 416 to accommodate the source line and gate line arrangement due to the specific distributive-driving scheme. In this embodiment, data converting module 406 provides converted display data 416 to source driving circuit 204 based on the source line and gate line arrangement on the display panel. In some embodiments, the timing of each data signal may be re-arranged according to the gate scanning order as well.

In this embodiment, data converting module 406 in this embodiment includes storing unit 412 and data reconstructing unit 414. Storing unit 412 is configured to receive display data 106 (original display data) and store display data 106 in each frame because the conversion of display data 106 may be performed at the frame-level. Storing unit 412 may be data latches or line buffers that temporally store display data 106 forwarded by data interface 404. Data reconstructing unit 414 is operatively coupled to storing unit 412 and configured to reconstruct, in each frame, display data 106 into corresponding converted display data 416 based on the source line and gate line arrangement on the display panel. Data reconstructing unit 414 of data converting module 406 may convert display data 106 into converted display data 416 based on the number of source lines ((k/x)N) according to the distributive-driving scheme. For example, any suitable sampling algorithms may be used by data reconstructing unit 414 to obtain converted display data 416 suitable for the (k/x)N source lines. It is to be appreciated that in some embodiments, data converting module 406 may not be included in control logic 104. Instead, processor 114 may adjust the timing of display data 106 to accommodate the source line and gate line arrangement on the display panel.

Figure 5A:
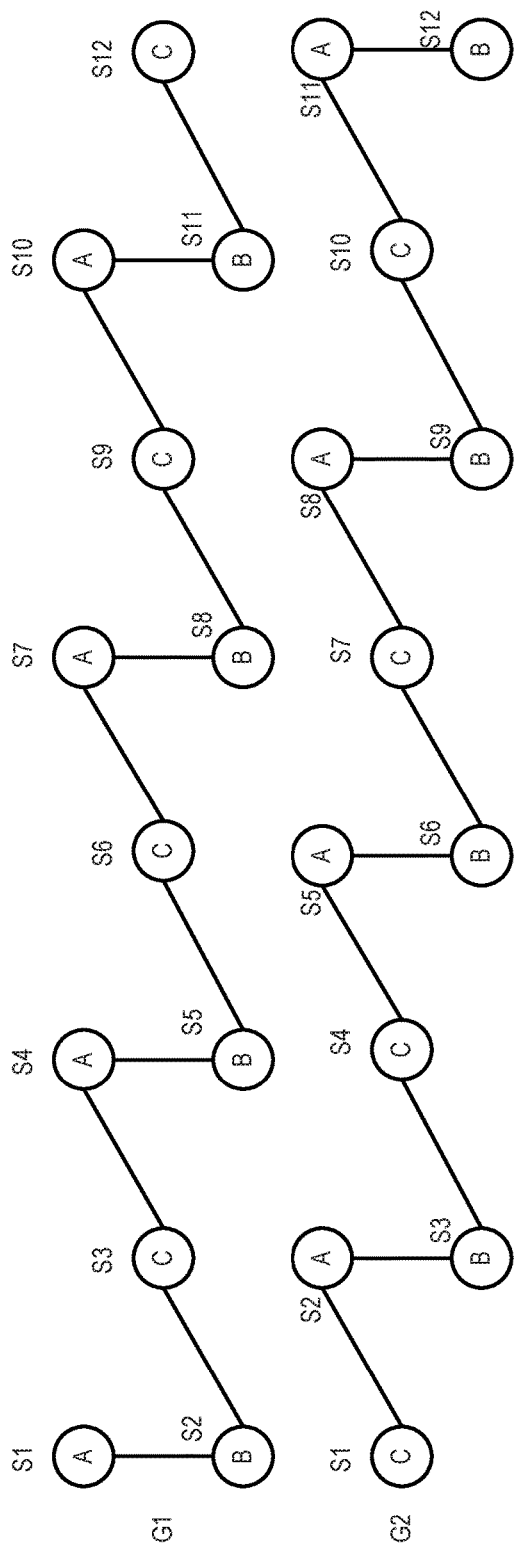
FIG. 5A is a depiction of an arrangement of gate lines and source lines for driving of subpixels in an example arrangement.

FIG. 5A is a depiction of an arrangement of gate lines and source lines for driving of subpixels in an example arrangement. In this example, the display panel includes an array of subpixels in a first color A, a second color B, and a third color B, arranged in rows and columns. A, B, and C denote three different colors, such as but not limited to, red, green, blue, yellow, cyan, magenta, or white. It is to be appreciated that the "array," "row," and "column" of subpixels may not correspond to the "array," "row," and "column" of pixels described above. Subpixels A, B, and C are alternatively arranged in every three adjacent rows of the array of subpixels. Every two adjacent rows of the array of subpixels are staggered with each other. In one example, a first subpixel in one of the A, B, and C colors and a second subpixel in the same color as the first subpixel may be by 3 units in the row/horizontal direction and 4 units in the column/vertical direction. The first and second subpixels may have a minimum distance among subpixels in the same color. Details of one example of the subpixel arrangements illustrated in this example are provided in U.S. Patent Application Publication No. 2016/0275846, having a title of "Subpixel Arrangement of Displays and Driving Circuit Thereof." It is to be appreciated that the relative spatial relationship (i.e., 3 units in the row/horizontal direction and 4 units in the column/vertical direction) is not limited to the example described above.

FIG. 5A illustrates a portion of the display panel including 24 subpixels. Depending on the ratio k of subpixels to pixels, the resolution of the display panel may be 4×2 (k=3) or 6×2 (k=2). Regardless, the array of pixels in this example is arranged in two rows and is operatively coupled to two gate lines G1 and G2. As to the source lines, the array of pixels may be arranged in four columns, each of which is operatively coupled to three source lines, or arranged in six columns, each of which is operatively coupled to two source lines. In any event, the array of pixels in this example is operatively coupled to 12 source lines S1 to S12. In other words, the number of the gate lines (2) is the same as the number of the rows of pixels (2), and the number of the source lines (12) is the same as the number of the columns of pixels multiplied by the ratio k (4×3 or 6×2).

Figure 5B:
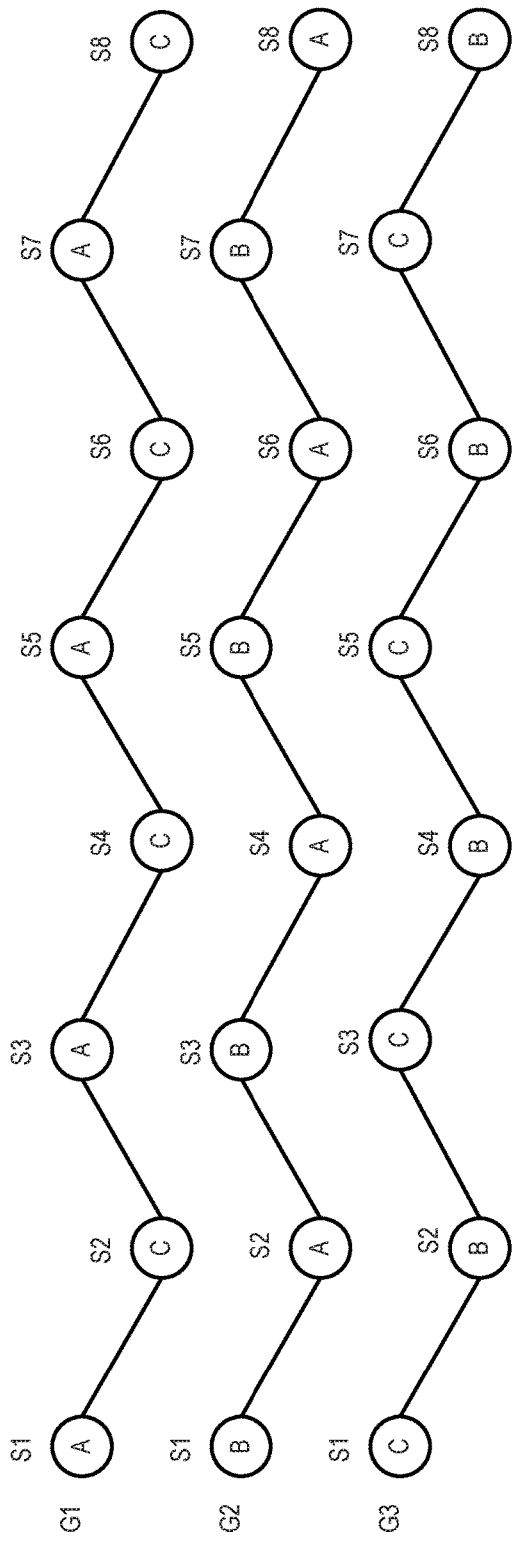
FIG. 5B is a depiction of an arrangement of gate lines and source lines for distributive-driving of subpixels in the example arrangement shown in FIG. 5A in accordance with an embodiment.

FIG. 5B is a depiction of an arrangement of gate lines and source lines for distributive-driving of subpixels in the example arrangement shown in FIG. 5A in accordance with an embodiment. In this embodiment, the display panel with the same subpixel arrangement illustrated in FIG. 5A is driven by a distributive-driving scheme to reduce the number of source lines. In this embodiment, the array of pixels is operatively coupled to three gate lines G1-G3, which is one and a half (3/2) times of the number of the rows of pixels (2). The number of the gate lines in this embodiment may be represented as (3/2)M, where x=3/2 (a fraction between 1 and 2) and M is the number of the rows of pixels. For example, every two rows of pixels are driven by gate driving circuit 202 via three gate lines. The scan period of each subpixel is reduced to two thirds (⅔) of the scan period of each subpixel in the example shown in FIG. 5A, which is greater than the scan period of the example using the dual-gate driving (i.e., one half (½) of the scan period of each subpixel in the example shown in FIG. 5A). It is to be appreciated that the gate lines shown in FIGS. 5A and 5B represent the logical connections between subpixels. The actual wiring of the gate lines may be understood by a person of ordinary skill in the art based on the logical connections and may be different in different examples.

As to the source lines, the array of pixels is operatively coupled to eight source lines S1-S8, which is two thirds (⅔) of the number of the columns of pixels multiplied by the ratio k (12). The number of the source lines in this embodiment may be represented as (⅔)kN, where k is the ratio of subpixels to pixels and N is the number of the columns of pixels. In other words, the number of the source lines in the example in FIG. 5A is reduced by one third (⅓) in the example in FIG. 5B by the distributive-driving of display panel disclosed herein. For example, for a WQHD display panel, the number of source lines can be reduced from 2880 to 1920. It is to be appreciated that in FIGS. 5A and 5B, subpixels labeled with the same source line number (e.g., S1, S2, S3, . . . , S8) are connected by the same corresponding source line. Compared with the example in FIG. 5A, the wiring of gate lines and source lines in this embodiment can be simplified as well.

Figure 5C:
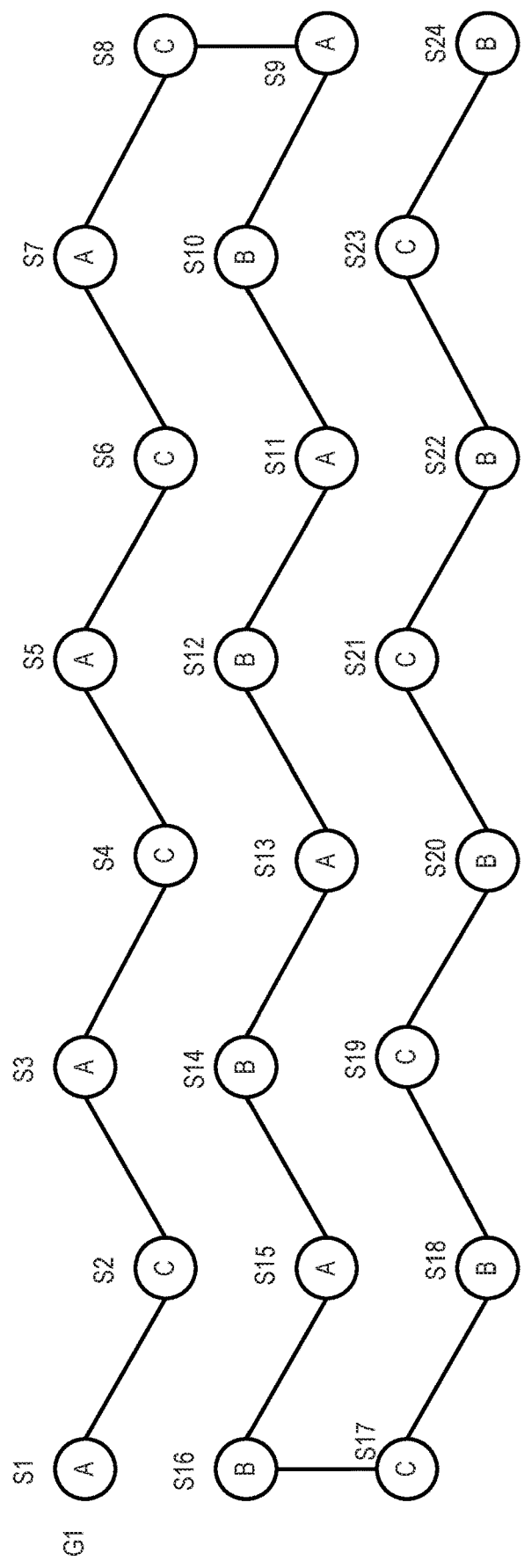
FIG. 5C is a depiction of another arrangement of gate lines and source lines for distributive-driving of subpixels in the example arrangement shown in FIG. 5A in accordance with an embodiment.

FIG. 5C is a depiction of another arrangement of gate lines and source lines for distributive-driving of subpixels in the example arrangement shown in FIG. 5A in accordance with an embodiment. In this embodiment, the display panel with the same subpixel arrangement illustrated in FIG. 5A is driven by a distributive-driving scheme to reduce the number of gate lines. In this embodiment, the array of pixels is operatively coupled to one gate line G1, which is one half (½) of the number of the rows of pixels (2). The number of the gate lines in this embodiment may be represented as (½)M, where x=½ (a fraction between 0 and 1) and M is the number of the rows of pixels. For example, every two rows of pixels are driven by gate driving circuit 202 via one gate line. In other words, the number of the gate lines in the example in FIG. 5A is reduced by one half (½) in the example in FIG. 5C by the distributive-driving of display panel disclosed herein. For example, for a WQHD display panel, the number of gate lines can be reduced from 2560 to 1280. The scan period of each subpixel may increase to twice of the scan period of each subpixel in the example shown in FIG. 5A. It is to be appreciated that the gate lines shown in FIG. 5C represent the logical connections between subpixels. The actual wiring of the gate lines may be understood by a person of ordinary skill in the art based on the logical connections and may be different in different examples.

As to the source lines, the array of pixels is operatively coupled to 24 source lines S1-S24, which is twice of the number of the columns of pixels multiplied by the ratio k (12). The number of the source lines in this embodiment may be represented as 2 kN, where k is the ratio of subpixels to pixels and N is the number of the columns of pixels. It is to be appreciated that in FIG. 5C, subpixels labeled with the same source line number (e.g., S1, S2, S3, . . . , S24) are connected by the same corresponding source line.

Figure 5D:
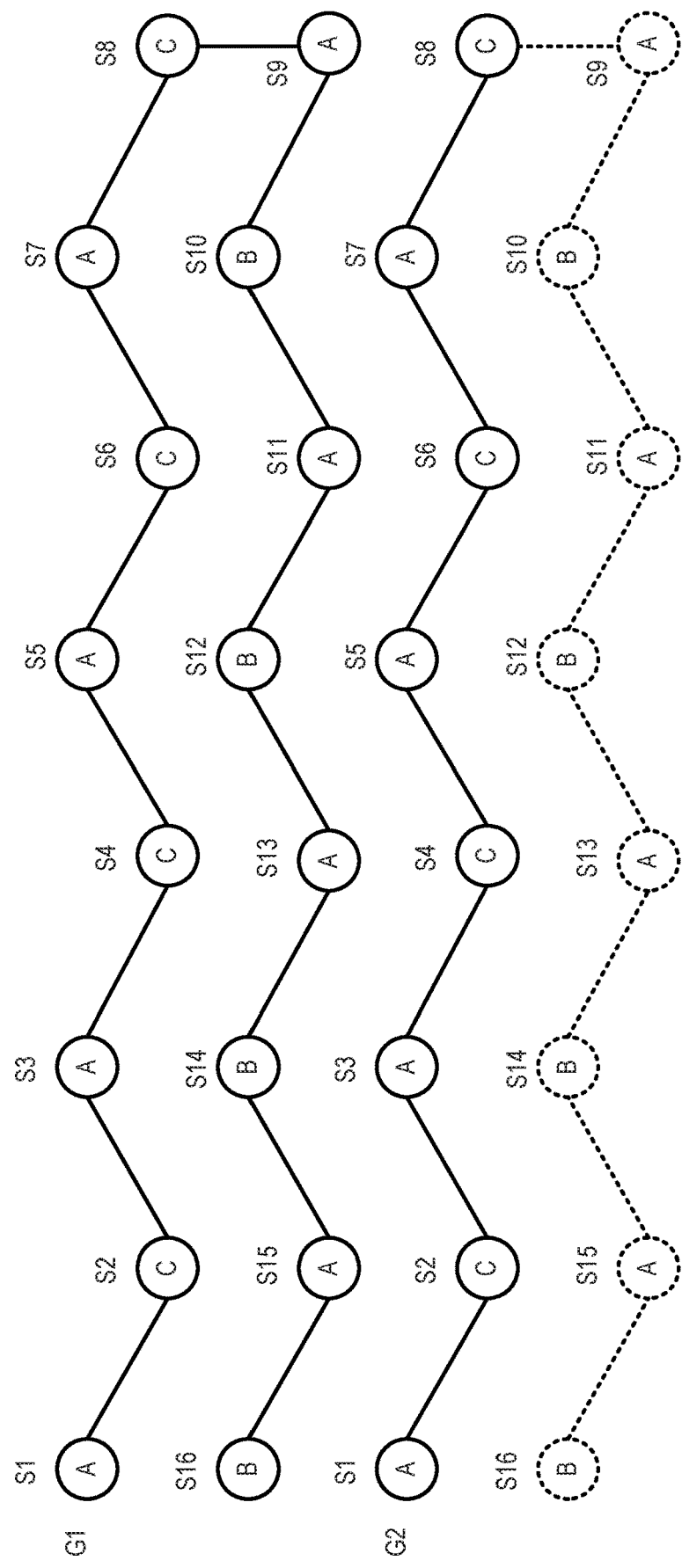
FIG. 5D is a depiction of still another arrangement of gate lines and source lines for distributive-driving of subpixels in the example arrangement shown in FIG. 5A in accordance with an embodiment.

FIG. 5D is a depiction of still another arrangement of gate lines and source lines for distributive-driving of subpixels in the example arrangement shown in FIG. 5A in accordance with an embodiment. In this embodiment, the display panel with the same subpixel arrangement illustrated in FIG. 5A is driven by a distributive-driving scheme to reduce the number of gate lines. In this embodiment, the array of pixels is operatively coupled to one gate line G1 and one half of gate line G2, which is three fourths (¾) of the number of the rows of pixels (2). The number of the gate lines in this embodiment may be represented as (¾)M, where x=¾ (a fraction between 0 and 1) and M is the number of the rows of pixels. For example, every four rows of pixels are driven by gate driving circuit 202 via three gate lines. In other words, the number of the gate lines in the example in FIG. 5A is reduced by one fourth (¼) in the example in FIG. 5D by the distributive-driving of display panel disclosed herein. For example, for a WQHD display panel, the number of gate lines can be reduced from 2560 to 1920. The scan period of each subpixel may increase to four thirds (4/3) of the scan period of each subpixel in the example shown in FIG. 5A. It is to be appreciated that the gate lines shown in FIG. 5D represent the logical connections between subpixels. The actual wiring of the gate lines may be understood by a person of ordinary skill in the art based on the logical connections and may be different in different examples.

As to the source lines, the array of pixels is operatively coupled to 16 source lines S1-S16, which is four thirds (4/3) of the number of the columns of pixels multiplied by the ratio k (12). The number of the source lines in this embodiment may be represented as (4/3)kN, where k is the ratio of subpixels to pixels and N is the number of the columns of pixels. It is to be appreciated that in FIG. 5D, subpixels labeled with the same source line number (e.g., S1, S2, S3, . . . , S16) are connected by the same corresponding source line.

Figure 6A:
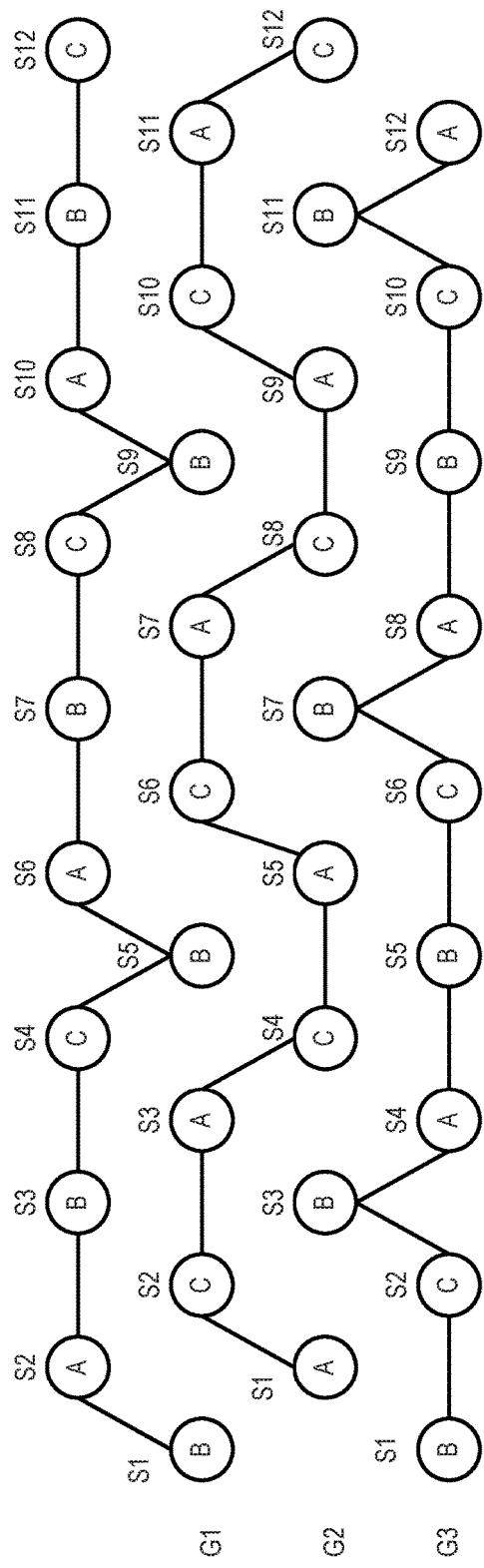
FIG. 6A is a depiction of an arrangement of gate lines and source lines for driving of subpixels in another example arrangement.

FIG. 6A is a depiction of an arrangement of gate lines and source lines for driving of subpixels in another example arrangement. In this example, the display panel includes an array of subpixels in a first color A, a second color B, and a third color B, arranged in rows and columns. A, B, and C denote three different colors, such as but not limited to, red, green, blue, yellow, cyan, magenta, or white. It is to be appreciated that the "array," "row," and "column" of subpixels may not correspond to the "array," "row," and "column" of pixels as described above. In one example, the array of subpixels may be considered as the rotation of the array of subpixels in FIG. 5A by 90 degrees. In another example, the array of subpixels includes a first subpixel repeating group represented by A-B-C and a second subpixel repeating group represented by C-A-B that are alternatively applied to two adjacent rows of the array of subpixels. The two adjacent rows of the array of subpixels are staggered with each other. Details of one example of the subpixel arrangements illustrated in this example are provided in U.S. Patent Application Publication No. 2015/0339969, having a title of "Method and Apparatus for Subpixel Rendering."

FIG. 6A illustrates a portion of the display panel including 36 subpixels. Depending on the ratio k of subpixels to pixels, the resolution of the display panel may be 4×3 (k=3) or 6×3 (k=2). Regardless, the array of pixels in this example is arranged in three rows and is operatively coupled to three gate lines G1-G3. As to the source lines, the array of pixels may be arranged in four columns, each of which is operatively coupled to three source lines, or arranged in six columns, each of which is operatively coupled to two source lines. In any event, the array of pixels in this example is operatively coupled to 12 source lines S1 to S12. In other words, the number of the gate lines (3) is the same as the number of the rows of pixels (3), and the number of the source lines (12) is the same as the number of the columns of pixels multiplied by the ratio k (4×3 or 6×2).

Figure 6B:
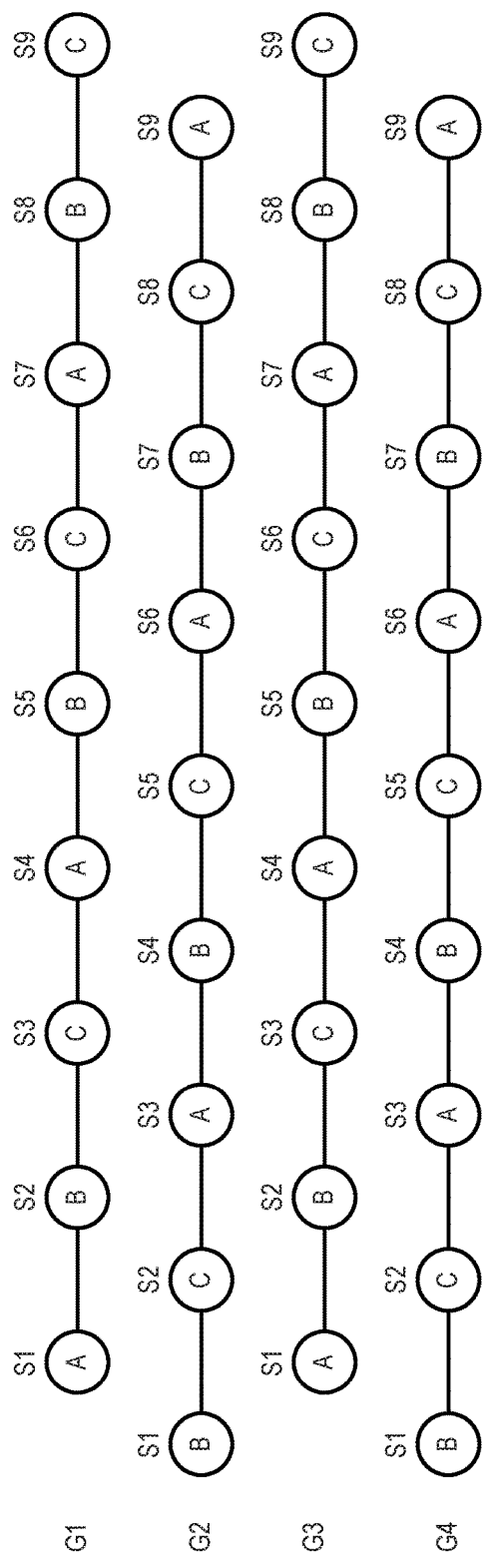
FIG. 6B is a depiction of an arrangement of gate lines and source lines for distributive-driving of subpixels in the example arrangement shown in FIG. 6A in accordance with an embodiment.

FIG. 6B is a depiction of an arrangement of gate lines and source lines for distributive-driving of subpixels in the example arrangement shown in FIG. 6A in accordance with an embodiment. In this embodiment, the display panel with the same subpixel arrangement illustrated in FIG. 6A is driven by a distributive-driving scheme to reduce the number of source lines. In this embodiment, the array of pixels is operatively coupled to four gate lines G1-G4, which is four thirds (4/3) of the number of the rows of pixels (3). The number of the gate lines in this embodiment may be represented as (4/3)M, where x=4/3 (a fraction between 1 and 2) and M is the number of the rows of pixels. For example, every three rows of pixels are driven by gate driving circuit 202 via four gate lines. The scan period of each subpixel is reduced to three fourth (3/4) of the scan period of each subpixel in the example shown in FIG. 6A, which is greater than the scan period of the example using the dual-gate driving (i.e., one half (1/2) of the scan period of each subpixel in the example shown in FIG. 6A). It is to be appreciated that the gate lines shown in FIGS. 6A and 6B represent the logical connections between subpixels. The actual wiring of the gate lines may be understood by a person of ordinary skill in the art based on the logical connections and may be different in different examples.

As to the source lines, the array of pixels is operatively coupled to nine source lines S1-S9, which is three fourth (3/4) of the number of the columns of pixels multiplied by the ratio k (12). The number of the source lines in this embodiment may be represented as (3/4)kN, where k is the ratio of subpixels to pixels and N is the number of the columns of pixels. In other words, the number of the source lines in the example in FIG. 6A is reduced by one fourth (1/4) in the example in FIG. 6B by the distributive-driving of display panel disclosed herein. For example, for a WQHD display panel, the number of source lines can be reduced from 2880 to 2160. It is to be appreciated that in FIGS. 6A and 6B, subpixels labeled with the same source line number (e.g., S1, S2, S3, . . . , S9) are connected by the same corresponding source line. Compared with the example in FIG. 6A, the wiring of gate lines and source lines in this embodiment can be simplified as well.

Figure 6C:
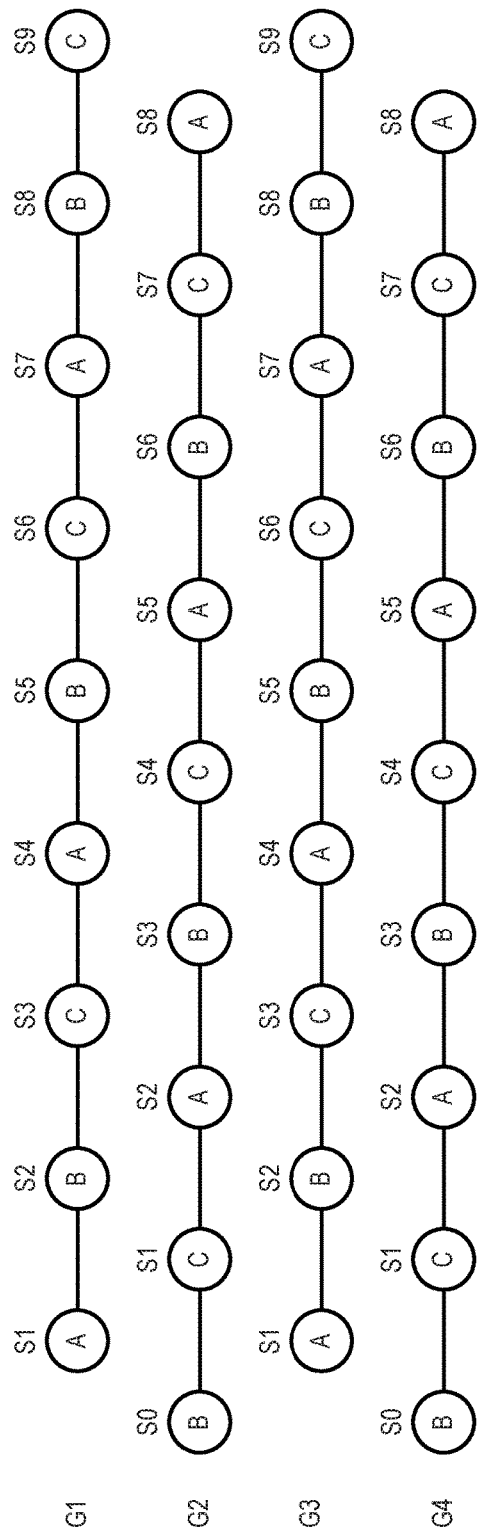
FIG. 6C is a depiction of another arrangement of gate lines and source lines for distributive-driving of subpixels in the example arrangement shown in FIG. 6A in accordance with an embodiment.

As described above, in some embodiments, the source lines may be operatively coupled to the columns of subpixels in a "zigzag" manner as shown, for example, in FIG. 6C. FIG. 6C is similar to FIG. 6B except that the source lines are operatively coupled to the columns of subpixels in a "zigzag" manner. For example, in each odd row (e.g., 1 and 3), the source lines start from S1, while in each even row (e.g., 2 and 4), the source lines start from S0. As a result, the number of source lines in FIG. 6C is one more than the number of source lines in the embodiment of FIG. 6B (i.e., is (3k/4)N+1). Nevertheless, a person of ordinary skill in the art would understand that even with the "zigzag" manner of source line arrangement, the number of source lines on a display panel with distributive-driving is substantially (k/x)N.

Figure 6D:
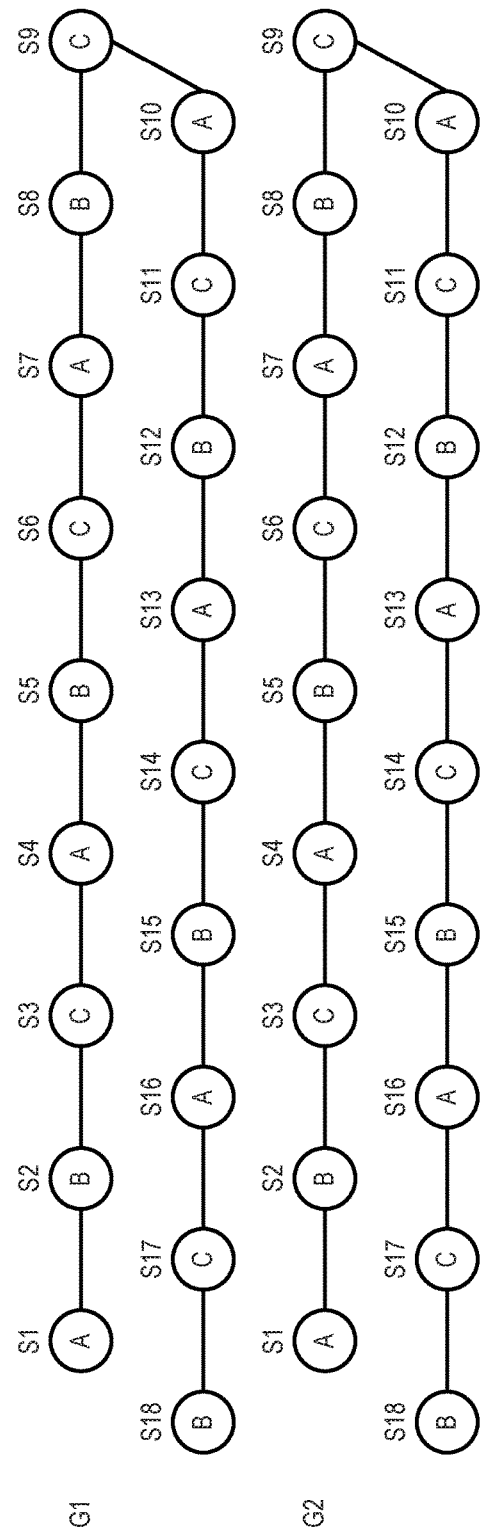
FIG. 6D is a depiction of still another arrangement of gate lines and source lines for distributive-driving of subpixels in the example arrangement shown in FIG. 6A in accordance with an embodiment.

FIG. 6D is a depiction of another arrangement of gate lines and source lines for distributive-driving of subpixels in the example arrangement shown in FIG. 6A in accordance with an embodiment. In this embodiment, the display panel with the same subpixel arrangement illustrated in FIG. 6A is driven by a distributive-driving scheme to reduce the number of gate lines. In this embodiment, the array of pixels is operatively coupled to two gate lines G1 and G2, which is two thirds (2/3) of the number of the rows of pixels (3). The number of the gate lines in this embodiment may be represented as (2/3)M, where x=2/3 (a fraction between 0 and 1) and M is the number of the rows of pixels. For example, every three rows of pixels are driven by gate driving circuit 202 via two gate lines. In other words, the number of the gate lines in the example in FIG. 6A is reduced by one third (1/3) in the example in FIG. 6D by the distributive-driving of display panel disclosed herein. For example, for a WQHD display panel, the number of gate lines can be reduced from 3840 to 2560. The scan period of each subpixel may increase to one and a half (3/2) times of the scan period of each subpixel in the example shown in FIG. 6A. It is to be appreciated that the gate lines shown in FIG. 6D represent the logical connections between subpixels. The actual wiring of the gate lines may be understood by a person of ordinary skill in the art based on the logical connections and may be different in different examples.

As to the source lines, the array of pixels is operatively coupled to 18 source lines S1-S18, which is one and a half (3/2) times of the number of the columns of pixels multiplied by the ratio k (12). The number of the source lines in this embodiment may be represented as (3/2)kN, where k is the ratio of subpixels to pixels and N is the number of the columns of pixels. It is to be appreciated that in FIG. 6D, subpixels labeled with the same source line number (e.g., S1, S2, S3, . . . , S18) are connected by the same corresponding source line.

Figure 7A:
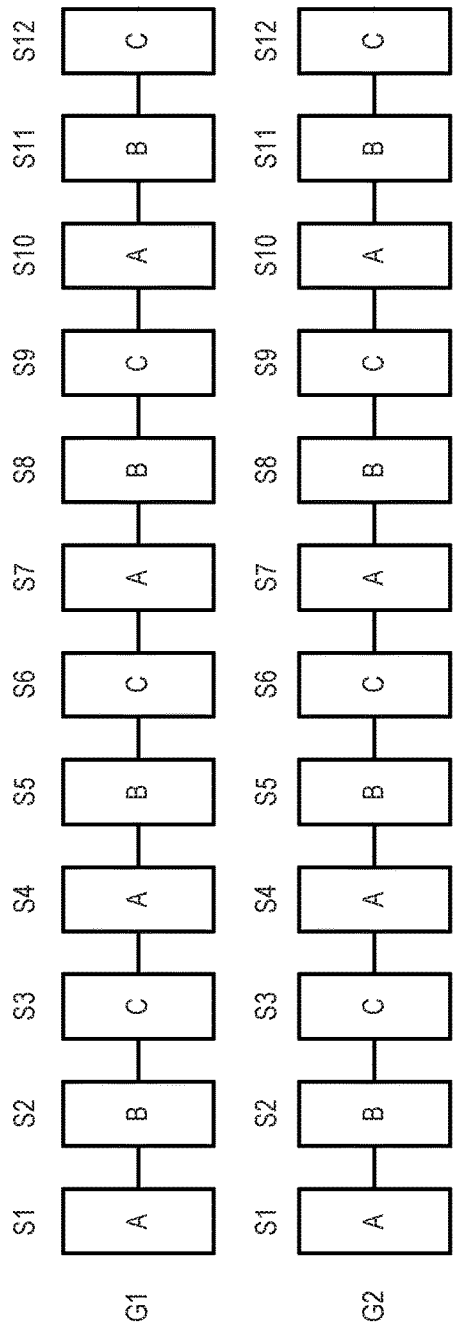
FIG. 7A is a depiction of an arrangement of gate lines and source lines for driving of subpixels in still another example arrangement.

FIG. 7A is a depiction of an arrangement of gate lines and source lines for driving of subpixels in still another example arrangement. In this example, the display panel includes an array of subpixels in a first color A, a second color B, and a third color C, arranged in rows and columns. A, B, and C denote three different colors, such as but not limited to, red, green, blue, yellow, cyan, magenta, or white. It is to be appreciated that the "array," "row," and "column" of subpixels may not correspond to the "array," "row," and "column" of pixels as described above. In this example, the array of subpixels includes a subpixel repeating group represented by A-B-C, which repeats itself in both the row/horizontal direction and the column/vertical direction. One example of such subpixel arrangement is known as the "real-RGB" or "RGB strips" arrangement.

FIG. 7A illustrates a portion of the display panel including 24 subpixels. Depending on the ratio k of subpixels to pixels, the resolution of the display panel may be 4×2 (k=3, e.g., the adjacent A, B, and C subpixels constitute one pixel) or 6×2 (k=2). Regardless, the array of pixels in this example is arranged in two rows and is operatively coupled to two gate lines G1-G2. As to the source lines, the array of pixels may be arranged in four columns, each of which is operatively coupled to three source lines, or arranged in six columns, each of which is operatively coupled to two source lines. In any event, the array of pixels in this example is operatively coupled to 12 source lines S1 to S12. In other words, the number of the gate lines (2) is the same as the number of the rows of pixels (2), and the number of the source lines (12) is the same as the number of the columns of pixels multiplied by the ratio k (4×3 or 6×2).

Figure 7B:
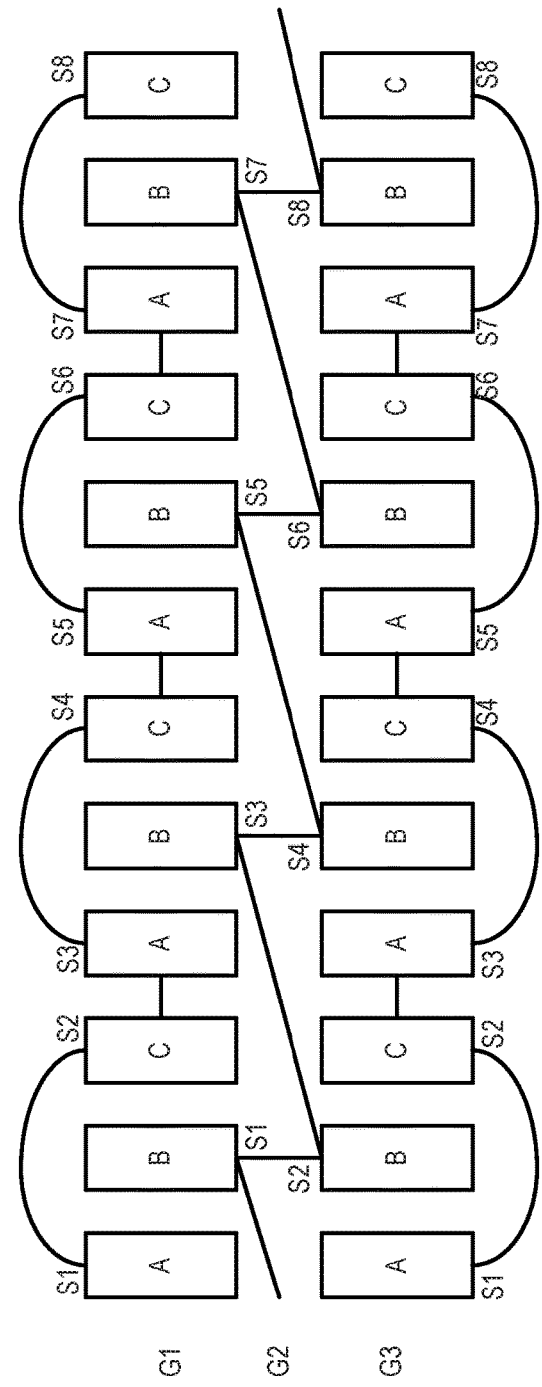
FIG. 7B is a depiction of an arrangement of gate lines and source lines for distributive-driving of subpixels in the example arrangement shown in FIG. 7A in accordance with an embodiment.

FIG. 7B is a depiction of an arrangement of gate lines and source lines for distributive-driving of subpixels in the example arrangement shown in FIG. 7A in accordance with an embodiment. In this embodiment, the display panel with the same subpixel arrangement illustrated in FIG. 7A is driven by a distributive-driving scheme to reduce the number of source lines. In this embodiment, the array of pixels is operatively coupled to three gate lines G1-G3, which is one and a half (3/2) times of the number of the rows of pixels (2). The number of the gate lines in this embodiment may be represented as (3/2)M, where x=3/2 (a fraction between 1 and 2) and M is the number of the rows of pixels. For example, every two rows of pixels are driven by gate driving circuit 202 via three gate lines. The scan period of each subpixel is reduced to two thirds (⅔) of the scan period of each subpixel in the example shown in FIG. 7A, which is greater than the scan period of the examples using the dual-gate driving (i.e., one half (½) of the scan period of each subpixel in the example shown in FIG. 7A). It is to be appreciated that the gate lines shown in FIGS. 7A and 7B represent the logical connections between subpixels. The actual wiring of the gate lines may be understood by a person of ordinary skill in the art based on the logical connections and may be different in different examples.

As to the source lines, the array of pixels is operatively coupled to eight source lines S1-S8, which is two thirds (⅔) of the number of the columns of pixels multiplied by the ratio k (12). The number of the source lines in this embodiment may be represented as (⅔)kN, where k is the ratio of subpixels to pixels and N is the number of the columns of pixels. In other words, the number of the source lines in the example in FIG. 7A is reduced by one third (⅓) in the example in FIG. 7B by the distributive-driving of display panel disclosed herein. For example, for a WQHD display panel, the number of source lines can be reduced from 2880 to 1920. It is to be appreciated that in FIGS. 7A and 7B, subpixels labeled with the same source line number (e.g., S1, S2, S3, . . . , S8) are connected by the same corresponding source line.

FIG. 7C is a depiction of another arrangement of gate lines and source lines for distributive-driving of subpixels in the example arrangement shown in FIG. 7A in accordance with an embodiment. In this embodiment, the display panel with the same subpixel arrangement illustrated in FIG. 7A is driven by a distributive-driving scheme to reduce the number of gate lines. In this embodiment, the array of pixels is operatively coupled to one gate line G1, which is one half (½) of the number of the rows of pixels (2). The number of the gate lines in this embodiment may be represented as (½)M, where x=½ (a fraction between 0 and 1) and M is the number of the rows of pixels. For example, every two rows of pixels are driven by gate driving circuit 202 via one gate line. In other words, the number of the gate lines in the example in FIG. 7A is reduced by one half (½) in the example in FIG. 7C by the distributive-driving of display panel disclosed herein. For example, for a WQHD display panel, the number of gate lines can be reduced from 2560 to 1280. The scan period of each subpixel may increase to twice of the scan period of each subpixel in the example shown in FIG. 7A. It is to be appreciated that the gate lines shown in FIG. 7C represent the logical connections between subpixels. The actual wiring of the gate lines may be understood by a person of ordinary skill in the art based on the logical connections and may be different in different examples.

As to the source lines, the array of pixels is operatively coupled to 24 source lines S1-S24, which is twice of the number of the columns of pixels multiplied by the ratio k (12). The number of the source lines in this embodiment may be represented as 2 kN, where k is the ratio of subpixels to pixels and N is the number of the columns of pixels. It is to be appreciated that in FIG. 7C, subpixels labeled with the same source line number (e.g., S1, S2, S3, . . . , S24) are connected by the same corresponding source line.

FIG. 7D is a depiction of still another arrangement of gate lines and source lines for distributive-driving of subpixels in the example arrangement shown in FIG. 7A in accordance with an embodiment. In this embodiment, the display panel with the same subpixel arrangement illustrated in FIG. 7A is driven by a distributive-driving scheme to reduce the number of gate lines. In this embodiment, the array of pixels is operatively coupled to one gate line G1 and one third (⅓) of gate line G2, which is two thirds (⅔) of the number of the rows of pixels (2). For example, in some rows of subpixels (pixels), e.g., the even rows, one half of the subpixels are operatively coupled to one gate line, while the other half of the subpixels are operatively coupled to another gate line. The number of the gate lines in this embodiment may be represented as (⅔)M, where x=⅔ (a fraction between 0 and 1) and M is the number of the rows of pixels. For example, every three rows of pixels are driven by gate driving circuit 202 via two gate lines. In other words, the number of the gate lines in the example in FIG. 7A is reduced by one third (⅓) in the example in FIG. 7D by the distributive-driving of display panel disclosed herein. For example, for a WQHD display panel, the number of gate lines can be reduced from 3840 to 2560. The scan period of each subpixel may increase to one and a half (3/2) times of the scan period of each subpixel in the example shown in FIG. 7A. It is to be appreciated that the gate lines shown in FIG. 7D represent the logical connections between subpixels. The actual wiring of the gate lines may be understood by a person of ordinary skill in the art based on the logical connections and may be different in different examples.

As to the source lines, the array of pixels is operatively coupled to 18 source lines S1-S18, which one and a half (3/2) times of the number of the columns of pixels multiplied by the ratio k (12). The number of the source lines in this embodiment may be represented as (3/2)kN, where k is the ratio of subpixels to pixels and N is the number of the columns of pixels. It is to be appreciated that in FIG. 7D, subpixels labeled with the same source line number (e.g., S1, S2, S3, . . . , S18) are connected by the same corresponding source line.

FIG. 8A is a depiction of an arrangement of gate lines and source lines for driving of subpixels in yet another example arrangement. In this example, the display panel includes an array of subpixels in a first color A, a second color B, and a third color B, arranged in rows and columns. A, B, and C denote three different colors, such as but not limited to, red, green, blue, yellow, cyan, magenta, or white. It is to be appreciated that the "array," "row," and "column" of subpixels may not correspond to the "array," "row," and "column" of pixels as described above. In this example, the array of subpixels includes a first subpixel repeating group represented by A-B-C-B and a second subpixel repeating group represented by C-B-A-B that are alternatively applied to two adjacent rows of the array of subpixels. The two adjacent rows of the array of subpixels are aligned with each other. The number of subpixels B on the display panel is twice of the number of the subpixels A or C. One example of such subpixel arrangement is known as the "PenTile RGBG" arrangement in which A denotes red (R) subpixels, B denotes green (G) subpixels, and C denotes blue (B) subpixels. In the "PenTile RGBG" arrangement, the sizes of subpixels R, G, and B may be different. For example, the size of subpixels R or subpixels B may be larger than that of subpixels G.

FIG. 8A illustrates a portion of the display panel including 24 subpixels. Depending on the ratio k of subpixels to pixels, the resolution of the display panel may be 4×2 (k=3, e.g., the adjacent A, B, and C subpixels constitute one pixel) or 6×2 (k=2). Regardless, the array of pixels in this example is arranged in two rows and is operatively coupled to two gate lines G1-G2. As to the source lines, the array of pixels may be arranged in four columns, each of which is operatively coupled to three source lines, or arranged in six columns, each of which is operatively coupled to two source lines. In any event, the array of pixels in this example is operatively coupled to 12 source lines S1 to S12. In other words, the number of the gate lines (2) is the same as the number of the rows of pixels (2), and the number of the source lines (12) is the same as the number of the columns of pixels multiplied by the ratio k (4×3 or 6×2).

FIG. 8B is a depiction of an arrangement of gate lines and source lines for distributive-driving of subpixels in the example arrangement shown in FIG. 8A in accordance with an embodiment. In this embodiment, the display panel with the same subpixel arrangement illustrated in FIG. 8A is driven by a distributive-driving scheme to reduce the number of source lines. In this embodiment, the array of pixels is operatively coupled to three gate lines G1-G3, which is one and a half (3/2) times of the number of the rows of pixels (2). The number of the gate lines in this embodiment may be represented as (3/2)M, where x=3/2 (a fraction between 1 and 2) and M is the number of the rows of pixels. For example, every two rows of pixels are driven by gate driving circuit 202 via three gate lines. The scan period of each subpixel is reduced to two thirds (2/3) of the scan period of each subpixel in the example shown in FIG. 8A, which is greater than the scan period of the example using the dual-gate driving (i.e., one half (½) of the scan period of each subpixel in the example shown in FIG. 8A). It is to be appreciated that the gate lines shown in FIGS. 8A and 8B represent the logical connections between subpixels. The actual wiring of the gate lines may be understood by a person of ordinary skill in the art based on the logical connections and may be different in different examples.

As to the source lines, the array of pixels is operatively coupled to eight source lines S1-S8, which is two thirds (2/3) of the number of the columns of pixels multiplied by the ratio k (12). The number of the source lines in this embodiment may be represented as (2/3)kN, where k is the ratio of subpixels to pixels and N is the number of the columns of pixels. In other words, the number of the source lines in the example in FIG. 8A is reduced by one third (1/3) in the example in FIG. 8B by the distributive-driving of display panel disclosed herein. For example, for a WQHD display panel, the number of source lines can be reduced from 2880 to 1920. It is to be appreciated that in FIGS. 8A and 8B, subpixels labeled with the same source line number (e.g., S1, S2, S3, . . . , S8) are connected by the same corresponding source line.

Figure 8C:
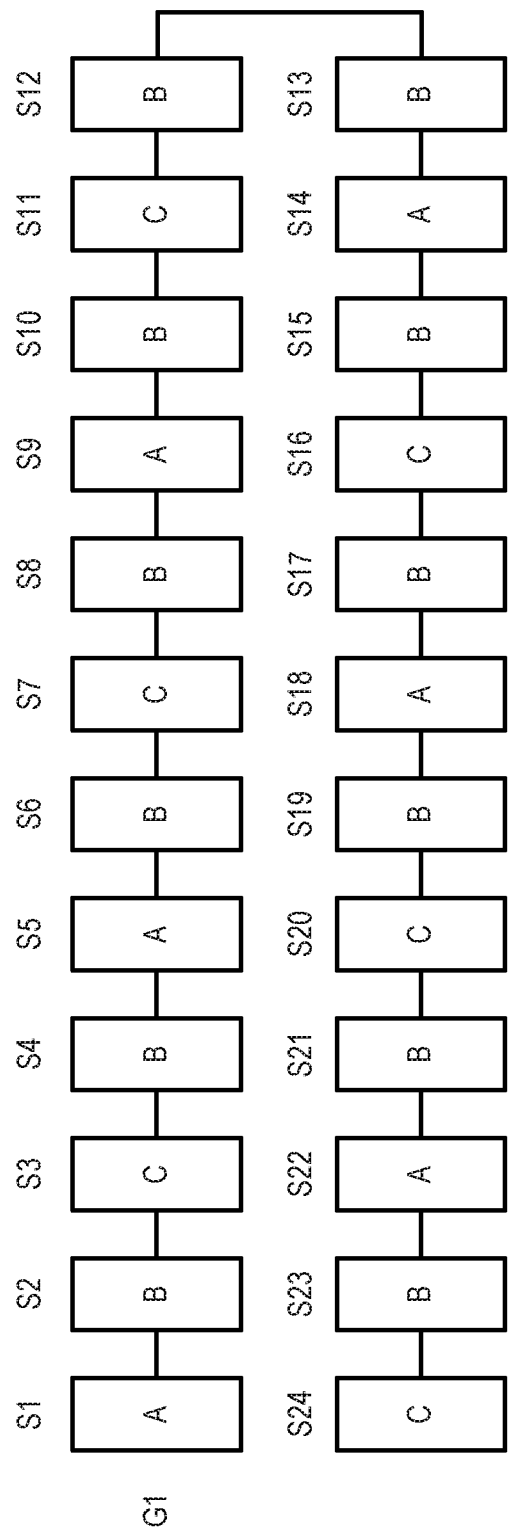
FIG. 8C is a depiction of another arrangement of gate lines and source lines for distributive-driving of subpixels in the example arrangement shown in FIG. 8A in accordance with an embodiment.

FIG. 8C is a depiction of another arrangement of gate lines and source lines for distributive-driving of subpixels in the example arrangement shown in FIG. 8A in accordance with an embodiment. In this embodiment, the display panel with the same subpixel arrangement illustrated in FIG. 8A is driven by a distributive-driving scheme to reduce the number of gate lines. In this embodiment, the array of pixels is operatively coupled to one gate line G1, which is one half (½) of the number of the rows of pixels (2). The number of the gate lines in this embodiment may be represented as (½)M, where x=½ (a fraction between 0 and 1) and M is the number of the rows of pixels. For example, every two rows of pixels are driven by gate driving circuit 202 via one gate line. In other words, the number of the gate lines in the example in FIG. 8A is reduced by one half (½) in the example in FIG. 8C by the distributive-driving of display panel disclosed herein. For example, for a WQHD display panel, the number of gate lines can be reduced from 2560 to 1280. The scan period of each subpixel may increase to twice of the scan period of each subpixel in the example shown in FIG. 8A. It is to be appreciated that the gate lines shown in FIG. 8C represent the logical connections between subpixels. The actual wiring of the gate lines may be understood by a person of ordinary skill in the art based on the logical connections and may be different in different examples.

As to the source lines, the array of pixels is operatively coupled to 24 source lines S1-S24, which is twice of the number of the columns of pixels multiplied by the ratio k (12). The number of the source lines in this embodiment may be represented as 2 kN, where k is the ratio of subpixels to pixels and N is the number of the columns of pixels. It is to be appreciated that in FIG. 8C, subpixels labeled with the same source line number (e.g., S1, S2, S3, . . . , S24) are connected by the same corresponding source line.

FIG. 9A is a depiction of an arrangement of gate lines and source lines for driving of subpixels in yet another example arrangement. In this example, the display panel includes an array of subpixels in a first color A, a second color B, and a third color B, arranged in rows and columns. A, B, and C denote three different colors, such as but not limited to, red, green, blue, yellow, cyan, magenta, or white. It is to be appreciated that the "array," "row," and "column" of subpixels may not correspond to the "array," "row," and "column" of pixels as described above. In this example, the subpixel arrangement is similar to the example in FIG. 8A except that the subpixels B are in separate rows from the subpixels A and C. The subpixel arrangement in FIG. 9A may be considered as a special case of the subpixel arrangement in FIG. 8A because the arrangement of gate lines and source lines for the subpixel arrangement in FIG. 9A is the same as that in FIG. 8A. The size of subpixels B may be smaller than that of the subpixels A or C. One example of such subpixel arrangement is known as the "PenTile diamond" arrangement. It is to be appreciated that the sizes and shapes of subpixels A, B, and C are not limited to the example shown in FIG. 9A.

FIG. 9A illustrates a portion of the display panel including 24 subpixels. Depending on the ratio k of subpixels to pixels, the resolution of the display panel may be 4×2 (k=3, e.g., the adjacent A, B, and C subpixels constitute one pixel) or 6×2 (k=2). Regardless, the array of pixels in this example is arranged in two rows and is operatively coupled to two gate lines G1-G2. As to the source lines, the array of pixels may be arranged in four columns, each of which is operatively coupled to three source lines, or arranged in six columns, each of which is operatively coupled to two source lines. In any event, the array of pixels in this example is operatively coupled to 12 source lines S1 to S12. In other words, the number of the gate lines (2) is the same as the number of the rows of pixels (2), and the number of the source lines (12) is the same as the number of the columns of pixels multiplied by the ratio k (4×3 or 6×2).

FIG. 9B is a depiction of an arrangement of gate lines and source lines for distributive-driving of subpixels in the example arrangement shown in FIG. 9A in accordance with an embodiment. In this embodiment, the display panel with the same subpixel arrangement illustrated in FIG. 9A is driven by a distributive-driving scheme to reduce the number of source lines. In this embodiment, the array of pixels is operatively coupled to three gate lines G1-G3, which is one and a half (3/2) times of the number of the rows of pixels (2). The number of the gate lines in this embodiment may be represented as (3/2)M, where x=3/2 (a fraction between 1 and 2) and M is the number of the rows of pixels. For example, every two rows of pixels are driven by gate driving circuit 202 via three gate lines. The scan period of each subpixel is reduced to two thirds (⅔) of the scan period of each subpixel in the example shown in FIG. 9A, which is greater than the scan period of the example using the dual-gate driving (i.e., one half (½) of the scan period of each subpixel in the example shown in FIG. 9A). It is to be appreciated that the gate lines shown in FIGS. 9A and 9B represent the logical connections between subpixels. The actual wiring of the gate lines may be understood by a person of ordinary skill in the art based on the logical connections and may be different in different examples.

As to the source lines, the array of pixels is operatively coupled to eight source lines S1-S8, which is two thirds (⅔) of the number of the columns of pixels multiplied by the ratio k (12). The number of the source lines in this embodiment may be represented as (⅔)kN, where k is the ratio of subpixels to pixels and N is the number of the columns of pixels. In other words, the number of the source lines in the example in FIG. 9A is reduced by one third (⅓) in the example in FIG. 9B by the distributive-driving of display panel disclosed herein. For example, for a WQHD display panel, the number of source lines can be reduced from 2880 to 1920. It is to be appreciated that in FIGS. 9A and 9B, subpixels labeled with the same source line number (e.g., S1, S2, S3, . . . , S8) are connected by the same corresponding source line.

Compared with the example in FIG. 8B, the arrangement of gate lines and source lines for distributive-driving of subpixels in FIG. 9B is not the same, although the original arrangement of gate lines and source lines is the same for both examples in FIGS. 9A and 9B. That is, for the same arrangement of gate lines and source lines of subpixels, different arrangements of gate lines and source lines for distributive-driving of subpixels can be achieved. It is also noted that x equals to 3/2 in both examples of FIGS. 8B and 9B. That is, to achieve the same ratio (x) of distributive-driving of subpixels, different arrangements of gate lines and source lines for distributive-driving of subpixels may be applied as well.

Figure 9C:
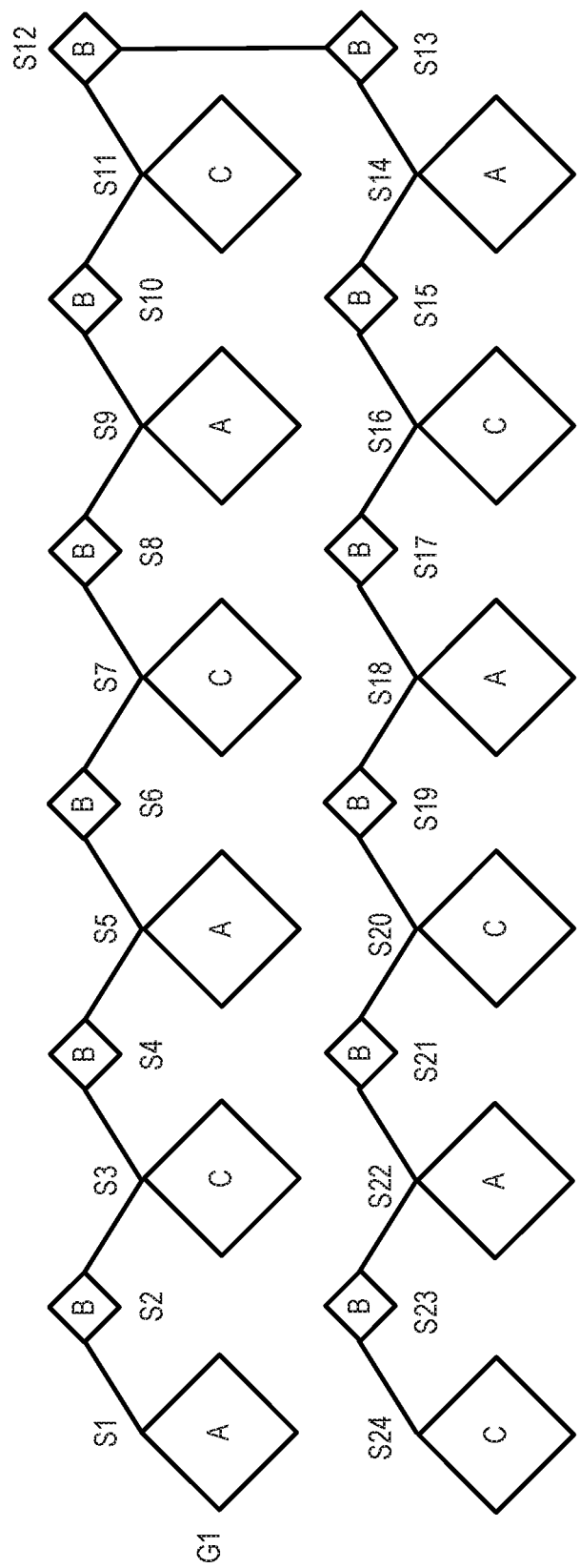
FIG. 9C is a depiction of another arrangement of gate lines and source lines for distributive-driving of subpixels in the example arrangement shown in FIG. 9A in accordance with an embodiment.

FIG. 9C is a depiction of another arrangement of gate lines and source lines for distributive-driving of subpixels in the example arrangement shown in FIG. 9A in accordance with an embodiment. In this embodiment, the display panel with the same subpixel arrangement illustrated in FIG. 9A is driven by a distributive-driving scheme to reduce the number of gate lines. In this embodiment, the array of pixels is operatively coupled to one gate line G1, which is one half (½) of the number of the rows of pixels (2). The number of the gate lines in this embodiment may be represented as (½)M, where x=½ (a fraction between 0 and 1) and M is the number of the rows of pixels. For example, every two rows of pixels are driven by gate driving circuit 202 via one gate line. In other words, the number of the gate lines in the example in FIG. 9A is reduced by one half (½) in the example in FIG. 9C by the distributive-driving of display panel disclosed herein. For example, for a WQHD display panel, the number of gate lines can be reduced from 2560 to 1280. The scan period of each subpixel may increase to twice of the scan period of each subpixel in the example shown in FIG. 9A. It is to be appreciated that the gate lines shown in FIG. 9C represent the logical connections between subpixels. The actual wiring of the gate lines may be understood by a person of ordinary skill in the art based on the logical connections and may be different in different examples.

As to the source lines, the array of pixels is operatively coupled to 24 source lines S1-S24, which is twice of the number of the columns of pixels multiplied by the ratio k (12). The number of the source lines in this embodiment may be represented as 2 kN, where k is the ratio of subpixels to pixels and N is the number of the columns of pixels. It is to be appreciated that in FIG. 9C, subpixels labeled with the same source line number (e.g., S1, S2, S3, . . . , S24) are connected by the same corresponding source line.

It is to be appreciated that the examples illustrated in FIGS. 5B, 6B, 6C, 7B, 8B, and 9B are for the illustrative purpose only and do not limit the distributive-driving of display panel to only the subpixel arrangements illustrated in these examples. It is also to be appreciated that even for the same subpixel arrangement disclosed in any of the examples illustrated in FIGS. 5B, 6B, 6C, 7B, 8B, and 9B, any other suitable distributive-driving schemes may be applied as well. For example, the value of x is not limited to 3/2 and 4/3 as disclosed in the examples illustrated in FIGS. 5B, 6B, 6C, 7B, 8B, and 9B, and can be any fraction between 1 and 2. That is, every q rows of pixels may be driven by gate driving circuit 202 via p gate lines as long as p is larger than q but smaller than 2q. Also, the value of k is not limited to 2 and 3 as disclosed in the examples illustrated in FIGS. 5B, 6B, 6C, 7B, 8B, and 9B, and can be any other positive integer larger than 1, such as 4.

Similarly, it is to be appreciated that the examples illustrated in FIGS. 5C, 5D, 6D, 7C, 7D, 8C, and 9C are for the illustrative purpose only and do not limit the distributive-driving of display panel to only the subpixel arrangements illustrated in these examples. It is also to be appreciated that even for the same subpixel arrangement disclosed in any of the examples illustrated in FIGS. 5C, 5D, 6D, 7C, 7D, 8C, and 9C, any other suitable distributive-driving schemes may be applied as well. For example, the value of x is not limited to ½, ⅔, and ¾ as disclosed in the examples illustrated in FIGS. 5C, 5D, 6D, 7C, 7D, 8C, and 9C, and can be any fraction between 0 and 1. That is, every q rows of pixels may be driven by gate driving circuit 202 via p gate lines as long as q is larger than p. Also, the value of k is not limited to 2 and 3 as disclosed in the examples illustrated in FIGS. 5C, 5D, 6D, 7C, 7D, 8C, and 9C, and can be any other positive integer larger than 1, such as 4. It is to be appreciated that in some embodiments, k may be a positive fraction. That is, the number of subpixels may not be an integer multiple of the number of pixels.

Figure 10:
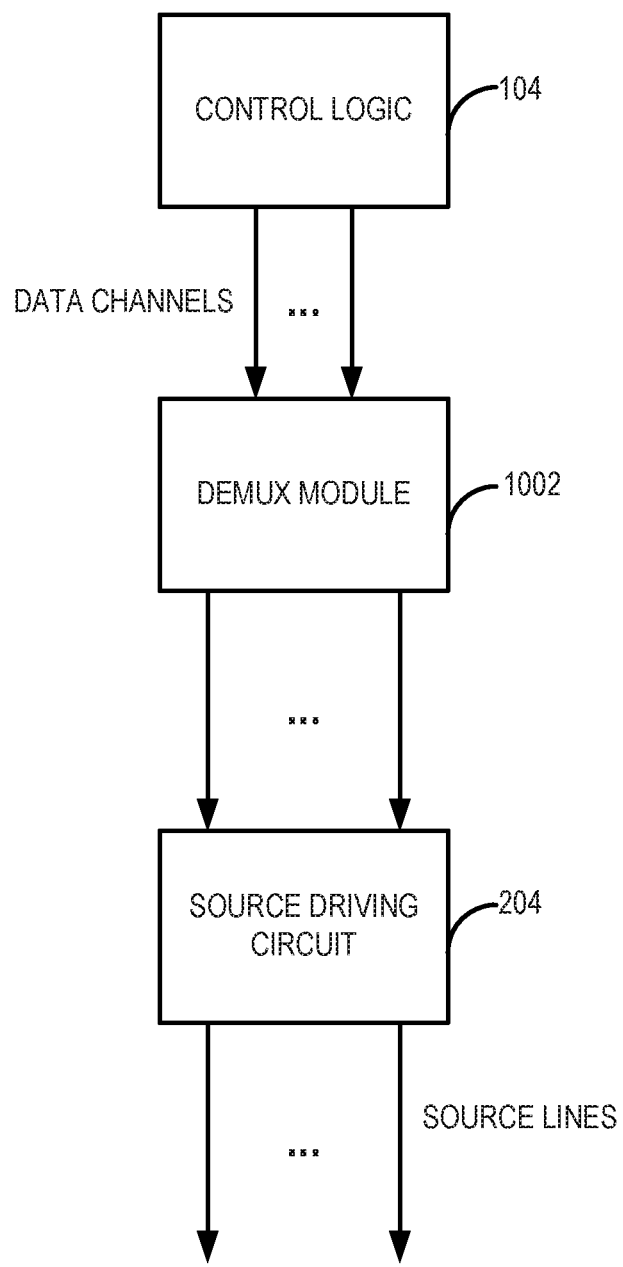
FIG. 10 is a block diagram illustrating a demultiplexing module operatively coupled to the control logic and source driving circuit shown in FIG. 2A in accordance with an embodiment.

FIG. 10 is a block diagram illustrating a demultiplexing module 1002 operatively coupled to control logic 104 and source driving circuit 204 shown in FIG. 2A in accordance with an embodiment. In some embodiments, such as illustrated with respect to FIGS. 5C, 5D, 6D, 7C, 7D, 8C, and 9C, the number of gate lines can be reduced by the distributive-driving to reduce the corresponding circuits (e.g., in the gate driving circuit 202) and the scan period of each subpixel. On the other hand, the number of source lines are increased accordingly. To avoid increasing the number of data channels provided by control logic 104, a source-demultiplexing scheme may be applied in conjunction with the distributive-driving scheme. As shown in FIG. 10, control logic 104 may provide display data, either in its original form (e.g., original display data 106) or in its converted form (e.g., converted display data 416) in multiple data channels, for example, kN data channels via kN output pins. In this embodiment, demultiplexing module 1002 may be operatively coupled to the data channels and route the display data to multiple source lines (e.g., (k/x)N source lines) via source driving circuit 204. In the embodiments in which x is between 0 and 1, the number of the data channels (e.g., kN) is smaller than the number of the source lines (e.g., (k/x)N). Thus, demultiplexing module 1002 may cause display data in each data channel to be provided to multiple source lines in different clock periods. It is to be appreciated that although the source-demultiplexing scheme may cause the scan period of each subpixel to be reduced, because the number of gate lines is reduced by the distributive-driving as well, the overcall scan period of each subpixel may remain the same. Consequently, the distributive-driving with source-demultiplexing can optimize the timing specification of display panels and help to achieve the narrow-bezel or bezel-less designs of display panels. In some embodiments, demultiplexing module 1002, control logic 104, source driving circuit 204, gate driving circuit 202, and light emitting driving circuit 206 may be manufactured in a COF package, such as a single-layer COF package.

Figure 11:
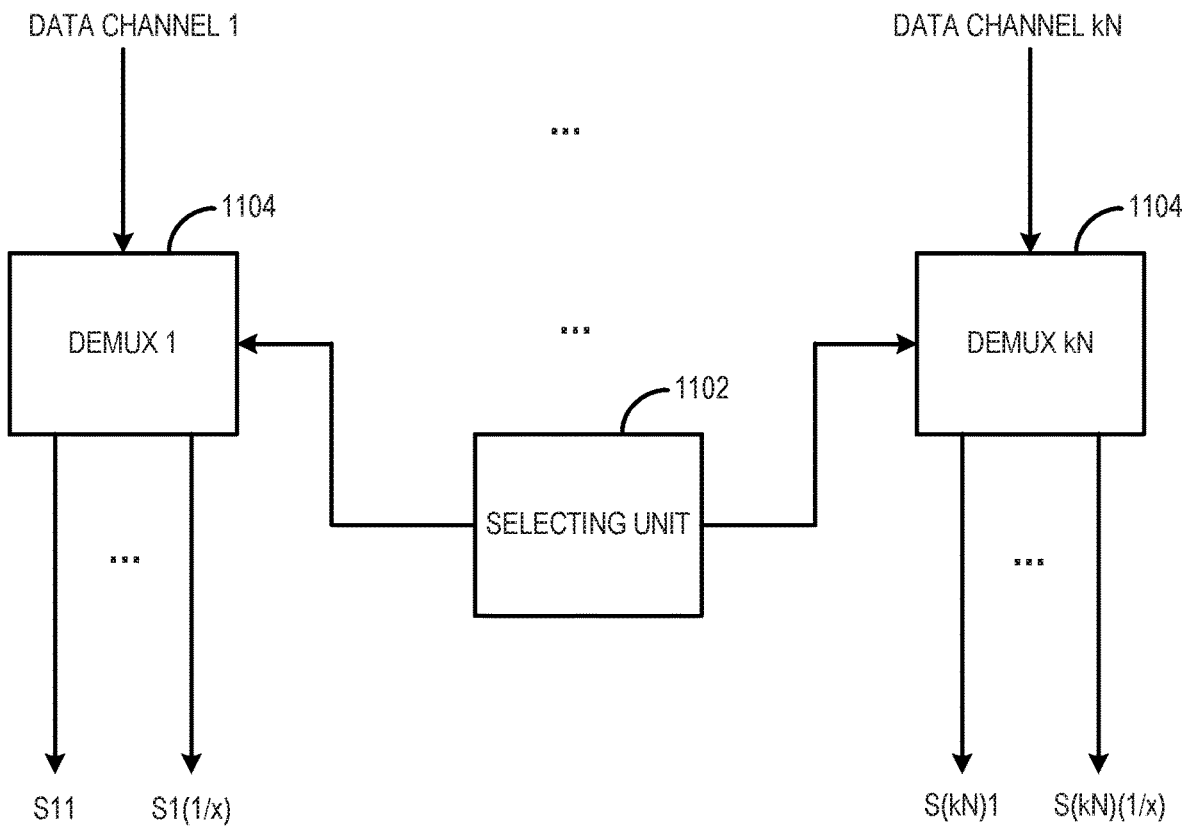
FIG. 11 is a block diagram illustrating one example of the demultiplexing module shown in FIG. 10 in accordance with an embodiment.

FIG. 11 is a block diagram illustrating one example of demultiplexing module 1002 shown in FIG. 10 in accordance with an embodiment. In this embodiment, demultiplexing module 1002 includes a selecting unit 1102 and kN demultiplexers 1104. Selecting unit 1102 may be part of display 102, such as on the display panel, or may be part of control logic 104. Selecting unit 1102 may be configured to generate kN sets of selecting signals for kN demultiplexers 1104, respectively. Each demultiplexer 1104 may be part of source driving circuit 204 and operatively coupled to selecting unit 1102 to receive the respective set of selecting signal. Depending on the value of x, each demultiplexer 1104 may be any suitable 1:X demultiplexer, where X=(1/x) and x is a fraction between 0 and 1. Each demultiplexer 1104 may be operatively coupled to one data channel and 1/x source lines. Each demultiplexer 1104 may be configured to receive input display data from one of the kN data channels and provide output display data to one of the 1/x source lines at each clock period based on the respective set of selecting signals from selecting unit 1102.

In this embodiment, DEMUX 1 may be operatively coupled to data channel 1 and receive input display data from data channel 1. DEMUX 1 may be operatively coupled to 1/x source lines S11 to S1(1/x) and provide output display data to one of the source lines S11 to S1(1/x) at each clock period based on the respective set of selecting signals from selecting unit 1102. Similarly, DEMUX kN may be operatively coupled to data channel kN and receive input display data from data channel kN. DEMUX kN may be operatively coupled to 1/x source lines S(kN)1 to S(kN)(1/x) and provide output display data to one of the source lines S(kN)1 to S(kN)(1/x) at each clock period based on the respective set of selecting signals from selecting unit 1102. For example, when x equals to ½, each of DEMUX 1 to DEMUX kN may be a 1:2 demultiplexer that can provide output display data to one of the two source lines at each clock period.

Figure 12A:
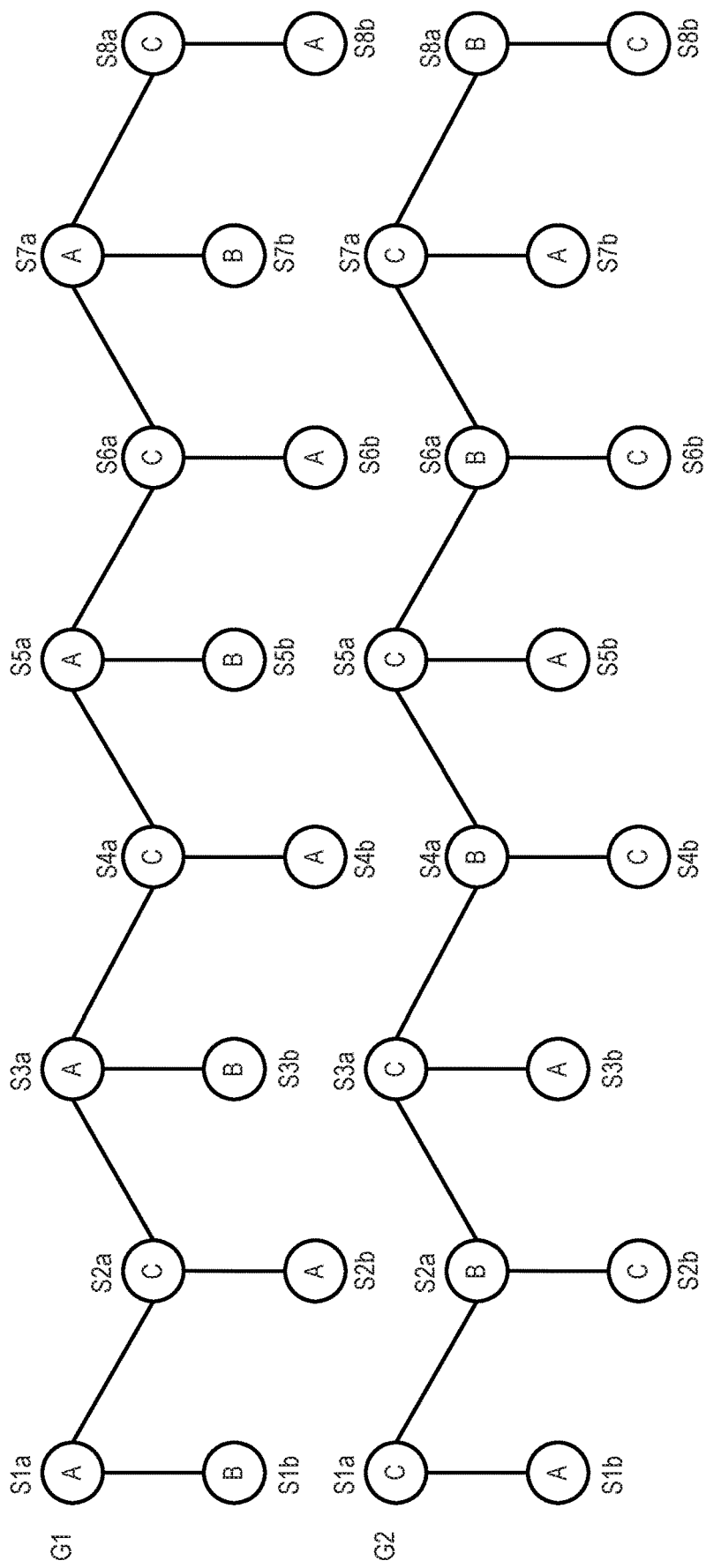
FIG. 12A is a depiction of an arrangement of gate lines and source lines for distributive-driving with source-demultiplexing of subpixels in the example arrangement shown in FIG. 5A in accordance with an embodiment.

FIG. 12A is a depiction of an arrangement of gate lines and source lines for distributive-driving with source-demultiplexing of subpixels in the example arrangement shown in FIG. 5A in accordance with an embodiment. The arrangement of gate lines and source lines for distributive-driving in FIG. 12A is similar to the example shown in FIG. 5D in which the number of gate lines is decreased by the factor x equal to ¾ compared with the number of rows of pixels, while the number of source lines is increased by the factor 1/x equals to 4/3 compared with the number of columns of pixels. It is to be appreciated that although the connections representing the gate lines shown in FIG. 12A appear to be different from those in FIG. 5D, the logical connections of gate lines between subpixels are the same in FIG. 12A and FIG. 5D.

Different from the example in FIG. 5D, the source-demultiplexing scheme is applied in this embodiment. Thus, two source lines may be operatively coupled to a 1:2 demultiplexer and receive display data from the same data channel in different clock periods. For example, the source lines S1a and S1b may receive display data from data channel 1, and the source lines S8a and S8b may receive display data from data channel 8. As a result, only one half of the number of data channels may be needed compared with the number of source lines on the display panel. In FIG. 12A, subpixels labeled with the same source line number (e.g., S1a, S1b, . . . , S8a, S8b) are connected by the same corresponding source line.

Figure 12B:
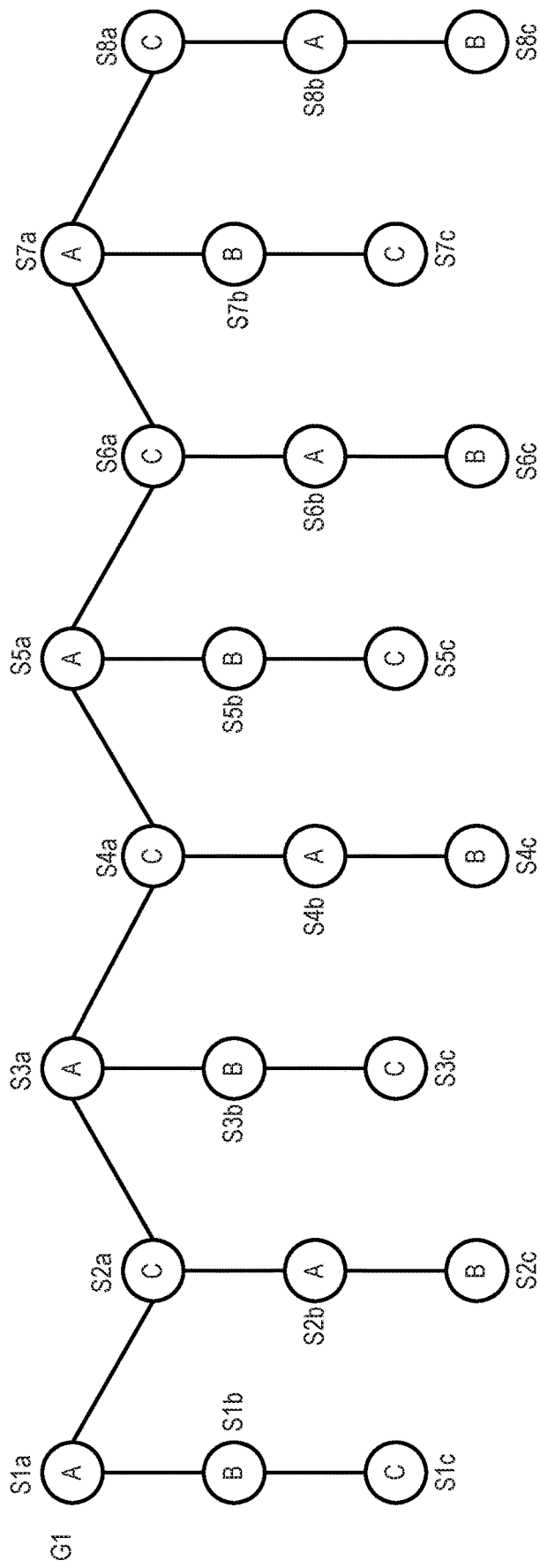
FIG. 12B is a depiction of another arrangement of gate lines and source lines for distributive-driving with source-demultiplexing of subpixels in the example arrangement shown in FIG. 5A in accordance with an embodiment.
Figure 13A:
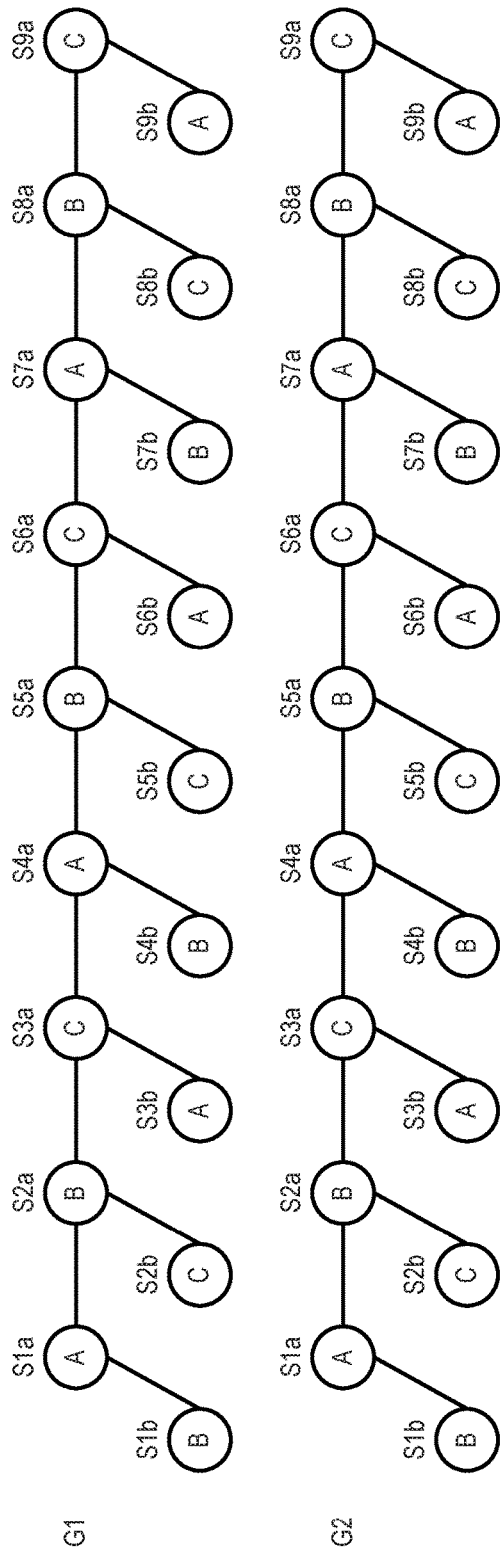
FIGS. 13A-13D are depictions of an arrangement of gate lines and source lines for distributive-driving with source-demultiplexing of subpixels in the example arrangement shown in FIG. 6A in accordance with an embodiment.
Figure 13B:
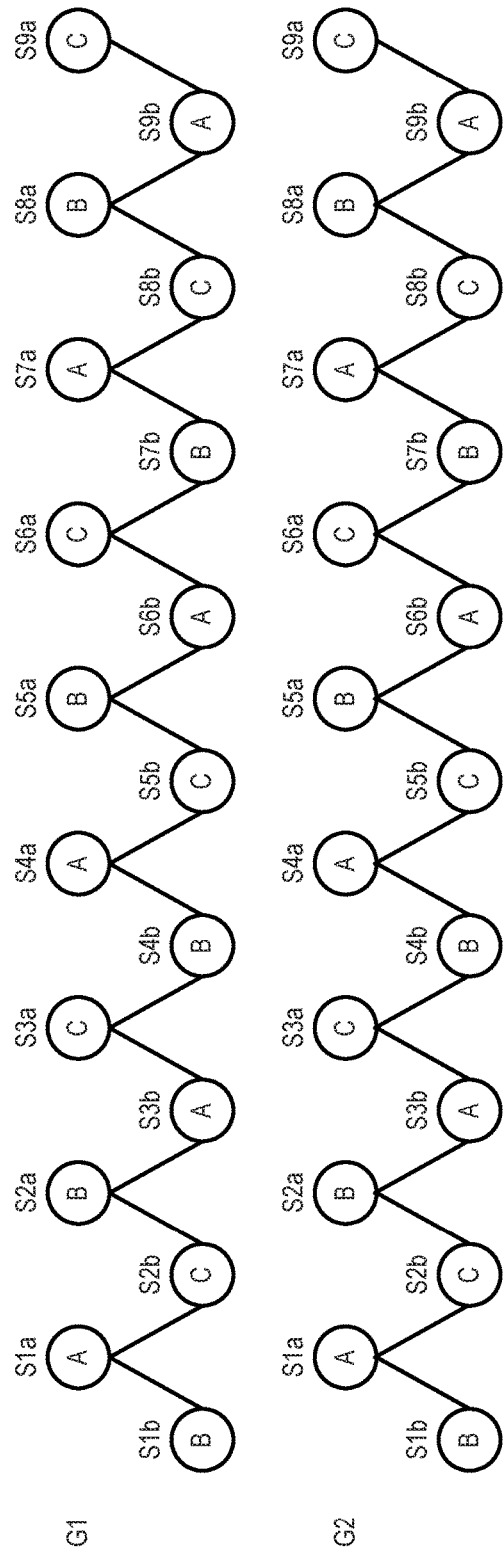
Figure 13C:
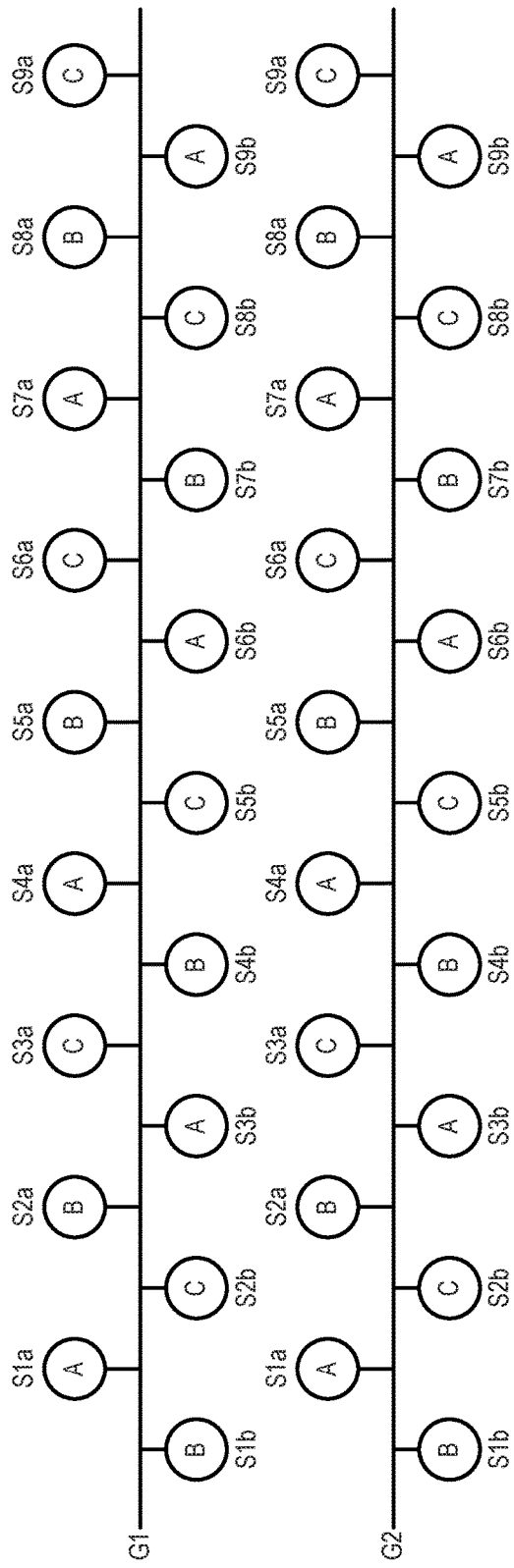
Figure 13D:
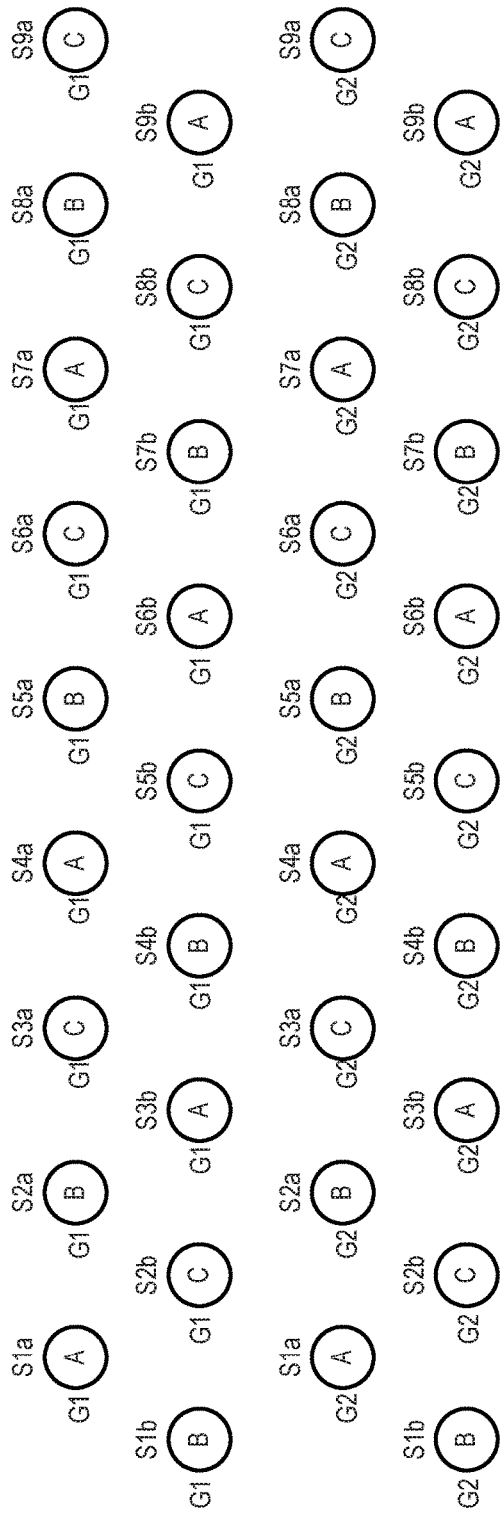

FIG. 12B is a depiction of another arrangement of gate lines and source lines for distributive-driving with source-demultiplexing of subpixels in the example arrangement shown in FIG. 5A in accordance with an embodiment. The arrangement of gate lines and source lines for distributive-driving in FIG. 12B is similar to the example shown in FIG. 5C in which the number of gate lines is decreased by the factor x equal to ½ compared with the number of rows of pixels, while the number of source lines is increased by the factor 1/x equals to 2 compared with the number of columns of pixels. It is to be appreciated that although the connections representing the gate lines shown in FIG. 12B appear to be different from those in FIG. 5C, the logical connections of gate lines between subpixels are the same in FIG. 12B and FIG. 5C.

Different from the example in FIG. 5C, the source-demultiplexing scheme is applied in this embodiment. Thus, three source lines may be operatively coupled to a 1:3 demultiplexer and receive display data from the same data channel in different clock periods. For example, the source lines S1a, S1b, and S1c may receive display data from data channel 1, and the source lines S8a, S8b, and S8c may receive display data from data channel 8. As a result, only one third of the number of data channels may be needed compared with the number of source lines on the display panel. In FIG. 12B, subpixels labeled with the same source line number (e.g., S1a, S1b, S1c, . . . , S8a, S8b, S8c) are connected by the same corresponding source line.

FIGS. 13A-13D are depictions of an arrangement of gate lines and source lines for distributive-driving with source-demultiplexing of subpixels in the example arrangement shown in FIG. 6A in accordance with an embodiment. The arrangement of gate lines and source lines for distributive-driving in FIGS. 13A-13D is similar to the example shown in FIG. 6D in which the number of gate lines is decreased by a factor x equal to ⅔ compared with the number of rows of pixels, while the number of source lines is increased by a factor 1/x equals to 3/2 compared with the number of columns of pixels. It is to be appreciated that although the connections representing the gate lines shown in FIGS. 13A-13D appear to be different from those in FIG. 6D, the logical connections of gate lines between subpixels are the same in each of FIGS. 13A-13D and FIG. 6D. For example, FIGS. 13A-13C and FIG. 6D each represents the same logic connections of gate lines between subpixels although the appearances of those "solid lines" representing the logic connections are not identical in FIGS. 13A-13C and FIG. 6D. As described above, the actual wiring of the gate lines may be understood by a person of ordinary skill in the art based on the logical connections and may be different in different examples. In one example, FIG. 13C may also represent one example of the actual wiring of the gate lines, but any other suitable wiring of gate lines may be applied as well. The same logic connections of gate lines between subpixels may be represented without the "solid lines" used in FIGS. 13A-13C and FIG. 6D. For example in FIG. 13D, the logic connections of gate lines are the same as those in FIGS. 13A-13C and FIG. 6D as the subpixels labeled with the same gate line number (e.g., G1 and G2) are connected by the same corresponding gate line. The same understandings explained above shall be applied to all the examples described in the present disclosure.

Different from the example in FIG. 6D, the source-demultiplexing scheme is applied in this embodiment. Thus, two source lines may be operatively coupled to a 1:2 demultiplexer and receive display data from the same data channel in different clock periods. For example, the source lines S1$a$ and S1$b$ may receive display data from data channel 1, and the source lines S9$a$ and S9$b$ may receive display data from data channel 9. As a result, only one half of the number of data channels may be needed compared with the number of source lines on the display panel. In FIGS. 13A-13D, subpixels labeled with the same source line number (e.g., S1$a$, S1$b$, . . . , S9$a$, S9$b$) are connected by the same corresponding source line.

It is to be appreciated that FIGS. 12A, 12B, and 13A-13D are for the illustrative purpose only, and the distributive-driving with source-demultiplexing of display panel may be applied to subpixels in any of the example arrangements disclosed in the present disclosure or any other suitable arrangements. It is also to be appreciated that the number of source lines that can receive display data from the same data channel is also not limited to the examples shown in FIGS. 12A, 12B, and 13A-13D and can be any suitable number in different subpixel arrangements.

It is to be appreciated that the "array of pixels" disclosed herein is not limited to all the pixels on the display panel (i.e., the entire display panel) and may be a portion of all the pixels on the display panel. That is, the M rows of pixels in the "array of pixels" may be the same or less than the vertical resolution of display 102, and the N columns of pixels in the "array of pixels" may be the same or less than the horizontal resolution of display 102. For example, for a WQHD display panel with a resolution of 1440×2560 (i.e., the number of rows of pixels and the vertical resolution is 2560) and when x equals to 4/3, because 2560×(4/3) is not an integer, the "array of pixels" in this example may have 2559 rows (i.e., M=2559). Accordingly, the distributive-driving scheme may be applied to 2559 rows of pixels, and the number of gate lines for that particular "array of pixels" may be increased to 3412 (2559×(4/3)). As to the entire display panel, the last row of pixels may be operatively coupled to one gate line without distributive-driving so that the total number of gate lines is 3413 in this example. Similarly, when x equals to ⅔ in the example above, because 2560×(⅔) is not an integer, the "array of pixels" in this example may have 2559 rows (i.e., M=2559). Accordingly, the distributive-driving scheme may be applied to 2559 rows of pixels, and the number of gate lines for that particular "array of pixels" may be decreased to 1706 (i.e., 2559×(⅔)). As to the entire display panel, the last row of pixels may be operatively coupled to one gate line without distributive-driving so that the total number of gate lines is 1707 in this example.

According to some aspects of the present disclosure, in addition to applying the distributive-driving, the number of gate lines or source lines of a display panel can be further reduced by sharing each pixel circuit by multiple subpixels. In some embodiments, in order to reduce the number of source lines, the distributive-driving scheme may be applied to increase the number of gate lines. The pixel circuit-sharing scheme then may be applied so that a plurality of subpixels connected to the same source line may share the same pixel circuit. As a result, the plurality of subpixels previously connected to different gate lines, respectively, can now be connected to the same gate line, thereby reducing the total number of gate lines. That is, the combined scheme of distributive-driving and the pixel circuit-sharing can reduce both the number of gate lines and the number of source lines.

According to some aspects of the present disclosure, in addition to adjusting the arrangement (e.g., the number) of gate lines and source lines on a display panel, the distributive-driving scheme in the present disclosure can also change the layout of pixel circuits driving the subpixels on the display panel, i.e., the design of the panel back-plane. In some embodiments, the size and/or shape of each pixel circuit region may be adjusted to improve the layout efficiency and simplify the layout placement. For example, the aperture ratio of the pixel circuit layout may be optimized by the distributive-driving scheme to approach to square. Moreover, the pixel circuit-sharing scheme can further adjust the layout of pixel circuits by reducing the average number of transistors required for each subpixel while maintaining the same compensation effect for brightness uniformity of the subpixels. In other words, the average size of pixel circuit per subpixel can be reduced, which further improves the layout efficiency and simplifies the layout placement.

Figure 14:
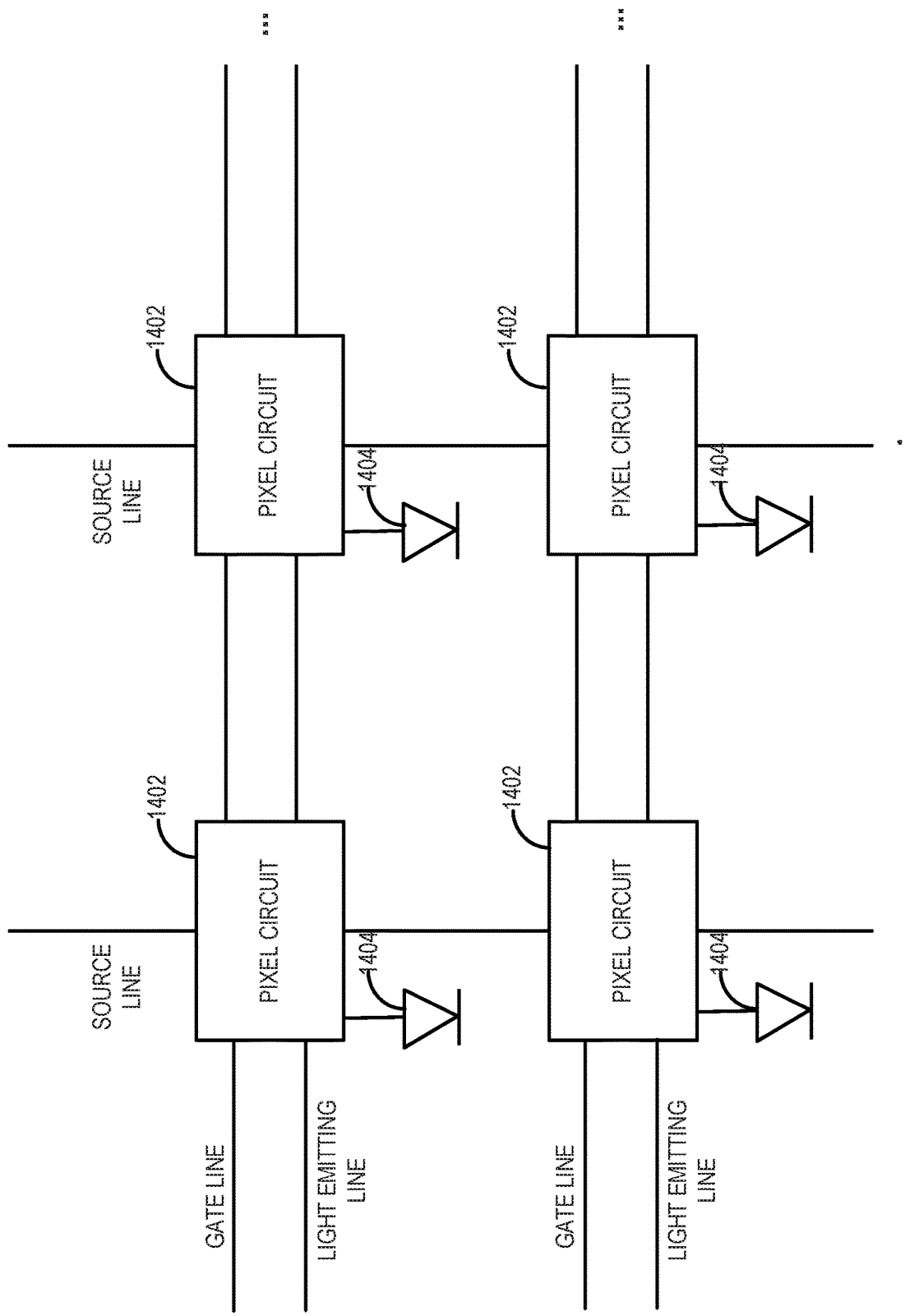
FIG. 14 is a depiction of an arrangement of gate lines, source lines, and light emitting lines and an array of light emitting elements driven by an array of pixel circuits in accordance with an embodiment.

FIG. 14 is a depiction of an arrangement of gate lines, source lines, and light emitting lines and an array of light emitting elements driven by an array of pixel circuits in accordance with an embodiment. In this embodiment, the array of pixel circuits 1402 are arranged in rows and columns, and each pixel circuit 1402 is configured to drive one light emitting element 1404. Light emitting element 1404 is an example of subpixel 201 that can emit light in response to an external signal, such as an electric current. One example of light emitting element 1404 is an OLED. Pixel circuits 1402 in the same row are operatively coupled to one gate line. Thus, the number of rows of pixel circuits is the same as the number of gate lines in this embodiment. To control the timing and duration of light emission of each light emitting element 1404, pixel circuits 1402 in the same row are also operatively coupled to one light emitting line. Thus, the number of rows of pixel circuits is also the same as the number of light emitting lines in this embodiment. Pixel circuits 1402 in the same column are operatively coupled to one source line for receiving the display data of light emitting elements 1404 driven by pixel circuits 1402 in the column. Thus, the number of columns of pixel circuits is the same as the number of source lines. It is to be appreciated that because the arrangement of light emitting elements 1404, e.g., the layout of the fine metal mask (FMM) used for patterning OLEDs, may not match the arrangement (layout) of the array of pixel circuits 1402, the actual electrical connections between each pair of pixel circuit 1042 and the corresponding light emitting element 1404 may differ in some embodiments.

Figure 15:
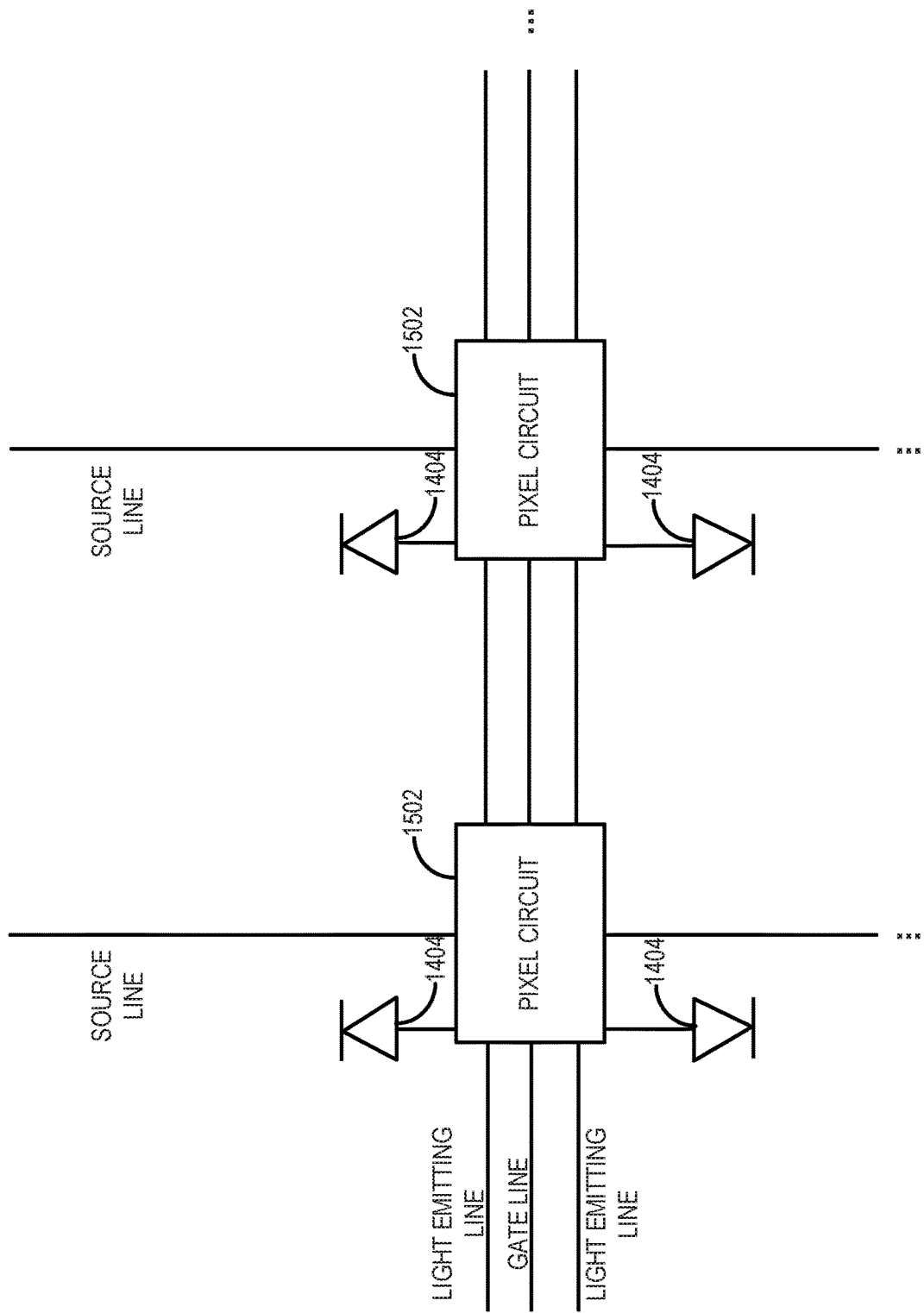
FIG. 15 is a depiction of an arrangement of gate lines, source lines, and light emitting lines and an array of light emitting elements driven by an array of pixel circuits with a pixel circuit-sharing scheme in accordance with an embodiment.

FIG. 15 is a depiction of an arrangement of gate lines, source lines, and light emitting lines and an array of light emitting elements driven by an array of pixel circuits with a pixel circuit-sharing scheme in accordance with an embodiment. In this embodiment, each pixel circuit 1502 is configured to drive two light emitting elements 1404. It is to be appreciated that the number of light emitting elements 1404 that can be driven by each pixel circuit 1502 is not limited to two and can be larger than two in some embodiments. In this embodiment, the two light emitting elements 1404 sharing the same pixel circuit 1502 receive the display data via the same source line, i.e., they are operatively coupled to the same source line. Thus, the number of columns of pixel circuits 1502 in FIG. 15 is the same as the number of columns of pixel circuits 1402 in FIG. 14, which is also the same as the number of source lines. The number of rows of pixel circuits 1502 in FIG. 15, however, is one-half of the number of rows of pixel circuits 1402 in FIG. 14. As a result, the number of gate lines in FIG. 15 is also one-half of the number of gate lines in FIG. 14.

In this embodiment, as two light emitting elements 1404 share the same pixel circuit 1502, the light emission for each of the two light emitting elements 1404 occurs in a respective sub-frame in each frame. That is, a time-division light emission approach may be applied in conjunction with the pixel circuit-sharing scheme in this embodiment so that each of the two light emitting elements 1404 sharing the same pixel circuit 1502 sequentially emits light in the time period of a frame. Thus, the number of light emitting lines in FIG. 15 is still the same as the number of light emitting lines in FIG. 14, which is twice of the number of rows of pixel circuits 1502. Accordingly, the pixel circuit-sharing scheme in this embodiment can reduce the number of gate lines, but maintain the same number of source lines and light emitting lines. In this embodiment, because the two light emitting elements 1404 sharing the same pixel circuit 1502 receive the display data via the same source line, i.e., they are operatively coupled to the same source line, the charging time for each light emitting element 1404 would not be reduced by the pixel circuit-sharing scheme.

Figure 16:
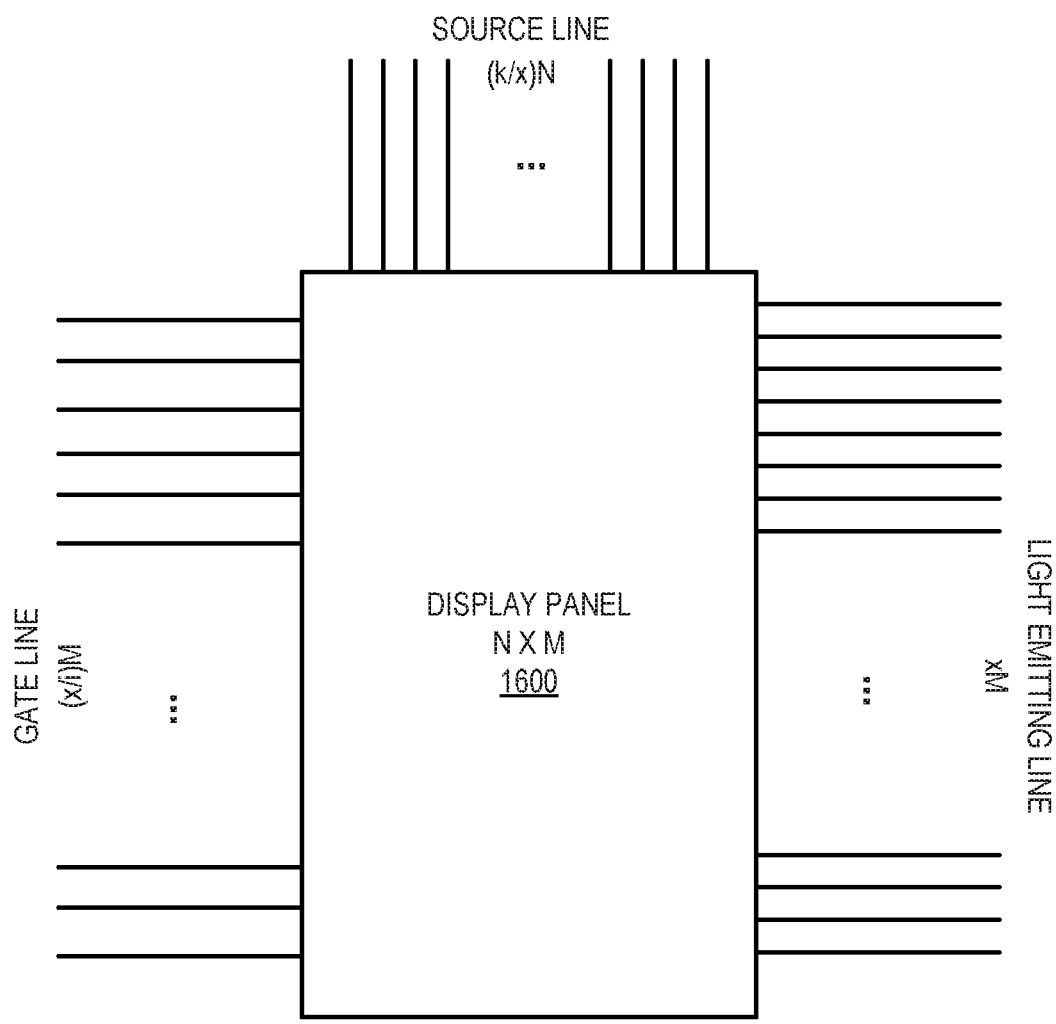
FIG. 16 is a depiction of an arrangement of gate lines, source lines, and light emitting lines for distributive-driving and pixel circuit-sharing of display panel in accordance with an embodiment.

FIG. 16 is a depiction of an arrangement of gate lines, source lines, and light emitting lines for distributive-driving and pixel circuit-sharing of a display panel in accordance with an embodiment. In this embodiment, a display panel 1600 has a resolution of N×M. That is, display panel 1600 includes an active region having an array of light emitting elements and an array of pixel circuits. The array of light emitting elements correspond to an array of pixels arranged in M rows and N columns. The number of the light emitting elements in the array of light emitting elements is k times of the number of the pixels in the array of pixels. As described above in detail, k may be any positive integer or any positive fraction. In some embodiments, display panel 1600 may be an AMOLED display panel, and each light emitting element may be an OLED, such as a top-emitting OLED.

In this embodiment, because of the pixel circuit-sharing scheme, each pixel circuit is configured to drive i light emitting elements, where i is an integer larger than 1. Display panel 1600 includes xM light emitting lines, (x/i)M gate lines, and (k/x)N source lines, where x is a positive fraction, and each of xM, (x/i)M, and (k/x)N is a positive integer. The parameter x is the ratio used in the distributive-driving scheme as described above in detail and will not be repeated again. As described above in detail with respect to various examples, by setting x as a fraction, as opposed to an integer, the distributive-driving scheme of the present disclosure provides a great level of flexibility to be applied to any subpixel arrangement and/or achieve any desired rearrangement of gate lines and source lines. i represents the number of light emitting elements driven by the same pixel circuit and may be, for example, 2, 3, 4, 5, 6, etc. In this embodiment, the i light emitting elements driven by the same pixel circuit receive display data via the same source line. Thus, the charging time for each light emitting element would not be reduced by the pixel circuit-sharing scheme. The i light emitting elements driven by the same pixel circuit are scanned via the same gate line.

As described above with respect to FIG. 2A, display panel 1600 may also include gate driving circuit 202, source driving circuit 204, and light emitting driving circuit 206. Gate driving circuit 202 may be operatively coupled to the active region via the (x/i)M gate lines and configured to scan the array of light emitting elements. For example, gate driving circuit 202 may be configured to sequentially scan each of the i light emitting elements driven by the same pixel circuit in the period of a frame. Source driving circuit 204 may be operatively coupled to the active region via the (k/x)N source lines and configured to write display data of a frame to the array of light emitting elements. It is to be appreciated that, as described above, the number of source/data channels may be the same as or different from the number of source lines ((k/x)N) due to demultiplexing. Light emitting driving circuit 206 may be operatively coupled to the active region via the xM light emitting lines and configured to cause each of the i light emitting elements driven by the same pixel circuit to sequentially emit light in the period of a frame.

In this embodiment, the number of rows of pixel circuits is the same as the number of gate lines, and the number of columns of pixel circuits is the same as the number of source lines. Thus, the array of pixel circuits in the active region of display panel 1600 are arranged in (x/i)M rows and (k/x)N columns. It is to be appreciated that any features described above with respect to the distributive-driving scheme may be applied to display panel 1600 described in this embodiment of FIG. 16, which will not be repeated again.

Figure 17A:
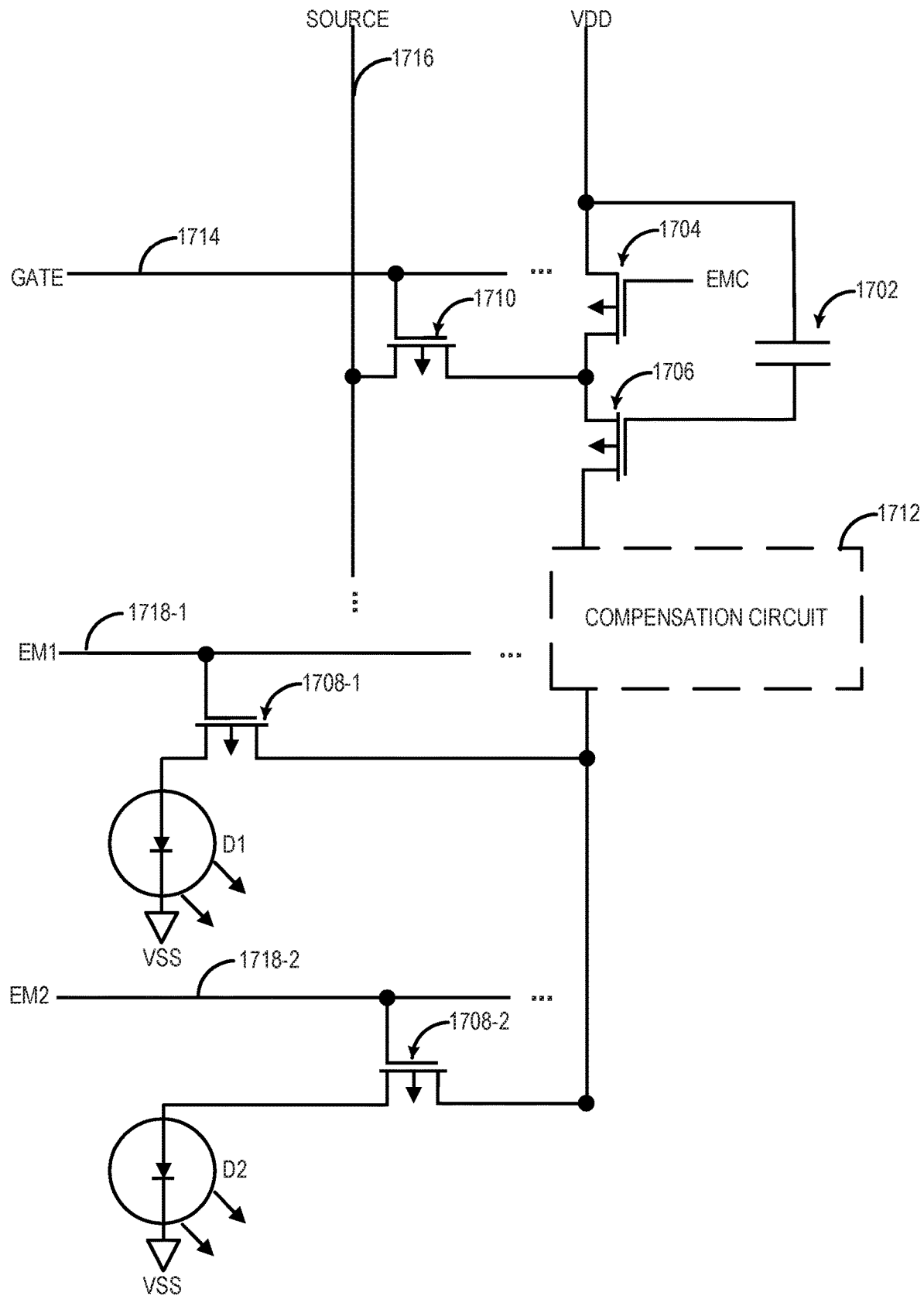
FIG. 17A is a circuit diagram illustrating one example of a pixel circuit shared by two light emitting elements in accordance with an embodiment.

FIG. 17A is a circuit diagram illustrating one example of a pixel circuit shared by two light emitting elements in accordance with an embodiment. The pixel circuit in this example is shared by two light emitting elements D1 and D2 representing two subpixels. The pixel circuit in this example includes a storage capacitor 1702, a light emitting control transistor 1704, a driving transistor 1706, two light emitting transistors 1708-1 and 1708-2, and a switching transistor 1710. The light emitting elements D1 and D2 may be OLEDs, such as top-emitting OLEDs, and each transistor may be a p-type transistor, such as a PMOS TFT. The pixel circuit may be operatively coupled to gate driving circuit 202 via a gate line 1714 and to source writing circuit 204 via a source line 1716. Additionally or optionally, a compensation circuit 1712 may be included in the pixel circuit to ensure the brightness uniformity between the light emitting elements D1 and D2. Compensation circuit 1712 can be in any configurations as known in the art, which includes one or more transistors and capacitors. The pixel circuit may be suitable for any configuration of the direct-charging type of pixel circuits because the data signal is directly applied via data line 1716 to driving transistor 1706 when switching transistor 1710 is turned on during the charging period.

In this example, light emitting control transistor 1704 includes a gate electrode operatively coupled to a light emitting control signal EMC, a source electrode operatively coupled to a supply voltage Vdd, and a drain electrode. The light emitting control signal EMC may be provided by a light emitting control circuit of light emitting driving circuit 206. The light emitting control signal EMC in this example turns on light emitting control transistor 1704 during each of the two light emitting periods for the two light emitting elements D1 and D2, respectively, within a frame period. Driving transistor 1706 includes a gate electrode operatively coupled to one electrode of storage capacitor 1702, a source electrode operatively coupled to the drain electrode of light emitting control transistor 1704, and a drain electrode. In each light emitting period (i.e., when light emitting control transistor 1704 is turned on), driving transistor 1706 provides a driving current to one of the light emitting elements D1 and D2 at a level determined based on the voltage level currently at storage capacitor 1702.

Each of light emitting transistors 1708-1 and 1708-2 includes a gate electrode operatively coupled to a respective light emitting line EM1 1718-1 or EM2 1718-2, a source electrode operatively coupled to the drain electrode of driving transistor 1706, and a drain electrode operatively coupled to the respective light emitting element D1 or D2. It is to be appreciated that in the examples in which compensation circuit 1712 is included in the pixel circuit, the source electrode of light emitting transistor 1708-1 or 1708-2 may not directly connect to the drain electrode of driving transistor 1706. In any event, during a light emitting period (i.e., when light emitting control transistor 1704 is turned on), a driving current path is formed through the supply voltage Vdd, light emitting control transistor 1704, driving transistor 1706, one of light emitting transistors 1708-1 and 1708-2, and one of the light emitting elements D1, D2. Each of light emitting signals received from a respective light emitting line 1718-1 or 1718-2 turns on the respective light emitting transistor 1708-1 or 1708-2 during a respective one of the two light emitting periods within a frame period to cause the respective light emitting element D1 or D2 to emit light.

In this example, switching transistor 1710 includes a gate electrode operatively coupled to gate line 1714 transmitting a scan signal, a source electrode operatively coupled to source line 1716 transmitting a data signal, and a drain electrode. The scan signal may turn on switching transistor 1710 during each of the two charging periods within a frame period to cause storage capacitor 1702 to be charged at a respective level in the data signal for the respective light emitting element D1 or D2. The timing of the display data may be re-arranged in the converted display data by data converting module 406 of control logic 104 to accommodate the distributive-driving and pixel circuit-sharing schemes in the present disclosure. In this example, storage capacitor 1702 is charged twice in one frame period for the two light emitting elements D1 and D2. During each charging period, the light emitting control signal EMC turns off light emitting control transistor 1704 to block the supply voltage Vdd.

Figure 17B:
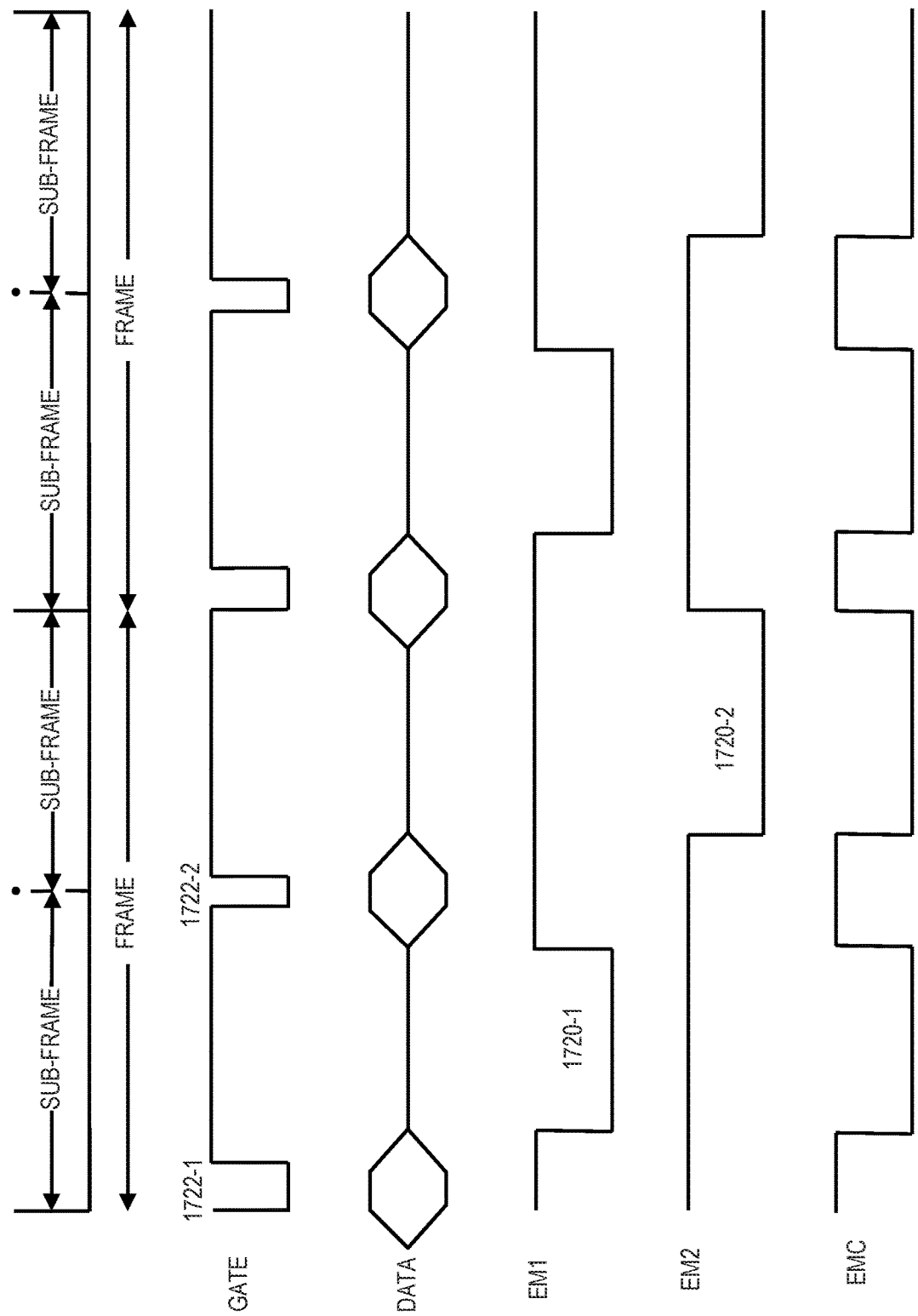
FIG. 17B is a timing diagram of the pixel circuit shown in FIG. 17A in accordance with an embodiment.

FIG. 17B is a timing diagram of the pixel circuit shown in FIG. 17A in accordance with an embodiment. In this example, a frame period is divided into two sub-frames for each of the two light emitting elements D1 and D2. The light emitting control signal EMC turns on light emitting control transistor 1704 in each of the two sub-frames (i.e., light emitting control transistor 1704 is turned on twice in the frame period). Accordingly, the first light emitting signal EM1 turns on first light emitting transistor 1708-1 during first light emitting period 1720-1 in the first sub-frame, and the second light emitting signal EM2 turns on second light emitting transistor 1708-2 during second light emitting period 1720-2 in the second sub-frame. That is, the timings of the light emitting control signal EMC and the two light emitting signals EM1 and EM2 are designed to coordinate with each other to create the two subsequent light emitting periods 1720-1 and 1720-2 within one frame period.

In FIG. 17B, the scan signal GATE turns on switching transistor 1710 to charge storage capacitor 1702 with the data signal DATA in each of the two sub-frames (i.e., storage capacitor 1702 is charged twice in the frame period) before the light emitting control signal EMC turns on light emitting control transistor 1704. That is, the scan signal GATE creates two charging periods 1722-1 and 1722-2 in one frame period for the two light emitting elements D1 and D2, respectively. During first charging period 1722-1, storage capacitor 1702 is charged with the data signal DATA at the level for the first light emitting element D1. Then, during first light emitting period 1720-1, the first light emitting element D1 emits light at a brightness level determined based on the charged voltage level of storage capacitor 1702. At second charging period 1722-2, storage capacitor 1702 is charged with the data signal DATA at the level for the second light emitting element D2. Then, during second light emitting period 1720-2, the second light emitting element D2 emits light at a brightness level determined based on the charged voltage level of storage capacitor 1702. In this example, the light emitting control signal EMC turns off light emitting control transistor 1704 during charging periods 1722-1 and 1722-2.

FIGS. 17A and 17B illustrate one example of pixel circuits that are suitable for the pixel circuit-sharing scheme in the present disclosure. It is to be appreciated that other examples of pixel circuits may be applied by the pixel circuit-sharing scheme in the present disclosure as well, such as the examples described in PCT Patent Application Publication No. WO 2016141777, having a title of "Display Device and Pixel Circuit Thereof," which is incorporated herein by reference.

Figure 18A:
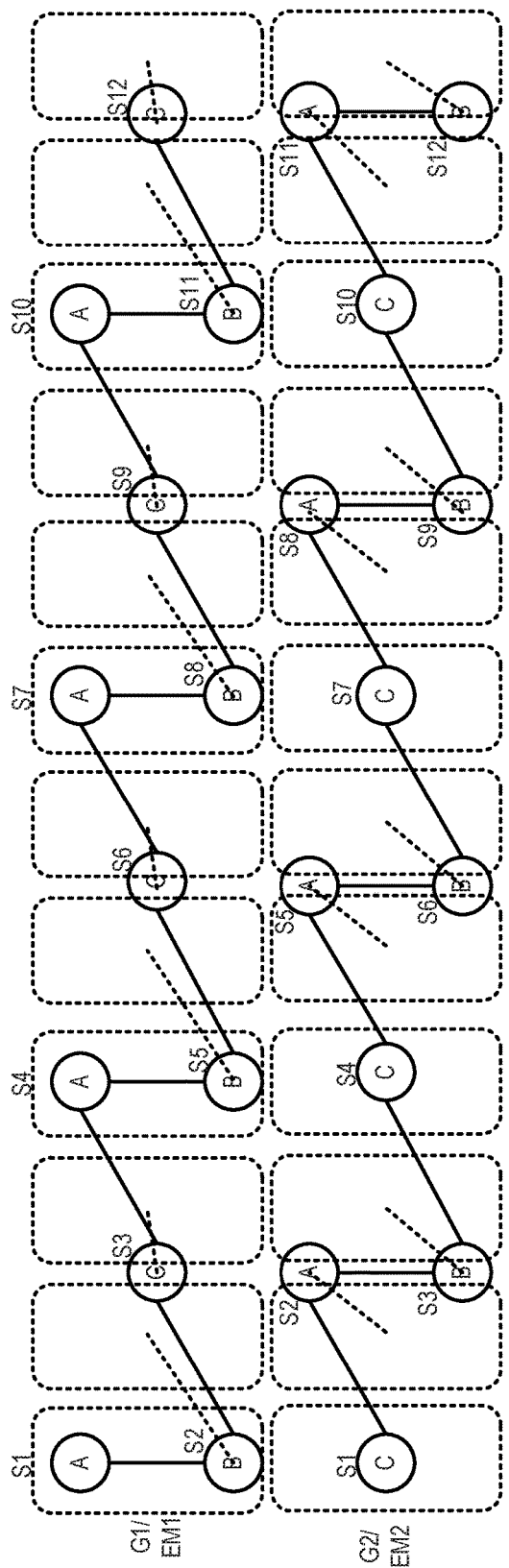
FIG. 18A is a depiction of an arrangement of gate lines, source lines, and light emitting lines and an array of pixel circuits for driving of light emitting elements in an example arrangement.

FIG. 18A is a depiction of an arrangement of gate lines, source lines, and light emitting lines and an array of pixel circuits for driving of light emitting elements in an example arrangement. In this example, the arrangement of the light emitting elements (represented by dots) is the same as the arrangement of the subpixels described in FIG. 5A and will not be repeated again. It is to be appreciated that because each subpixel is a light emitting element, light emitting lines are needed to control the light emission. In this example, the light emitting lines and gate lines have the same logic connections between light emitting elements and thus, use the same representations (solid lines labeled as G/EM). The actual wiring of the light emitting lines and/or gate lines may be understood by a person of ordinary skill in the art based on the logical connections and may be different in different examples.

As shown in FIG. 18A, there are 24 pixel circuits for driving the 24 light emitting elements (i.e., illustrating the layout design of the panel back-plane). Each region of a pixel circuit is represented by a dashed box. In this example, the 24 pixel circuits are arranged in an array having two rows and 12 columns. The number of rows of pixel circuits (2) is the same as the number of gate lines or light emitting lines (2), which is also the same as the number of rows of pixels (2). The number of columns of pixel circuits (12) is the same as the number of source lines (12), which is also the same as the number of columns of pixels multiplied by the ratio k (4×3 or 6×2).

In this example, because the arrangement of the light emitting elements does not match the arrangement (layout) of the pixel circuits, the length of an electrical connection between one pair of a light emitting element and the corresponding pixel circuit may be different from the length of an electrical connection between another pair of a light emitting element and the corresponding pixel circuit. In FIG. 18A, the electrical connections between each pair of a light emitting element and the corresponding pixel circuit are represented by dashed lines unless it is clear that the light emitting element is within the region of the corresponding pixel circuit (in the dashed box).

Figure 18B:
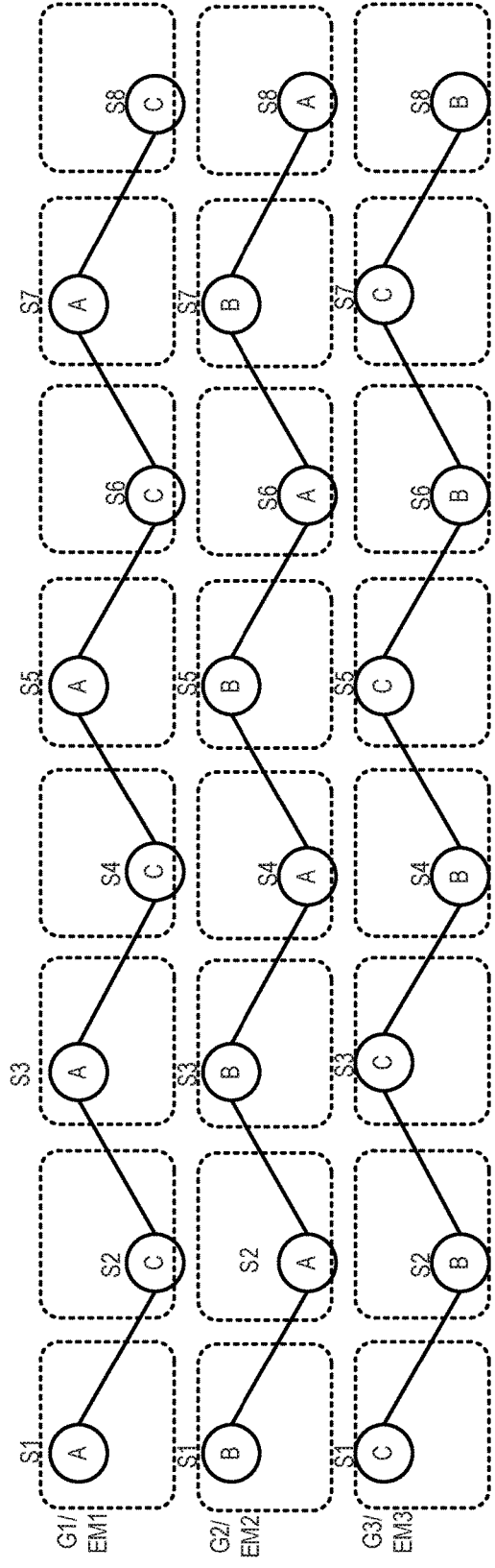
FIG. 18B is a depiction of an arrangement of gate lines, source lines, and light emitting lines and an array of pixel circuits for distributive-driving of light emitting elements in the example arrangement shown in FIG. 18A in accordance with an embodiment.

FIG. 18B is a depiction of an arrangement of gate lines, source lines, and light emitting lines and an array of pixel circuits for distributive-driving of light emitting elements in the example arrangement shown in FIG. 18A in accordance with an embodiment. In this example, the rearrangement of gate lines and source lines by the distributive-driving scheme is the same as that described in FIG. 5B and will not be repeated again. Again, the light emitting lines and gate lines have the same logic connections between light emitting elements and thus, use the same representations (solid lines labeled as G/EM). The actual wiring of the light emitting lines and/or gate lines may be understood by a person of ordinary skill in the art based on the logical connections and may be different in different examples.

In FIG. 18B, the rearranged pixel circuits (i.e., the new layout design of the panel back-plane) caused by the distributive-driving of light emitting elements are illustrated as well. In this example, the 24 pixel circuits are rearranged into an array having three rows and 8 columns. The number of rows of pixel circuits (3) is the same as the number of gate lines or light emitting lines (3), which becomes one and a half (3/2) times of the number of the rows of pixels (2). The number of the gate lines or light emitting lines in this embodiment may be represented as (3/2)M, where x=3/2 and M is the number of the rows of pixels. The number of columns of pixel circuits (8) is the same as the number of source lines (8), which becomes two thirds (⅔) of the number of columns of pixels multiplied by the ratio k (12). The number of the source lines in this embodiment may be represented as (⅔)kN, where k is the ratio of light emitting elements to pixels and N is the number of columns of pixels.

Figure 20:
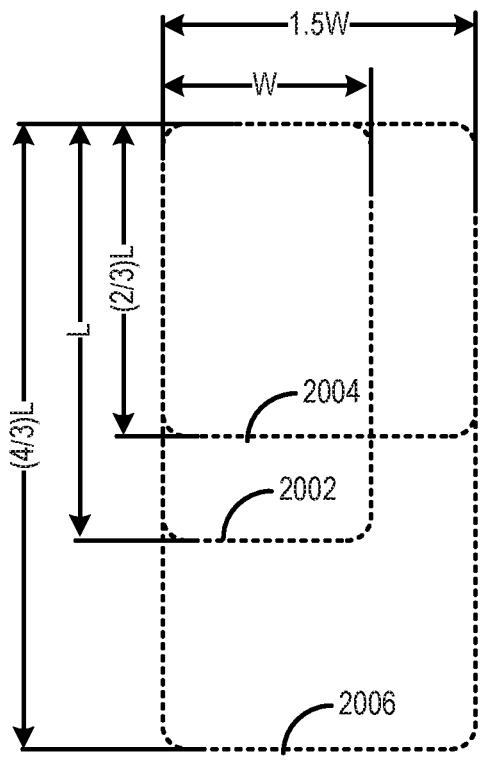
FIG. 20 is a depiction of pixel circuit region changes by distributive-driving and/or pixel circuit-sharing in accordance with an embodiment.

Compared with the example in FIG. 18A, the layout of the pixel circuits is adjusted for easy placement and better layout efficiency. For example, as shown in FIG. 20, 2002 represents the region of a pixel circuit in FIG. 18A without distributive-driving. Region 2002 has a width W and a length L. 2004 represents the region of a pixel circuit in FIG. 18B with distributive-driving. Because of the reduction of the number of source lines (and pixel circuits in the row direction), e.g., from 12 to 8, the width of region 2004 can be increased from the width W of region 2002. In this example, the width of region 2004 may be increased by one-half to become 1.5 W based on the percentage of pixel circuit number reduction (50%). On the other hand, due to the increase of the number of gate lines/light emitting lines (and pixel circuits in the column direction, e.g., from 2 to 3, the length of region 2004 is deceased from the length L of region 2002. In this example, the length of region 2004 may be decreased by one-third to become (⅔)L based on the percentage of pixel circuit number increase (33.3%).

It is to be appreciated that the degree of change to the dimensions is not limited to the values described above as long as the width of region 2004 is increased compared with the width of region 2002 and the length of region 2004 is decreased compared with the length of region 2002. That is, region 2004 is compressed in the column direction and stretched in the row direction compared with region 2002. As a result, the aperture ratio of a pixel circuit approaches to square due to distributive-driving, which is favorable for layout placement and can improve layout efficiency.

Turning back to FIG. 18B, in the array of pixel circuits, each row of pixel circuits drive light emitting elements in two colors. For example, the first row of pixel circuits drive light emitting elements in colors A and C, the second row of pixel circuits drive light emitting elements in colors B and A, and the third row of pixel circuits drive light emitting elements in colors C and B. Control logic 104, gate driving circuit 202, source driving circuit 204, and/or light emitting driving circuit 206 and thus send the corresponding signals based on the color arrangement of the array of pixel circuits. The color arrangement of the array of pixel circuits in FIG. 18B is different from that in FIG. 18A in which each row of pixel circuits drive light emitting elements in three colors, A, B, and C.

In one embodiment, control logic 104 may provide converted display data 416 to the array of pixel circuits based on the color arrangement of the array of pixel circuits, for example, as shown in FIG. 18B. Converted display data 416 may include a first set of display data to be provided to the first row of the array of pixel circuits configured to drive a first set of light emitting elements consisting of light emitting elements in the first and second colors, such as colors A and C in FIG. 18B. Converted display data 416 may also include a second set of display data to be provided to the second row of the array of pixel circuits configured to drive a second set of light emitting elements consisting of light emitting elements in the first and third colors, such as colors A and B in FIG. 18B. Converted display data 416 may further include a third set of display data to be provided to the third row of the array of pixel circuits configured to drive a third set of light emitting elements different from the first set of light emitting elements and different from the second set of light emitting elements. For example, as shown in FIG. 18B, the third set of light emitting elements may consist of light emitting elements in colors B and C. It is to be appreciated that although FIGS. 18A and 18B are used an example to describe the change of color arrangement of the array of pixel circuits as well as the corresponding rearrangement of display data because of the distributive-driving, any other examples in the present disclosure or any other suitable subpixel arrangements may have the similar change to the color arrangement of the array of pixel circuits as well as the corresponding rearrangement of display data.

It is to be appreciated that in order to be different from the first and second sets of light emitting elements, the third set of light emitting elements driven by the third row of pixel circuits may have more than or less than two colors. In some embodiments, the third row of pixel circuits may be configured to drive the third set of light emitting elements in three colors, such as colors A, B, and C, or even more than three colors, such as four colors. In some embodiments, the third row of pixel circuits may be configured to drive the third set of light emitting elements in one color, such as color A, B, or C. It is also to be appreciated that for the first and second sets of light emitting elements, the first, second, and third colors are not necessarily selected from three colors and may be selected from more than three colors, such as four colors A, B, C, and D as long as the first set of light emitting elements have one color that is common to the second set of light emitting elements and have another color that is not in the second set of light emitting elements. It is also to be appreciated that the first, second, and third rows of pixel circuits described above may be adjacent rows as shown in FIG. 18B, and the same pattern may be repeated for every three adjacent rows of pixel circuits. In some embodiments, at least two of the first, second, and third rows of pixel circuits described above may not be adjacent to each other.

As described above with respect to FIG. 4, data interface 404 may be configured to receive original display data 106 and provide original display data 106 to data converting module 406 so that original display data 106 can be converted into converted display data 416 based on the color arrangement of the array of pixel circuits as described above.

Control signal generating module 402 may be configured to provide control signals 108 to the various driving circuits (and the array of pixel circuits in some embodiments) to cause the array of pixel circuits to drive the light emitting elements based, at least in part, on converted display data 416 provided by data converting module 406 based on the color arrangement of the array of pixel circuits.

Figure 18C:
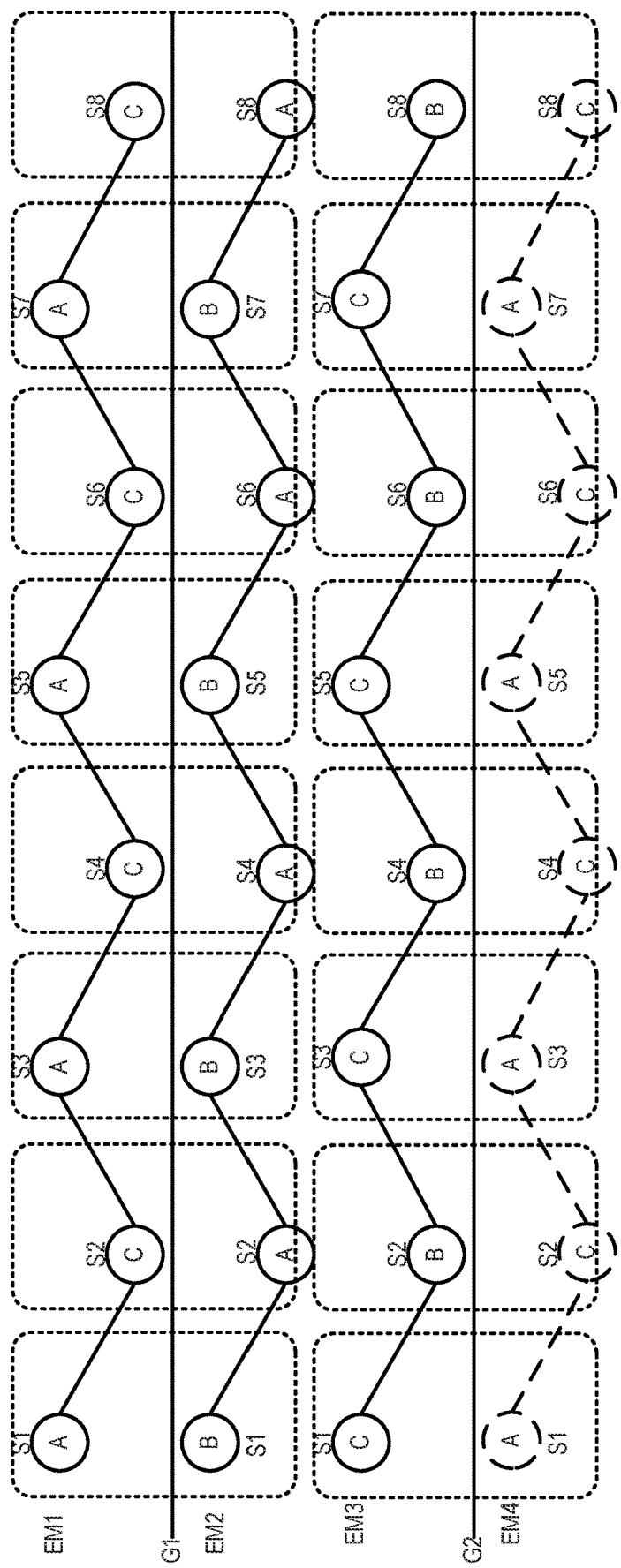
FIG. 18C is a depiction of an arrangement of gate lines, source lines, and light emitting lines and an array of pixel circuits for distributive-driving and pixel circuit-sharing of light emitting elements in the example arrangement shown in FIG. 18A in accordance with an embodiment.

FIG. 18C is a depiction of an arrangement of gate lines, source lines, and light emitting lines and an array of pixel circuits for distributive-driving and pixel circuit-sharing of light emitting elements in the example arrangement shown in FIG. 18A in accordance with an embodiment. In this example, the pixel circuit-sharing scheme causes the rearrangement of pixel circuits and gate lines compared with the example in FIG. 18B. The arrangement of light emitting lines and source lines remains the same.

Because two light emitting elements connected to the same source line (e.g., adjacent light emitting elements A and B connected to S1) share the same pixel circuit in FIG. 18C, the two pixels circuits in the same column previously driving the two light emitting elements in FIG. 18B now become one pixel circuit in FIG. 18C. As a result, the number of source lines (8) in FIG. 18C remains the same as the number of source lines (8) in FIG. 18B. As to the gate lines, because two light emitting elements connected to the same source line can share the same gate line, one gate line G1 in FIG. 18C can replace the two gate lines G1 and G2 in FIG. 18B, and one gate line G2 in FIG. 18C can connect to the 8 light emitting elements connected to the gate line G3 in FIG. 18B as well as another 8 light emitting elements (shown as dashed dots). That is, the number of gate lines (1.5) needed for driving the 24 light emitting elements in FIG. 18C is one-half of the number of gate lines (3) in FIG. 18B. As to the light emitting lines, the number (3) is no longer the same as the number of gate lines (1.5) because the number of light emitting lines is not changed due to the pixel circuit-sharing.

Because two light emitting elements connected to the same source line share the same pixel circuit in FIG. 18C, the two pixels circuits in the same column previously driving the two light emitting elements in FIG. 18B now become one pixel circuit in FIG. 18C. As a result, the 24 pixel circuits in FIGS. 18A and 18B can be reduced to 8 full pixel circuits in a first row and 8 half pixel circuits in a second row (shared by another 8 light emitting elements that are not parts of the 24 light emitting elements). That is, the total number of pixel circuits is reduced by the factor i (2), which is the number of light emitting elements sharing the same pixel circuit.

Compared with the example in FIG. 18B, the layout of the pixel circuits is adjusted by pixel circuit-sharing for easy placement. For example, as shown in FIG. 20, 2006 represents the region of a pixel circuit in FIG. 18C with distributive-driving and pixel-circuit sharing. Because of the reduction of the number of gate lines (and pixel circuits in the column direction), e.g., from 3 to 1.5, the length of region 2006 can be increased from the length (2/3)L of region 2004. In this example, the length of region 2006 may be doubled to become (4/3)L based on the percentage of pixel circuit number reduction (50%). On the other hand, the width of region 2006 remains the same as the width 1.5 W of region 2004. It is to be appreciated that the degree of change to the dimensions is not limited to the values described above as long as the length of region 2006 is increased compared with the length of region 2004. That is, region 2006 is stretched in the column direction compared with region 2004. As a result, for each pixel circuit region, the decrease of length due to distributive-driving can be compensated by the increase of length from pixel circuit-sharing so that more space can be allocated for arranging the transistors, capacitors, and wirings of each pixel circuit. Moreover, as described above, since pixel circuit-sharing can also reduce the average number of transistors per light emitting element, more space can be reserved for easy placement of pixel circuits by the combined scheme of distributive-driving and pixel-circuit sharing.

FIG. 19A is a depiction of an arrangement of gate lines, source lines, and light emitting lines and an array of pixel circuits for driving of light emitting elements in another example arrangement. In this example, the arrangement of the light emitting elements (represented by dots) is the same as the arrangement of the subpixels described in FIG. 7A ("real-RGB" or "RGB strips") and will not be repeated again. It is to be appreciated that because each subpixel is a light emitting element, light emitting lines are needed to control the light emission. In this example, the light emitting lines and gate lines have the same logic connections between light emitting elements and thus, use the same representations (solid lines labeled as G/EM). The actual wiring of the light emitting lines and/or gate lines may be understood by a person of ordinary skill in the art based on the logical connections and may be different in different examples.

As shown in FIG. 19A, there are 24 pixel circuits for driving the 24 light emitting elements (i.e., illustrating the layout design of the panel back-plane). Each region of a pixel circuit is represented by a dashed box. In this example, the 24 pixel circuits are arranged in an array having two rows and 12 columns. The number of rows of pixel circuits (2) is the same as the number of gate lines or light emitting lines (2), which is also the same as the number of rows of pixels (2). The number of columns of pixel circuits (12) is the same as the number of source lines (12), which is also the same as the number of columns of pixels multiplied by the ratio k (4×3 or 6×2).

FIG. 19B is a depiction of an arrangement of gate lines, source lines, and light emitting lines and an array of pixel circuits for distributive-driving of light emitting elements in the example arrangement shown in FIG. 19A in accordance with an embodiment. In this example, the rearrangement of gate lines and source lines by the distributive-driving scheme is the same as that described in FIG. 7B and will not be repeated again. Again, the light emitting lines and gate lines have the same logic connections between light emitting elements and thus, use the same representations (solid lines labeled as G/EM). The actual wiring of the light emitting lines and/or gate lines may be understood by a person of ordinary skill in the art based on the logical connections and may be different in different examples.

As shown in FIG. 19B, the rearranged pixel circuits (i.e., the new layout design of the panel back-plane) caused by the distributive-driving of light emitting elements are illustrated as well. In this example, the 24 pixel circuits are rearranged in a new array having three rows and 8 columns. The number of rows of pixel circuits (3) is the same as the number of gate lines or light emitting lines (3), which becomes one and a half (3/2) times of the number of the rows of pixels (2). The number of the gate lines or light emitting lines in this embodiment may be represented as (3/2)M, where x=3/2 and M is the number of the rows of pixels. The number of columns of pixel circuits (8) is the same as the number of source lines (8), which becomes two thirds (2/3) of the number of columns of pixels multiplied by the ratio k (12). The number of the source lines in this embodiment may be represented as (⅔)kN, where k is the ratio of light emitting elements to pixels and N is the number of columns of pixels.

Compared with the example in FIG. 19A, the layout of the pixel circuits is adjusted for easy placement and better layout efficiency. As described above with respect to FIGS. 18B and 20, the aperture ratio of a pixel circuit approaches to square due to the distributive-driving scheme, which is favorable for layout placement and can improve layout efficiency.

In this embodiment, because the arrangement of the light emitting elements does not match the arrangement (layout) of the pixel circuits, the length of an electrical connection between one pair of a light emitting element and the corresponding pixel circuit may be different from the length of an electrical connection between another pair of a light emitting element and the corresponding pixel circuit. In FIG. 19B, the electrical connections between each pair of a light emitting element and the corresponding pixel circuit are represented by dashed lines unless it is clear that the light emitting element is within the region of the corresponding pixel circuit (in the dashed box).

Figure 19C:
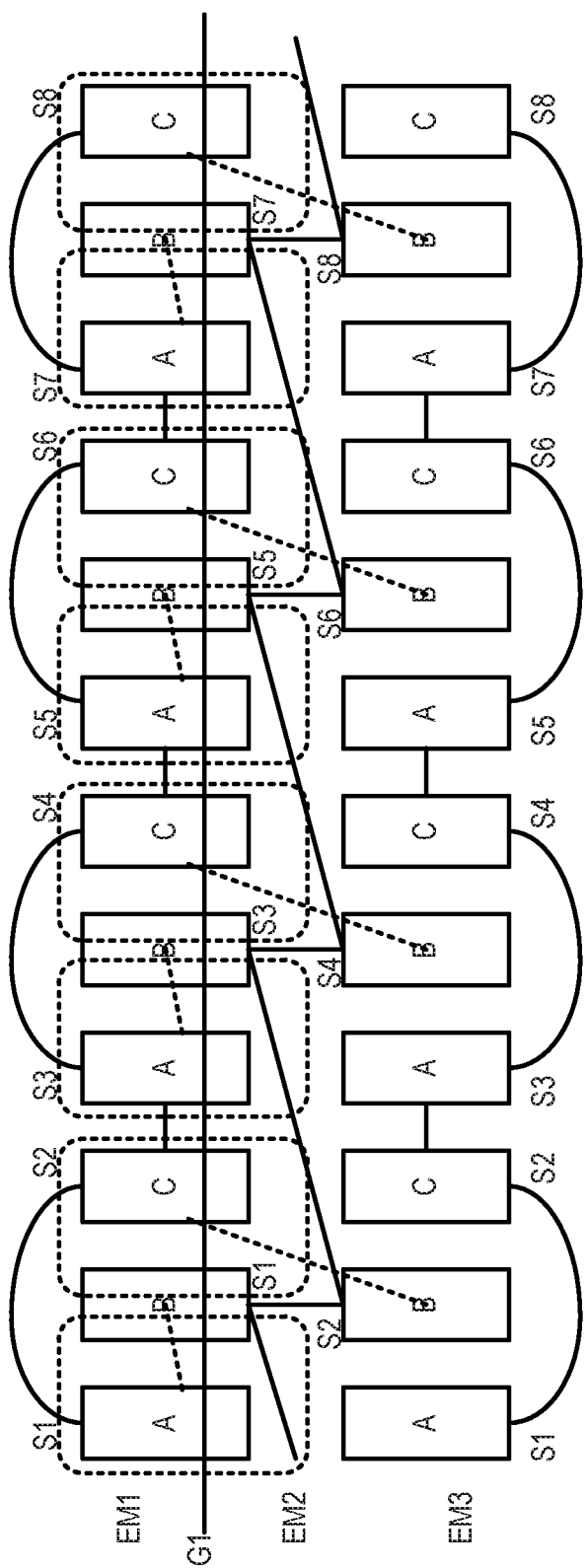
FIG. 19C is a depiction of an arrangement of gate lines, source lines, and light emitting lines and an array of pixel circuits for distributive-driving and pixel circuit-sharing of light emitting elements in the example arrangement shown in FIG. 19A in accordance with an embodiment.

FIG. 19C is a depiction of an arrangement of gate lines, source lines, and light emitting lines and an array of pixel circuits for distributive-driving and pixel circuit-sharing of light emitting elements in the example arrangement shown in FIG. 19A in accordance with an embodiment. In this example, the pixel circuit-sharing scheme causes the rearrangement of pixel circuits and gate lines compared with the example in FIG. 19B. The arrangement of light emitting lines and source lines remains the same.

Because two light emitting elements connected to the same source line (e.g., adjacent light emitting elements A and B connected to S1) share the same pixel circuit in FIG. 19C, the two pixels circuits in the same column previously driving the two light emitting elements in FIG. 19B now become one pixel circuit in FIG. 19C. As a result, the number of source lines (8) in FIG. 19C remains the same as the number of source lines (8) in FIG. 19B. As to the gate lines, the number of gate lines (1.5) in FIG. 19C is one-half of the number of gate lines (3) in FIG. 19B. As to the light emitting lines, the number (3) is no longer the same as the number of gate lines (1.5) because the number of light emitting lines is not changed due to the pixel circuit-sharing scheme.

Because two light emitting elements connected to the same source line share the same pixel circuit in FIG. 19C, the two pixels circuits in the same column previously driving the two light emitting elements in FIG. 19B now become one pixel circuit in FIG. 19C. As a result, the 24 pixel circuits in FIGS. 19A and 19B can be reduced to 8 full pixel circuits in a first row and 8 half pixel circuits in a second row (shared by another 8 light emitting elements that are not parts of the 24 light emitting elements). That is, the total number of pixel circuits is reduced by the factor i (2), which is the number of light emitting elements sharing the same pixel circuit.

Compared with the example in FIG. 19B, the layout of the pixel circuits is adjusted by pixel circuit-sharing for easy placement. As described above with respect to FIGS. 18C and 20, for each pixel circuit region, the decrease of length due to distributive-driving can be compensated by the increase of length from pixel circuit-sharing so that more space can be allocated for arranging the elements (e.g., transistors, capacitors, and wirings) of each pixel circuit. Moreover, as described above, since pixel circuit-sharing can also reduce the average number of transistors per light emitting element, more space can be reserved for easy placement of pixel circuits by the combined scheme of distributive-driving and pixel-circuit sharing.

In this example, because the arrangement of the light emitting elements does not match the arrangement (layout) of the pixel circuits, the length of an electrical connection between one pair of a light emitting element and the corresponding pixel circuit may be different from the length of an electrical connection between another pair of a light emitting element and the corresponding pixel circuit. In FIG. 19C, the electrical connections between each pair of a light emitting element and the corresponding pixel circuit are represented by dashed lines unless it is clear that the light emitting element is within the region of the corresponding pixel circuit (in the dashed box).

It is to be appreciated that although FIGS. 18C and 19C illustrate applying the distributive-driving and pixel circuit-sharing schemes to two example subpixel arrangements, the combined scheme of distributive-driving and pixel circuit-sharing in the present disclosure is not limited to any specific subpixel arrangement, but can be applied to other example subpixel arrangements disclosed in the present disclosure as well as any other subpixel arrangements. Similarly, it is to be appreciated that the rearrangement of pixel circuit layout due to distributive-driving and/or pixel circuit-sharing is also not limited to the examples illustrated in FIGS. 18A-18C and 19A-19C, but can be applied to other example subpixel arrangements disclosed in the present disclosure as well as any other subpixel arrangements. It is also to be appreciated that the combined scheme of distributive-driving and pixel circuit-sharing can work in conjunction with the source-demultiplexing scheme as described above with respect to FIGS. 10, 11, 12A-12B, and 13A-13D.

FIG. 21A is a depiction of an arrangement of gate lines and source lines and an array of pixel circuits for driving subpixels in an example arrangement. In this example, 18 pixel circuits (each represented in a dashed box) are arranged in an array of two rows and 9 columns. Each row of pixel circuits are operatively coupled to one gate line G1-G2, and each column of pixel circuits are operatively coupled to one source line S1-S9. Each pixel circuit is labeled as one of three colors A, B, and C, indicating the specific color of subpixel driven by each pixel circuit. Each row of pixel circuits drive subpixels in three colors A, B and C. It is to be appreciated that the arrangement of the subpixels (e.g., the layout of FMM patterns) can be the same as or different from the arrangement (layout) of the pixel circuits as described above. In other words, the example arrangement of pixel circuit as well as the gate lines and source lines in this embodiment can be used for different arrangements of subpixels.

FIG. 21B is a depiction of an arrangement of gate lines and source lines and an array of pixel circuits for distributive-driving subpixels in the example arrangement shown in FIG. 21A in accordance with an embodiment. In this embodiment, the distributive-driving scheme is applied to adjust the arrangement of pixel circuit as well as the gate lines and source lines shown in FIG. 21A. As a result, the number of gate lines is reduced from 2 to 1.5, and the number of source lines is increased from 9 to 12. The pixel circuits are also re-arranged into an array of 3 rows and 6 columns. Each row of pixel circuits drive subpixels in two colors, e.g., A and C in the first row, B and A in the second row, and C and B in the third row. Control logic 104, gate driving circuit 202, source driving circuit 204, and/or light emitting driving circuit 206 and thus send the corresponding signals based on the color arrangement for the array of pixel circuit. FIG. 21B illustrates one example of wirings connecting the gate lines G1-G2 and source lines S1-S12 to the array of pixel circuits. It is to be appreciated that the wirings can be different in other examples. It is also to be appreciated that the example arrangement of pixel circuit as well as the gate lines and source lines in this embodiment can be used for different arrangements of subpixels.

In this embodiment, the source-demultiplexing scheme described in the present disclosure may be applied as well. Thus, two source lines connecting to pixel circuits in the same column may be operatively coupled to a 1:2 demultiplexer and receive display data from the same data channel in different clock periods. For example, the source lines S1 and S2 connecting to the left-most column of pixel circuits may receive display data from data channel 1, and the source lines S11 and S12 connecting to the right-most column of pixel circuits may receive display data from data channel 6. As a result, only one-half of the number of data channels (6) may be needed compared with the number of the source lines (12).

Also, integrated circuit design systems (e.g., work stations) are known that create wafers with integrated circuits based on executable instructions stored on a computer-readable medium such as but not limited to CDROM, RAM, other forms of ROM, hard drives, distributed memory, etc. The instructions may be represented by any suitable language such as but not limited to hardware descriptor language (HDL), Verilog or other suitable language. As such, the logic, units, and circuits described herein may also be produced as integrated circuits by such systems using the computer-readable medium with instructions stored therein.

For example, an integrated circuit with the aforedescribed logic, units, and circuits may be created using such integrated circuit fabrication systems. The computer-readable medium stores instructions executable by one or more integrated circuit design systems that causes the one or more integrated circuit design systems to design an integrated circuit. In one example, the designed integrated circuit includes an active region, a source driving circuit, and a light emitting driving circuit. The active region includes an array of light emitting elements corresponding to an array of pixels arranged in M rows and N columns. The number of the array of light emitting elements is k times of the number of the array of pixels. The apparatus includes xM light emitting lines and (k/x)N source lines, wherein x is a positive fraction, and each of xM and (k/x)N is a positive integer. The source driving circuit is operatively coupled to the active region via the (k/x)N source lines and configured to write display data of a frame to the array of light emitting elements. The light emitting driving circuit is operatively coupled to the active region via the xM light emitting lines and configured to cause the array of light emitting elements to emit light.

In another example, the designed integrated circuit includes an active region, light emitting lines, gate lines, source lines, a gate driving circuit, a source driving circuit, and a light emitting driving circuit. The active region includes an array of light emitting elements and an array of pixel circuits. The array of light emitting elements correspond to an array of pixels arranged in M rows and N columns. The number of the array of light emitting elements is k times of the number of the array of pixels. The array of pixel circuits are operatively coupled to the array of light emitting elements. Each pixel circuit in the array of pixel circuits is configured to drive i light emitting elements in the array of light emitting elements. The apparatus includes xM light emitting lines, (x/i)M gate lines, and (k/x)N source lines, wherein x is a positive fraction, and each of xM, (x/i)M, and (k/x)N is a positive integer. The gate driving circuit is operatively coupled to the active region via the (x/i)M gate lines and configured to scan the array of light emitting elements. The source driving circuit is operatively coupled to the active region via the (k/x)N source lines and configured to write display data of a frame to the array of light emitting elements. The light emitting driving circuit operatively coupled to the active region via the xM light emitting lines and configured to cause each of i light emitting elements driven by a same pixel circuit to sequentially emit light in a period of the frame.

In still another example, the designed integrated circuit includes a data converting module. The data converting module is configured to provide display data in a frame to an array of pixel circuits of a display panel. The array of pixel circuits are configured to drive a plurality of subpixels of the display panel in at least a first color, a second color, and a third color. The display data in the frame includes a first set of display data to be provided to a first row of the array of pixel circuits configured to drive a first set of the subpixels consisting of subpixels in the first and second colors. The display data in the frame also includes a second set of display data to be provided to a second row of the array of pixel circuits configured to drive a second set of the subpixels consisting of subpixels in the first and third colors. The display data in the frame further includes a third set of display data to be provided to a third row of the array of pixel circuits configured to drive a third set of the subpixels different from the first set of the subpixels and different from the second set of the subpixels.

The above detailed description of the disclosure and the examples described therein have been presented for the purposes of illustration and description only and not by limitation. It is therefore contemplated that the present disclosure cover any and all modifications, variations or equivalents that fall within the spirit and scope of the basic underlying principles disclosed above and claimed herein.

What is claimed is:
1. An apparatus, comprising:
   an active region comprising an array of light emitting elements, wherein the array of light emitting elements correspond to an array of pixels arranged in M rows and N columns, and a number of the array of light emitting elements is k times of a number of the array of pixels;
   xM light emitting lines, and (k/x)N source lines, wherein x is a positive fraction, and each of xM and (k/x)N is a positive integer;
   (x/i)M gate lines, where i represents the number of a plurality of light emitting elements driven by a same pixel circuit;
   a source driving circuit operatively coupled to the active region via the (k/x)N source lines and configured to write display data of a frame to the array of light emitting elements; and
   a gate driving circuit operatively coupled to the active region via the (x/i)M gate lines and configured to scan the array of light emitting elements; and
   a light emitting driving circuit operatively coupled to the active region via the xM light emitting lines and configured to cause the array of light emitting elements to emit light.
2. The apparatus of claim 1, wherein the active region further comprises:
   an array of pixel circuits operatively coupled to the array of light emitting elements, each pixel circuit in the array of pixel circuits configured to drive the plurality of light emitting elements in the array of light emitting elements; and wherein the light emitting driving circuit is configured to cause each of the plurality of light emitting elements driven by the same pixel circuit to sequentially emit light in a period of the frame.

3. The apparatus of claim 2, wherein the plurality of light emitting elements driven by the same pixel circuit receive display data from the source driving circuit via a same source line.

4. The apparatus of claim 2, wherein a first length of a first electrical connection between a first light emitting element in the array of light emitting elements and the corresponding pixel circuit driving the first light emitting element is different from a second length of a second electrical connection between a second light emitting element in the array of light emitting elements and the corresponding pixel circuit driving the second light emitting element.

5. The apparatus of claim 1, wherein the i light emitting elements driven by the same pixel circuit are scanned by the gate driving circuit via a same gate line.

6. The apparatus of claim 5, wherein the gate driving circuit is configured to sequentially scan each of the i light emitting elements driven by the same pixel circuit in the period of the frame.

7. The apparatus of claim 1, further comprising control logic operatively coupled to the gate driving circuit, the source driving circuit, and the light emitting driving circuit, the control logic comprising:
a data interface configured to receive original display data;
a data converting module configured to convert the original display data into converted display data based on the (k/x)N source lines; and
a control signal generating module configured:
provide a first set of control signals to the gate driving circuit to control the gate driving circuit to scan the array of light emitting elements via the (x/i)M gate lines,
provide a second set of control signals to the source driving circuit to control the source driving circuit to write the converted display data to the array of light emitting elements via the (k/x)N source lines, and
provide a third set of control signals to the light emitting driving circuit to control the light emitting driving circuit to cause each of the i light emitting elements driven by the same pixel circuit to sequentially emit light in i sub-frames in the frame.

8. The apparatus of claim 7, wherein the control logic is in a chip-on-film (COF) package.

9. The apparatus of claim 8, wherein the COF package is a single-layer COF package.

10. The apparatus of claim 1, wherein the display data in the frame comprises M×N pieces of pixel data, each piece of pixel data corresponding to one of the array of pixels and comprising a first component representing a first color, a second component representing a second color, and a third component representing a third color.

11. The apparatus of claim 1, wherein the apparatus is a display with a resolution of N×M.

12. The apparatus of claim 1, wherein
x is represented as p/q;
each of p and q is a positive integer; and
p is larger than q.

13. The apparatus of claim 12, wherein p is smaller than 2q.

14. The apparatus of claim 12, wherein p is larger than 2q.

15. The apparatus of claim 1, wherein
x is represented as p/q;
each of p and q is a positive integer; and
q is larger than p.

16. The apparatus of claim 1, wherein each light emitting element in the array of light emitting elements is a top-emitting organic light emitting diode (OLED).

17. The apparatus of claim 1, wherein k is a fraction.

18. The apparatus of claim 1, further comprising a demultiplexing module operatively coupled to the (k/x)N source lines and configured to:
receive the display data in kN data channels; and
route the display data to the (k/x)N source lines.

19. The apparatus of claim 18, wherein the demultiplexing module comprises:
a selecting unit configured to generate kN sets of selecting signals; and
kN demultiplexers, each demultiplexer operatively coupled to the selecting unit and 1/x source lines and configured to receive input display data from one of the kN data channels, and provide output display data to one of the 1/x source lines at each clock period based on the respective set of selecting signals.

20. The apparatus of claim 1, wherein the array of pixel circuits are arranged in (x/i)M rows and (k/x)N columns.

* * * * *